(12) United States Patent
Ota et al.

(10) Patent No.: US 6,512,640 B2
(45) Date of Patent: Jan. 28, 2003

(54) OBJECTIVE LENS FOR PICKUP AND LIGHT PICKUP APPARATUS

(75) Inventors: Kohei Ota; Tohru Kimura, both of Tokyo (JP)

(73) Assignee: Konica Corporation, Tokyo (JP)

( * ) Notice: Subject to any disclaimer, the term of this patent is extended or adjusted under 35 U.S.C. 154(b) by 1 day.

(21) Appl. No.: 10/086,550

(22) Filed: Mar. 4, 2002

(65) Prior Publication Data

US 2002/0167739 A1 Nov. 14, 2002

Related U.S. Application Data

(62) Division of application No. 09/653,942, filed on Sep. 1, 2000, now Pat. No. 6,411,442.

(30) Foreign Application Priority Data

Sep. 1, 1999 (JP) ............................................ 11-247294
Mar. 6, 2000 (JP) ........................................ 2000-060843

(51) Int. Cl.$^7$ ........................ G02B 13/18; G02B 17/00; G11B 7/00; G11B 7/35

(52) U.S. Cl. .................. 359/719; 359/642; 369/112.01; 369/112.23

(58) Field of Search .............................. 359/719, 823, 359/824, 642, 649; 369/112.01, 112.23; 250/201.5

(56) References Cited

U.S. PATENT DOCUMENTS 6,313,956 B1 * 11/2001 Saito ........................ 250/201.5
2002/0050555 A1 * 5/2002 Honda ..................... 250/201.5

* cited by examiner

*Primary Examiner*—Ricky Mack
(74) *Attorney, Agent, or Firm*—Finnegan, Henderson, Farabow, Garrett & Dunner, L.L.P.

(57) ABSTRACT

An objective lens for use in an optical pickup apparatus to record or reproduce information in an optical information recording medium, comprises an aspheric surface, wherein the following conditional formula is satisfied: $1.1 \leq d1/f \leq 3$ where d1 represents axial lens thickness and f represents a focal length.

21 Claims, 37 Drawing Sheets

SPHERICAL ABERRATION

ASTIGMATISM

SPHERICAL ABERRATION

ASTIGMATISM

SPHERICAL ABERRATION    ASTIGMATISM

SPHERICAL ABERRATION    ASTIGMATISM

SPHERICAL ABERRATION

ASTIGMATISM

SPHERICAL ABERRATION

SPHERICAL ABERRATION

SPHERICAL ABERRATION

SPHERICAL ABERRATION

SPHERICAL ABERRATION

SPHERICAL ABERRATION

SPHERICAL ABERRATION

SPHERICAL ABERRATION

SPHERICAL ABERRATION

OBJECTIVE LENS FOR PICKUP AND LIGHT PICKUP APPARATUS

This application is a divisional of U.S. patent application Ser. No. 09/653,942, filed Sep. 1, 2000, now U.S. Pat. No. 6,411,442 which is hereby incorporated by reference herein.

BACKGROUND OF THE INVENTION

The present invention relates to an objective lens for pickup in an optical recording apparatus which conducts recording on or reproducing from an information recording medium such as an optical disk, and to a optical pickup apparatus employing the objective lens.

In an optical system of an optical recording/reproducing apparatus employing a medium of an optical disk, there is commonly used an aspherical single objective lens. For achieving high density of recorded information signals, a size of a spot formed on a recording medium by the objective lens has been required to be small, and there have been investigated high NA of an objective lens and utilization of a light source for short wavelength.

Though there has been developed a GaN blue semiconductor laser having an oscillation wavelength of about 400 nm, a wavelength is varied by mode hop or by laser output, and monochromaticity of oscillation wavelength is poor because high-frequency superimposition is used. Therefore, in a light-converging optical system for high density optical disk wherein a GaN blue semiconductor laser is used, it is considered that correction of axial chromatic aberration is necessary.

In an aspherical single objective lens for an optical disk, spherical aberration and coma are corrected by aspherical surfaces. However, when a numerical aperture is large, image height characteristics are deteriorated. When an optical disk is made to be of higher density, deterioration of the image height characteristics becomes an extremely serious problem even if the value of the deterioration is small. In particular, when the numerical aperture is 0.65 or more, the problem is conspicuous. Further, when the numerical aperture is greater, deterioration of eccentricity sensitivity is also a serious problem.

SUMMARY OF THE INVENTION

The invention has been achieved for solving the problem stated above. Namely, with regard to an objective lens for a optical pickup apparatus, an object of the invention is to provide an aspherical single objective lens whose numerical aperture is great and image height characteristics are excellent. In particular, an object of the invention is to provide an objective lens which is suitable to be used for a high density recording/reproducing apparatus wherein a numerical aperture is not less than 0.65, preferably 0.7 or more, and more preferably 0.75 or more, and there is used a laser wherein a wavelength of a light source is as short as about 500 nm.

Further, providing an objective lens which makes eccentricity sensitivity to be excellent is also an object of the invention. Furthermore, providing an objective lens which makes spherical aberration and coma to be excellent is also an object of the invention.

When a thickness of a protective layer (transparent base board) of an information recording medium is small to be 0.2 mm or less, or when there is no protective layer, a working distance can be small. An offer of an objective lens which is suitable to be used in a recording/reproducing apparatus having such small working distance is an object of the invention.

It is further an object of the invention to provide a optical pickup apparatus, an optical information recording medium recording/reproducing apparatus, and an optical information recording. medium recording/reproducing method, which employ these objective lenses stated above.

Further, an object is to provide a optical pickup apparatus having an optical system wherein axial chromatic aberration is corrected by the simple structure, in a high density optical recording/reproducing apparatus. In particular, it is an object to provide a optical pickup apparatus wherein a numerical aperture on the part of an information recording medium is 0.65 or more, preferably 0.7 or more, and more preferably 0.75 or more, and shortest wavelength of a light source to be used is as small as 500 nm or less.

The above object can be attained by the following structures.

(1) An objective lens for use in an optical pickup apparatus to record or reproduce information in an optical information recording medium, comprising:
an aspheric surface;
wherein the following conditional formula is satisfied:

$$1.1 \leq d1/f \leq 3$$

where d1 represents axial lens thickness and f represents a focal length.

(2) In the objective lens of (1), a numerical aperture of the objective lens is not smaller than 0.65.

(3) In the objective lens of (2), a numerical aperture of the objective lens is not smaller than 0.75.

(4) In the objective lens of (1), the following conditional formula is satisfied:

$$f/vd \leq 0.060$$

where vd represents Abbe's number.

(5) In the objective lens of (1), the following conditional formula is satisfied:

$$1.40 \leq n$$

where n represents a refractive index at a used wavelength.

(6) In the objective lens of (5), the following conditional formula is satisfied:

$$1.40 \leq n \leq 1.85$$

(7) In the objective lens of (1), the following conditional formula is satisfied:

$$0.40 \leq r1/(n \cdot f) \leq 0.70$$

where r1 represents a paraxial radius of curvature of one surface of the objective lens.

(8) In the objective lens of (7), r1 represents a paraxial radius of curvature of the surface of the objective lens at the light source side.

(9) In the objective lens of (1), a used wavelength is not longer than 500 nm.

(10) In the objective lens of (1), the objective lens is an objective lens for use in an optical pickup apparatus to record or reproduce information in an optical information recording medium having a protective layer whose thickness is not larger than 0.2 mm.

(11) In the objective lens of (10), a numerical aperture is not smaller than 0.7.

(12) In the objective lens of (7), the following conditional formula is satisfied:

$$1.50 \leq n$$

where n represents a refractive index at a used wavelength.

(13) In the objective lens of (1), the objective lens is a plastic lens.

(14) In the objective lens of (1), the objective lens is a glass lens.

(15) In the objective lens of (1), the following conditional formula is satisfied:

$$1.85 \leq n$$

where n represents a refractive index at a used wavelength.

(16) In the objective lens of (1), the objective lens further comprises a diffracting section.

(17) In the objective lens of (1), the objective lens further comprises a flange section on an outer periphery thereof.

(18) In the objective lens of (1), the flange section comprises a surface extended in a direction perpendicular to an optical axis.

(19) In the objective lens of (1), each of both lens surfaces is an aspherical surface.

(20) An optical pickup apparatus to record or reproduce information in an optical information recording medium, comprises:

a light source to emit light flux;

a converging optical system to condense the light flux emitted from the light source; and an optical detector to detect reflection light from the optical information recording medium;

wherein the converging optical system comprises an objective lens to condense the light flux on an information recording surface of the optical information recording medium and the objective lens comprises an aspheric surface; and wherein the following conditional formula is satisfied:

$$1.1 \leq d1/f \leq 3$$

where d1 represents axial lens thickness of the objective lens and f represents a focal length of the objective lens.

(21) In the optical pickup apparatus of (20), a numerical aperture of the objective lens at the optical information recording medium side is not smaller than 0.65.

(22) In the optical pickup apparatus of (29), a numerical aperture of the objective lens at the optical information recording medium side is not smaller than 0.75.

(23) In the optical pickup apparatus of (20), the following conditional formula is satisfied:

$$f/vd \leq 0.060$$

where vd represents Abbe's number of the material of the objective lens.

(24) In the optical pickup apparatus of (20), the following conditional formula is satisfied:

$$1.40 \leq n$$

where n represents a refractive index of the material of the objective lens at a used wavelength.

(25) In the optical pickup apparatus of (24), the following conditional formula is satisfied:

$$1.40 \leq n \leq 1.85$$

(26) In the optical pickup apparatus of (20), the following conditional formula is satisfied:

$$0.40 \leq r1/(n \cdot f) \leq 0.70$$

where r1 represents a paraxial radius of curvature of the surface of the objective lens at the light source side.

(27) In the optical pickup apparatus of (20), the light source emits light flux whose wavelength is not larger than 500 nm.

(28) In the optical pickup apparatus of (20), the optical pickup apparatus is used to record or reproduce information in an optical information recording medium having a protective layer whose thickness is not larger than 0.2 mm.

(29) In the optical pickup apparatus of (28), a numerical aperture of the objective lens at the optical information recording medium side is not smaller than 0.7.

(30) In the optical pickup apparatus of (20), the following conditional formula is satisfied:

$$1.85 \leq n$$

where n represents a refractive index of a material of the objective lens at a wavelength of the light flux emitted from the light source.

(31) In the optical pickup apparatus of (20), the converging optical system comprises a diffracting section.

(32) In the optical pickup apparatus of (20), the converging optical system comprises a coupling lens to change a divergent angle of the light flux emitted from the light source and the coupling lens corrects chromatic aberration of the objective lens.

(33) In the optical pickup apparatus of (32), the coupling lens is a collimator lens to make the light flux emitted from the light source to be parallel light flux.

(34) In the optical pickup apparatus of (32), chromatic aberration of the composite system of the objective lens and the coupling lens satisfies the following conditional formula:

$$\delta fb \cdot NA^2 \leq 0.25 \, \mu m \, (\delta fb > 0)$$

where δfb represents a change of focal position ($\mu m$) of the composite system when a wavelength is changed from a standard wavelength by +1 nm, and NA represents a numerical aperture of the objective lens at the optical information recording medium side.

(35) In the optical pickup apparatus of (34), the chromatic aberration of the composite system of the objective lens and the coupling lens satisfies the following conditional formula:

$$0.02 \, \mu m \leq \delta fb \cdot NA^2 \leq 0.15 \, \mu m \, (\delta fb > 0)$$

(36) In thee optical pickup apparatus of (32), the following conditional formula is satisfied:

$$0.1 \leq |m| \leq 0.5 \, (m \leq 0)$$

where m represents magnification of the composite system of the objective lens and the coupling lens.

(37) In the optical pickup apparatus of (32), the coupling lens is a single lens group having two lenses.

(38) In the optical pickup apparatus of (32), the coupling lens comprises an aspherical surface.

(39) In the optical pickup apparatus of (32), the coupling lens comprises a diffracting section.

(40) An apparatus to record or reproduce information in an optical information recording medium, comprises:

an optical pickup apparatus, comprising
  a light source to emit light flux;
    a converging optical system to condense the light flux emitted from the light source; and an optical detector to detect reflection light or transmission light from the optical information recording medium;

wherein the converging optical system comprises an objective lens to condense the light flux on an information recording surface of the optical information recording medium and the objective lens comprises an aspheric surface; and wherein the following conditional formula is satisfied:

$$1.1 \leq d1/f \leq 3$$

where d1 represents axial lens thickness of the objection lens and f represents a focal length of the objective lens.

(41) A method of recording or reproducing information in an optical information recording medium, comprises:

a step of emitting light flux;

a step of converging the light flux emitted from the light source on an information recording surface of the optical information recording medium; and a step of detecting reflection light or transmission light of the light condensed on the information recording surface;

wherein the light flux is converged on the information recording surface of the optical information recording medium by an objective lens; and wherein the objective lens comprises an aspheric surface and the following conditional formula is. satisfied:

$$1.1 \leq d1/f \leq 3$$

where d1 represents axial lens thickness of the objective lens and f represents a focal length of the objective lens.

DETAILED DESCRIPTION OF THE PREFERRED EMBODIMENT

Figure 1:
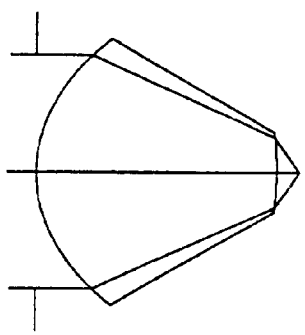
FIG. 1(*a*) shows a sectional view of an objective lens and FIG. 1(*b*) shows aberration diagrams of the objective lens in Example 1.
Figure 1:
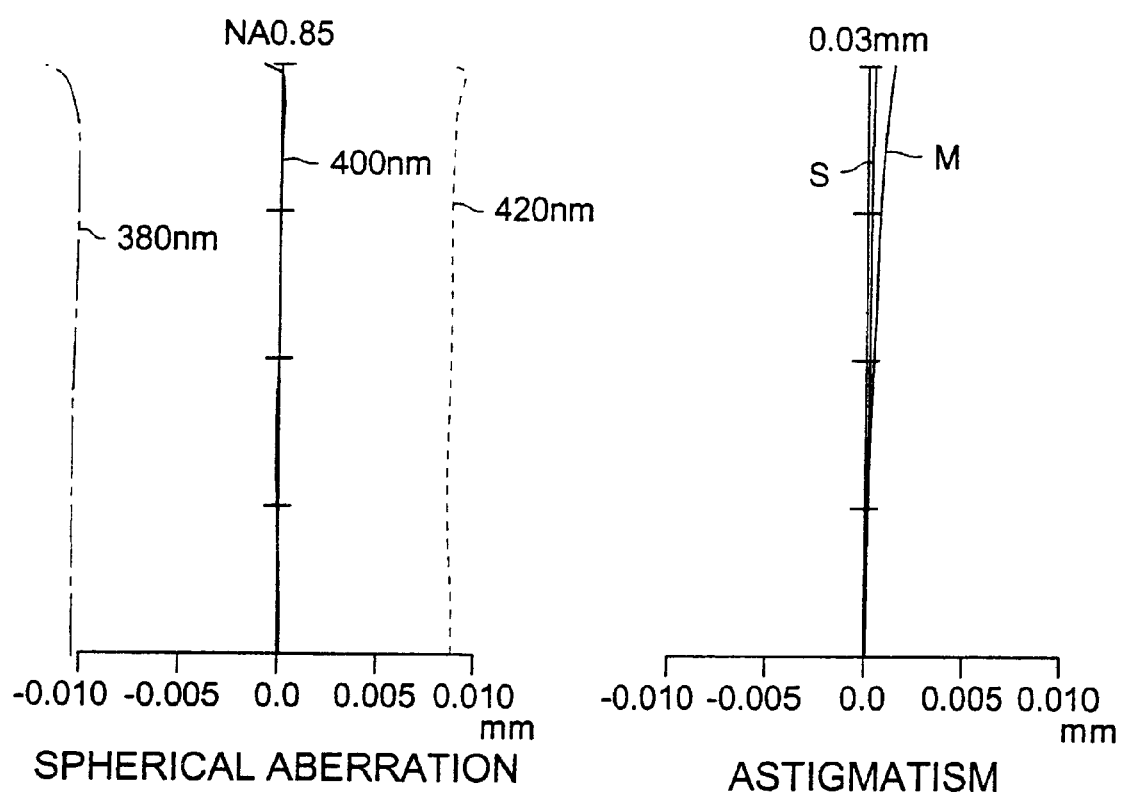

Embodiments of the invention will be explained as follows.

An aspherical single objective lens according to the first invention is an objective lens for recording on and reproducing from an information recording medium, and it is characterized to satisfy the following expression.

Incidentally, an objective lens of the invention has at least one aspherical surface. It is preferable that both sides of the objective lens represent an aspherical surface, although it is allowable that one side only is made to be an aspherical surface. It is further preferable that an objective lens is composed of one piece of lens without being composed of plural pieces of lenses.

$$1.1 \leq d1/f \leq 3 \qquad (1)$$

wherein d1 represents an axial lens thickness, and f represents a focal length.

The conditional expression (1) above represents conditions for obtaining excellent image height characteristics, and when trying to obtain a great numerical aperture which is not less than 0.65, or not less than 0.75 preferably, in particular, if a value of d1/f is not less than the lower limit, a central thickness of a lens is not too small, image height characteristics are not deteriorated, and further, shift sensitivity does not grow greater. If a value of d1/f is not more than the upper limit, the central thickness is not too large, and image height characteristics are not deteriorated. Incidentally, it is preferable that d1 is in a range of 2 mm–4 mm.

Further, eccentricity sensitivity becomes excellent. In addition, spherical aberration and coma can be corrected satisfactorily. A optical pickup apparatus which reproduces or records information on an optical information recording medium of the invention has therein a light source which emits a light flux, a light converging optical system which converges a light flux emitted from the light source and a light detection unit which detects a reflected light or a transmitted light coming from an optical information recording medium. The light converging optical system has an objective lens which converges a light flux on an information recording surface of an optical information recording medium. The objective lens is one in the invention stated above. Incidentally, the light converging optical system may also have a coupling lens in addition to the objective lens. The optical information recording medium recording/reproducing apparatus of the invention has the optical pickup apparatus of the invention stated above. In addition to this, the optical information recording medium recording/reproducing apparatus may also have a spindle motor which rotates an optical information recording medium and a tracking means. Incidentally, it is preferable that a numerical aperture in the optical pickup apparatus is obtained based on a wavelength of a light source, a diameter of an aperture and a diameter of an objective lens. Incidentally, in the optical pickup apparatus, a numerical aperture which makes it possible for a light flux with prescribed wavelength to read/record information on prescribed optical information recording medium can be taken as a numerical aperture of the optical pickup apparatus, or a numerical aperture established by a standard of the optical information recording medium to be read/recorded by the optical pickup apparatus can be taken as a numerical aperture of the optical pickup apparatus. Further, when judging a numerical aperture from only a lens, if the lens is corrected to have no aberration for a range within a certain radius of an aperture of the lens (for example, the wave front aberration is corrected to be 0.07 λ or less), the numerical aperture may be defined as a ratio of this radius to the focal length.

It is more desirable that the conditional expression (1) above satisfies the following expression.

$$1.2 \leq d1/f \leq 2.3$$

Further, it is most desirable that the conditional expression (1) above satisfies the following expression.

$$1.5 \leq d1/f \leq 1.8$$

Further, it is preferable that the objective lens stated above satisfies the following conditional expression (2);

$$f/vd \leq 0.060 \qquad (2)$$

wherein vd represents Abbe's number.

The conditional expression (2) above represents conditions to make axial chromatic aberration small. Due to this, it is possible to cope with instantaneous wavelength fluctuations in a laser light source which can not be followed by a servomechanism for focusing, and to cope with extension of wavelength in a light source caused by multi-mode oscillation. It is desirable that the conditional expression (2) above satisfies the following expression.

$$f/vd \leq 0.050$$

Further, it is most desirable that the conditional expression (2) above satisfies the following expression.

$$f/vd \leq 0.035$$

With regard to a lens material, it is preferable that the material wherein Abbe's number preferably satisfies vd=50 rather than vd=35 is used.

The objective lens may be either a glass lens or a plastic lens, but the plastic lens is more preferable. When the objective lens is a plastic lens, it is preferable that saturation water absorption of lens plastic is not more than 0.01%. Further, a material whose light transmission for light with wavelength of 350 nm–500 nm is not less than 85% is preferable. It is preferable that a diameter of the objective lens of the invention is 2.0 mm to 4.0 mm. As a material for a plastic lens, polyolefine resins are preferable. In particular, norbornene resins are preferable.

Further, it is preferable that the objective lens stated above satisfies the following conditional expression (3);

$$1.40 \leq n \quad (3)$$

wherein, n represents a refractive index (refractive index of a material of the objective lens at the wavelength of the light source) at the wavelength used.

The conditional expression (3) above represents a condition of a refractive index, and when this condition is satisfied and a refractive index is not made small, a sag on the first surface does not grow greater, shift sensitivity and tilt sensitivity on the surface do not grow greater, and image height characteristics are not deteriorated.

Further, it is preferable that the objective lens stated above satisfies the following conditional expression (4).

$$1.40 \leq n \leq 1.85 \quad (4)$$

The conditional expression (4) above represents a condition of a refractive index, and in the case of a optical pickup wherein great importance needs to be attached not only to axial optical power but also to off-axial optical power, an axial thickness tends to be greater because of correction of astigmatism generated. When n is not more than the upper limit, a refractive index is not made to be too great and the central thickness of a lens does not need to be made great, which makes it easy to attain the light weight and to ensure a working distance. When n is not less than the lower limit, a refractive index is not made to be too small, a sag on the first surface does not grow greater, and image height characteristics are not deteriorated.

It is desirable that the conditional expression (4) above satisfies the following expression.

$$1.50 \leq n \leq 1.85$$

The more preferable is to satisfy the following expression.

$$1.70 \leq n \leq 1.85$$

Further, it is preferable that the objective lens stated above satisfies the following conditional expression (5);

$$0.40 \leq r1/(n \cdot f) \leq 0.70 \quad (5)$$

wherein, r1 represents a paraxial radius of curvature of one surface of the objective lens stated above (preferably, a paraxial radius of curvature on the part of a light source).

The conditional expression (5) above relates mainly to correction of coma, and when a value of r1/(n·f) is not less than the lower limit, r1 is not made to be too small, and a flare caused by introversive coma and extroversive coma becomes hard to be generated, while, when a value of r1/(n·f) is not more than the upper limit, r1 is not made to be too large, extroversive coma is hard to be generated, and an under flare of spherical aberration is hard to be generated.

It is desirable that the conditional expression (5) above satisfies the following expression.

$$0.40 \leq r1/(n \cdot f) \leq 0.65$$

A diameter of a spot of light converged on a recording medium by an objective lens is generally determined by kλ/NA when λ represents a wavelength of a light source, NA represents a numerical aperture of the objective lens, and k represents a proportional constant. Therefore, when a laser light source with a small wavelength of 500 nm or less is used and a numerical aperture of the objective lens is made to be as large as 0.65 or more, it is possible to make a diameter of a spot of light to be converged to be small. It is therefore possible to make recorded information signals to be of high density, by constituting a optical pickup apparatus by the use of a lens related to the invention. Further, it is possible to provide an objective lens having a small working distance by making a protective layer of a recording medium to be as thin as 0.2 mm or less, which makes it possible to attain the light weight and compactness of a optical pickup apparatus.

In other words, the objective lens, the optical pickup apparatus and the optical information recording medium recording/reproducing apparatus, all in the invention are especially suitable when a wavelength used (wavelength of a light flux emitted from a light source) is not more than 500 nm, or when the numerical aperture of the objective lens on the optical information recording medium side is not less than 0.65 (preferably, not less than 0.7, more preferably not less than 0.75), or when they are used for an optical information recording medium having a protective layer with a thickness of 0.2 mm or less.

When the objective lens mentioned above is made of plastic materials, it is possible to attain the light weight of a optical pickup apparatus, and to realize mass production at low cost.

Another preferable aspherical single objective lens is an objective lens for recording on and reproducing from an information recording medium, and the objective lens is characterized in that a wavelength to be used is 500 nm or less, an information recording medium has a protective layer having a thickness of 0.2 mm or less, and a numerical aperture of the objective lens is 0.65 or more, and preferably is 0.75 or more.

It is preferable that the aforesaid objective lens satisfies the following conditional expression (6) representing conditions for obtaining excellent image height characteristics wherein operations thereof are the same as those in conditional expression (1);

$$1.1 \leq d1/f \leq 3 \quad (6)$$

wherein, d1 represents axial lens thickness and f represents a focal length.

It is preferable that the aforesaid objective lens satisfies the following conditional expression (7) representing conditions for making axial chromatic aberration wherein operations thereof are the same as those in conditional expression (2);

$$f/vd \leq 0.060 \quad (7)$$

wherein, vd represents Abbe's number.

It is preferable that the aforesaid objective lens satisfies the following conditional expression (8) representing conditions for a refractive index wherein operations thereof are the same as those in conditional expression (3);

$$1.40 \leq n \quad (8)$$

wherein, n represents a refractive index at the wavelength used.

It is preferable that the aforesaid objective lens satisfies the following conditional expression (9). The conditional expression (9) represents conditions for a refractive index. Operations thereof are the same as those in conditional expression (4).

$$1.40 \leq n < 1.85 \tag{9}$$

It is preferable that the aforesaid objective lens satisfies the following conditional expression (10) relating mainly to correction of coma wherein operations thereof are the same as those in conditional expression (5);

$$0.40 \leq r1/(n \cdot f) \leq 0.70 \tag{10}$$

wherein, r1 represents paraxial radius of curvature on the part of a light source.

Another preferable aspherical single objective lens is an objective lens for recording on and reproducing from an information recording medium, and the objective lens is characterized in that its numerical aperture is 0.75 or more and it is made of plastic materials.

It is preferable that the aforesaid objective lens satisfies the following conditional expression (11) representing conditions for obtaining excellent image height characteristics wherein operations thereof are the same as those in conditional expression (1);

$$1.1 \leq d1/f \leq 3 \tag{11}$$

wherein, d1 represents axial lens thickness, and f represents a focal length.

It is preferable that the aforesaid objective lens satisfies the following conditional expression (12) representing conditions for making axial chromatic aberration to be small wherein operations thereof are the same as those in conditional expression (2);

$$f/vd \leq 0.060 \tag{12}$$

wherein, vd represents Abbe's number.

It is preferable that the aforesaid objective lens satisfies the following conditional expression (13). representing conditions for a refractive index wherein operations thereof are the same as those in conditional expression (3);

$$1.40 \leq n \tag{13}$$

wherein, n represents a refractive index at the wavelength used.

It is preferable that the aforesaid objective lens satisfies the following conditional expression (14). The conditional expression (14) represents conditions for a refractive index. Operations thereof are the same as those in conditional expression (4).

$$1.40 \leq n \leq 1.85 \tag{14}$$

It is preferable that the aforesaid objective lens satisfies the following conditional expression (15) relating to correction of coma wherein operations thereof are the same as those in conditional expression (5);

$$0.40 \leq r1/(n \cdot f) \leq 0.70 \tag{15}$$

wherein, r1 represents paraxial radius of curvature on the part of a light source.

Another preferable aspherical single objective lens is an objective lens for recording on and reproducing from an information recording medium, and the objective lens is characterized in that its numerical aperture is 0.65, and preferably is 0.75 or more and it satisfies the following expression (16);

$$n \geq 1.85 \tag{16}$$

wherein, n represents a refractive index at the wavelength used.

The conditional expression (16) above represents conditions of a refractive index. By using materials of high refractive index, it is possible to make a radius of curvature on the first surface to be large, and as a result, it is possible to make a prospective angle to be small. Thus, there is a merit that it is easy to process a metal mold when making a lens through molding. Further, in the case of a optical pickup wherein great importance needs to be attached only to axial optical power, the use of materials of high refractive index makes it easy to correct spherical aberration of a high order.

It is preferable that the aforesaid objective lens satisfies the following conditional expression (17) representing conditions for obtaining excellent image height characteristics wherein operations thereof are the same as those in conditional expression (1);

$$1.1 \leq d1/f \leq 3 \tag{17}$$

wherein, d1 represents axial lens thickness and f represents a focal length.

It is preferable that the aforesaid objective lens satisfies the following conditional expression (18) relating to correction of coma wherein operations thereof are the same as those in conditional expression (5);

$$0.40 \leq r1/(n \cdot f) \leq 0.70 \tag{18}$$

wherein, r1 represents paraxial radius of curvature on the part of a light source.

Another aspherical single objective lens is an objective lens for recording on and reproducing from an information recording medium, and the objective lens is characterized in that its numerical aperture is 0.65, and preferably is 0.75 or more and it satisfies the following expression (19);

$$1.40 \leq n \leq 1.85 \tag{19}$$

wherein, n represents a refractive index at the wavelength used.

The aforesaid conditional expression represents conditions of a refractive index. In respect to its operations, they are the same as those in expression (4).

It is preferable to provide a diffraction section on a light converging optical system in the optical pickup apparatus of the invention. Though it is preferable to provide a diffraction section on an objective lens of the light converging optical system, it is possible either to incorporate an optical element having only a diffraction section in the light converging optical system or to provide a diffraction section on another optical element which constitutes a light converging optical system such as a coupling lens. Incidentally, it is also possible to provide a diffraction surface only on one side of a single coupling lens. Owing to this structure, it is possible to prevent deterioration of wavefront aberration caused by surface eccentricity.

When spherical aberration is corrected for the standard wavelength by only a spherical surface or by only an aspherical surface, for a single objective lens in a refraction system, there is normally generated under axial chromatic aberration for the wavelength that is shorter than the standard wavelength, and over axial chromatic aberration for the wavelength that is longer than the standard wavelength. However, in the case of the objective lens having a diffraction surface, when spherical aberration is corrected for the standard wavelength, it is possible to generate polarity which is opposite to the objective lens in a refraction system, namely, to generate over axial chromatic aberration for the wavelength that is shorter than the standard wavelength and under axial chromatic aberration for the wavelength that is longer than the standard wavelength. Therefore, in the case of the objective lens stated above, it is possible to realize an objective lens which shows excellent performance even for instantaneous wavelength fluctuations such as mode hop, for example, by combining diffraction powers through appropriate selection of the aspheric surface coefficient as an aspherical lens and a coefficient of a phase function as a diffraction lens, and thereby by correcting chromatic aberration for the spherical aberration.

The objective lens stated above has a numerical aperture of 0.65 or more, or preferably of 0.75 or more, and when a wavelength to be used is 500 nm or less, and when an information recording medium wherein a thickness of a protective layer is 0.2 mm or less is used, it is possible to use a laser light source having a short wavelength of not more than 500 nm, to make a numerical aperture of the objective lens to be as large as 0.65 or more, and to make a spot diameter of light to be converged to be small. Thus, it is possible to realize high density of recorded information signals, by constituting a optical pickup apparatus with a lens of the invention. Further, it is possible to provide an objective lens having a small working distance, by making a protective layer of a recording medium to be as thin as 0.2 mm or less, which makes it possible to attain the light weight and compactness of a optical pickup apparatus.

Further, in each objective lens mentioned above, it is preferable that a flange portion is provided on the outer circumference, and it is more preferable that there is provided on the outer circumference a flange portion having a surface extending in the direction perpendicular to an optical axis. Due to the flange portion provided on the outer circumference, the objective lens can be attached on the optical pickup apparatus easily, and it is possible to attach the objective lens more accurately by providing on the flange portion a surface extending in the direction almost perpendicular to an optical axis.

Further, each optical pickup apparatus of the invention is one having therein a light source and an objective lens which converges a light flux from the light source on the information recording surface of an information recording medium, and conducting information recording on the information recording medium and/or information reproducing therefrom, through detection of light from the information recording medium, wherein an aspherical single objective lens is provided as the objective lens mentioned above.

Further, each optical pickup apparatus of the invention is one having therein a light source, a coupling lens which changes a divergence angle of a divergent light emitted from the light source, and an objective lens which converges a light flux through the coupling lens on the information recording surface of an information recording medium, and conducting information recording on the information recording medium and/or information reproducing therefrom, through detection of light from the information recording medium, wherein the coupling lens has functions to correct chromatic aberration of the objective lens, and the aspherical single objective lens is provided as the objective lens mentioned above.

When an aspherical single objective lens is used as an objective lens, it is possible to obtain the objective lens suitable for a high density recording/reproducing apparatus but there is caused axial chromatic aberration which is under on the part of a short wavelength, because of the single objective lens in a refraction system. However, the axial chromatic aberration can be corrected by the coupling lens in the aforesaid optical pickup apparatus. Namely, if axial chromatic aberration of the coupling lens is made to be over on the part of a short wavelength, axial chromatic aberration of the objective lens can be reduced. Due to this, together with the objective lens mentioned above, it is possible to obtain a optical pickup apparatus having an optical system wherein axial chromatic aberration is corrected by the simple structure.

In this case, the coupling lens can collimate a light flux emitted from the light source to the mostly collimated light flux. This structure makes assembly and adjustment of a pickup optical system to be simple. Namely, the coupling lens may also be a collimator lens.

It is further possible to arrange so that chromatic aberration of a composition system of the objective lens and the coupling lens may satisfy the following expression (20);

$$\delta fb \cdot NA^2 \leq 0.25 \, \mu m \; (\delta fb > 0) \tag{20}$$

wherein $\delta fb$ represents a change of focal position ($\mu m$) of the composition system when a wavelength is changed from the standard wavelength by +1 nm, and NA represents a numerical aperture of the objective lens on the part of a disk.

It is more preferable that the following expression (20)' is satisfied.

$$0.02 \, \mu m \leq \delta fb \cdot NA^2 \leq 0.15 \, \mu m \; (\delta fb > 0) \tag{20}'$$

Each structure stated above is one relating to the correction of chromatic aberration carried out by the coupling lens. When handling a short wavelength laser semiconductor with oscillation wavelength of about 400 nm, axial chromatic aberration caused on the objective lens by the microscopic shift of wavelength is an unallowable serious problem. The causes for the problem are given as follows. When handling a short wavelength, a change in refractive index for ordinary lens materials is large for microscopic fluctuation of a wavelength. As a result, a defocusing amount for the focus is large. With regard to a focal depth of the objective lens, however, the shorter the wavelength ($\lambda$) to be used is, the smaller the focal depth is, as is understood from $k\lambda/NA^2$ (k is a proportional constant), and even a very small amount of defocusing is not allowed. In Session WD26 of ISOM/ODS'99 Postdeadline Poster Papers, high frequency superimposition with spectrum width of 0.7 nm (FWMH) is shown for GaN blue semiconductor laser. It is desirable to control wave front aberration of a pickup optical system to about 0.02 $\lambda$rms for the high frequency superimposition. A level of correction of axial chromatic aberration necessary for the foregoing was obtained, on the assumption that spherical aberration for color has been corrected. Whereupon, it was necessary to control the axial chromatic aberration of the composition system within about 0.15 $\mu m/NA^2$ for wavelength fluctuation of 1 nm, for controlling wave front aberration to 0.02 $\lambda$rms for the high frequency superimposition with spectrum width of 0.7 nm (FWMH), when the standard wavelength is 400 nm and NA represents a numerical aperture on the part of a disk. On the other hand, the axial chromatic aberration of the composition system does not always need to be corrected perfectly, and wave front aberration can remain in an allowable range. When the objective lens is a single lens in a refraction system as in the invention, it is possible to constitute a coupling lens in a simple way by leaving the axial chromatic aberration to be a positive value for a long wavelength even in the composition system, because the axial chromatic aberration is of a positive value for the long wavelength for the objective lens. For example, when a coupling lens is composed of a one-group and two-element cemented lens, power of each lens element of the coupling lens can be weak, compared with perfect color correction of the composition system, resulting in a coupling lens which is excellent in terms of aberration and is easy to make. Even in the case of correcting color for a coupling lens as a diffraction lens, power of a diffraction surface can be weak, thus, an interval of zonal diffraction rings is large, and a diffraction lens with high diffraction efficiency can easily be manufactured. For this reason, the lower limit of the aforesaid conditional expression was established.

Further, it is preferable to satisfy the following expression concerning magnification m of a composition system;

$$0.1 \leq |m| \leq 0.5 \qquad (m \leq 0)$$

wherein, m represents magnification of a composition system of an objective lens and a coupling lens.

When the magnification is not lower than the lower limit of the conditional expression above, the composition system is compact, while, when the magnification is not higher than the upper limit, the coupling lens is better in terms of aberration.

The coupling lens may be composed either of one piece or of plural pieces, and it is preferable that the coupling lens is of the one-group and two-element structure. Due to the one-group and two-element structure of the coupling lens stated above, the structure of the coupling lens is simple and it causes manufacture of the coupling lens to be easy. When using a one-group and two-element coupling lens, it is possible to generate sharply the axial chromatic aberration which is over on the part of a short wavelength and is under on the part of a long wavelength, while keeping the axial power. As a result, it is possible to correct favorably the axial chromatic aberration on the objective lens which is under on the part of a short wavelength and is over on the part of a long wavelength, while keeping the axial power on the composition system, which is advantageous for instantaneous wavelength fluctuations such as mode hop. When this axial chromatic aberration is made to be over on the part of a short wavelength and to be under on the part of a long wavelength, the curvature on the cemented surface of the coupling lens having diverging actions tends to be great. Therefore, if spherical aberration at the standard wavelength is controlled, spherical aberration which is over on the part of a short wavelength and is under on the part of a long wavelength is generated greatly. As a result, spherical aberrations on the part of a short wavelength and on the part of a long wavelength generated on the objective lens are canceled, and spherical aberration of a composition system in the case of wavelength fluctuations cab be controlled to be small.

Incidentally, it is preferable that the coupling lens has an aspherical surface. The aspherical surface can be provided either on one side or on both sides.

Since the coupling lens stated above is of a one-group and two-element structure having an aspheric surface, it is possible to make a numerical aperture of the coupling lens to be large by aberration correction functions of the aspheric surface and to obtain a compact composition system whose total length is short.

Since the coupling lens stated above has a diffraction surface, it is possible to obtain a highly efficient coupling lens with a simple structure of a single lens, by adding, in particular, a diffraction surface to a plastic aspherical lens. Incidentally, it is also possible to correct fluctuations of spherical aberration caused on each optical surface of an optical system, by moving a coupling lens in the optical axis direction. For example, a coupling lens may be moved while monitoring RF amplitude of a reproduction signal, so that spherical aberration caused in the optical system may be corrected in an optimal way. As fluctuations of spherical aberration caused on each optical surface of an optical system, there are given, as an example, the fluctuation based on minute changes in oscillation wavelength of a light source, the fluctuation based on temperature change, the fluctuation based on humidity change, the fluctuation based on minute change in a thickness of a protective layer of an information recording medium and the fluctuation based on combination of the foregoing. It is preferable that a coupling lens is shifted in the optical axis direction so that a distance from an objective lens may be increased when spherical aberration of an optical system fluctuates to the greater side, and a coupling lens is shifted in the optical axis direction so that a distance from an objective lens may be decreased when spherical aberration of an optical system fluctuates to the smaller side. Incidentally, with regard to a movement of the coupling lens in the optical axis direction, it is preferable that a optical pickup apparatus has a shifting unit which shifts the coupling lens. As a shifting unit, a voice-oil-shaped actuator and a piezo-actuator can be used.

Incidentally, each optical pickup apparatus mentioned above converges a light flux emitted from a laser light source through the objective lens on the information recording surface of an information recording medium, and it can conduct recording of information on the information recording medium and/or reproducing of information from the information recording medium.

The optical information recording medium stated above includes, for example, various CDs such as CD, CD-R, CD-RW, CD-Video and CD-ROM, various DVD such as DVD, DVD-ROM, DVD-RAM, DVD-R and DVD-RW, and a disk-shaped information recording medium such as MD, and further, a novel high density information recording medium that has been enhanced in terms of recording density is included.

Figure 8:
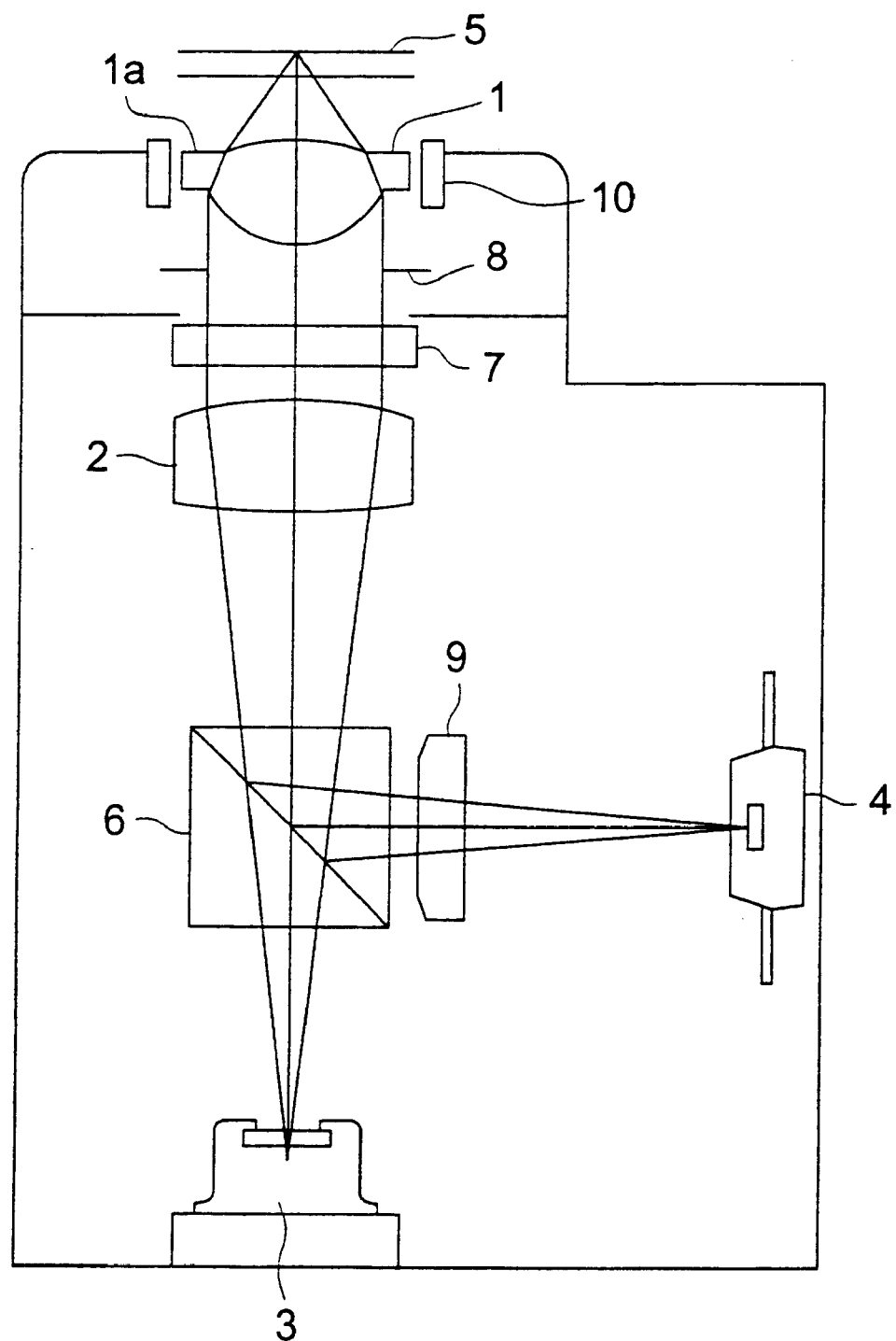
FIG. 8 is a diagram showing an embodiment of a optical pickup apparatus employing an objective lens of the invention.

Embodiments of the invention will be explained as follows, referring to the drawings. FIG. 8 is a schematic structure diagram of a optical pickup apparatus showing an embodiment of the invention.

A optical pickup apparatus in FIG. 8 is one employing the double aspherical single objective lens of the invention as an objective lens, wherein semiconductor laser 3 representing a light source, coupling lens 2 which changes a divergence angle of a divergent light emitted from the light source 3, objective lens 1 which converges a light flux coming from the coupling lens 2 on information recording surface 5 of an information recording medium, and photo-detector 4 which receives reflected light from information recording surface 5 of an information recording medium are provided.

The optical pickup apparatus in FIG. 8 is further provided with beam splitter 6 which splits the reflected light from information recording surface 5 toward the photo-detector 4, ¼ wavelength plate 7 located between coupling lens 2 and objective lens 1, diaphragm 8 located to be ahead. of objective lens 8, cylindrical lens 9 and actuator 10 for focus tracking. In other words, in the present embodiment, the light converging optical system has therein a beam splitter, a coupling lens, a ¼ wavelength plate, an objective lens and a diaphragm. Incidentally, in the present embodiment, the beam splitter may be regarded as one which is not included in a light converging optical system.

Objective lens 1 further has, on its outer circumference, flange portion 1a having a surface extending in the direction perpendicular to the optical axis. Due to this flange portion 1a, objective lens 1 can be attached accurately on the optical pickup apparatus.

The coupling lens 2 may also be a collimating lens which collimates an incident divergent light flux to be a light flux that is almost in parallel with an optical axis. In this case, it is preferable that light source 3 or collimating lens 2 is arranged to be movable in the direction of an optical axis of the collimating lens for adjustment so that a light flux emerging from the collimating lens 2 may nearly be collimated.

As stated above, the optical pickup apparatus of the invention may either be composed of a collimating lens for converting a divergent light flux from a light source into a mostly collimated light and of an objective lens for converging the collimated light on an information recording surface, or be composed of a coupling lens representing a converting lens which changes an angle of a divergent light flux from a light source and converts into a diverged light flux or a converged light flux and of an objective lens which converges a light flux emerging from the coupling lens on an information recording surface. The optical pickup apparatus may further be composed only of an objective lens (finite conjugational objective lens) for converging a divergent light flux from a light source on an information recording surface.

Then, it is possible to obtain a optical pickup apparatus capable of conducting high density recording and reproducing for an optical disk, by using an aspherical single objective lens of the invention for the aforesaid optical pickup apparatus.

EXAMPLE

Next, there will be explained Examples 1–15 each being for an objective lens and a optical pickup apparatus both of the invention and Examples 16–27 each being for a coupling lens and a coupling lens and a optical pickup apparatus. Incidentally, an example of the schematic structure of the optical pickup apparatus is like what is shown in FIG. 8 explained in an embodiment. The optical pickup apparatus of the invention was obtained by conducting selection of the standard wavelength of a semiconductor laser (setting of a light source), establishment such as usage or elimination of a coupling lens or usage of a collimating lens as a coupling lens, establishment of an aperture of diaphragm 8 and establishment of positions for arranging various parts, and by mounting an objective lens and a coupling lens of each example, so that the structures and conditions described in each example below may be satisfied.

First, an example of an objective lens will be explained. A list of data of Examples 1–15 is shown in Table 1 below. Incidentally, in Examples 1–15, Examples 6, 9 and 15 are for a plastic lens, and others are for a glass lens. An optical information recording medium in Example 5 has no transparent substrate. Each of optical information recording media in other Examples has a 0.1 mm-thick transparent

TABLE 1

| List of Examples | | 1 | 2 | 3 | 4 | 5 |
|---|---|---|---|---|---|---|
| f | | 1.76 | 1.76 | 1.76 | 1.76 | 0.13 |
| NA | | 0.85 | 0.75 | 0.85 | 0.75 | 0.83 |
| Wavelength (nm) | | 400 | 400 | 400 | 400 | 660 |
| d1/f | | 1.79 | 1.73 | 1.68 | 1.59 | 1.74 |
| f/vd | | 0.048 | 0.048 | 0.033 | 0.033 | 0.003 |
| vd | | 37.0 | 37.0 | 53.2 | 53.2 | 40.9 |
| r1/(n · f) | | 0.53 | 0.53 | 0.50 | 0.50 | 0.49 |
| n | | 1.85614 | 1.85614 | 1.71667 | 1.71667 | 1.79998 |
| Wave front aberration (λ rms) | Axial | 0.010 | 0.005 | 0.012 | 0.006 | 0.003 |
| | off-axis (Image height) | 0.054 (0.03 mm) | 0.029 (0.03 mm) | 0.060 (0.03 mm) | 0.033 (0.03 mm) | 0.019 (0.005 mm) |
| | (Angle of view) | (1°) | (1°) | (1°) | (1°) | (2°) |
| List of Examples | | 6 | 7 | 8 | 9 | 10 |
| f | | 2.65 | 1.76 | 1.76 | 1.76 | 1.76 |
| NA | | 0.85 | 0.85 | 0.85 | 0.85 | 0.85 |
| Wavelength (nm) | | 400 | 400 | 405 | 405 | 405 |
| d1/f | | 1.79 | 1.42 | 1.56 | 1.47 | 1.51 |
| f/vd | | 0.047 | 0.048 | 0.033 | 0.030 | 0.019 |
| vd | | 56.0 | 37.0 | 53.2 | 59.5 | 95.0 |
| r1/(n · f) | | 0.48 | 0.47 | 0.47 | 0.44 | 0.42 |
| n | | 1.56119 | 1.85614 | 1.71558 | 1.52523 | 1.44260 |
| Wave front aberration (λ rms) | Axial | 0.022 | 0.005 | 0.008 | 0.008 | 0.014 |
| | off-axis (Image height) | 0.121 (0.03 mm) | 0.070 (0.03 mm) | 0.063 (0.03 mm) | 0.098 (0.03 mm) | 0.118 (0.03 mm) |
| | (Angle of view) | (0.6°) | (1°) | (1°) | (1°) | (1°) |
| List of Examples | | 11 | 12 | 13 | 14 | 15 |
| f | | 1.76 | 1.76 | 1.76 | 1.76 | 1.76 |
| NA | | 0.85 | 0.85 | 0.85 | 0.85 | 0.85 |
| Wavelength (nm) | | 405 | 405 | 405 | 405 | 405 |
| d1/f | | 1.50 | 1.36 | 2.07 | 12.22 | 1.43 |
| f/vd | | 0.022 | 0.083 | 0.083 | 0.106 | 0.030 |
| vd | | 81.6 | 21.2 | 21.2 | 16.6 | 59.5 |
| r1/(n · f) | | 0.44 | 0.44 | 0.60 | 0.64 | 0.46 |
| n | | 1.50716 | 2.15857 | 2.15857 | 2.34860 | 1.52523 |
| Wave front aberration (λ rms) | Axial | 0.009 | 0.002 | 0.006 | 0.006 | 0.010 |
| | Off-axis (Image height) | 0.106 (0.03 mm) | 0.112 (0.03 mm) | 0.032 (0.03 mm) | 0.030 (0.03 mm) | 0.081 (0.03 mm) |
| | (Angle of view) | (1°) | (1°) | (1#) | (1°) | (1°) |

An objective lens in Examples 1–4 and Examples 6 and 7 is an infinite objective lens for the standard wavelength of 400 nm, and an objective lens in Examples 8–15 and Examples 6 and 7 is an infinite objective lens for the standard wavelength of 405 nm. In each of Examples 6 and 9, a protective layer of an information recording medium having a thickness of 0.1 mm is assumed to be positioned and a working distance of not less than 0.1 mm is provided between an objective lens and an image surface of an information recording medium, and plastic materials are used for the objective lens. An objective lens in Example 5 is an infinite objective lens for the standard wavelength of 660 nm.

Example 15 is one wherein a diffraction section is provided. Incidentally, the term described as "Off-axis" of "Wave front aberration" in Table 1 shows image height characteristics. Table 1 shows that image height characteristics in Example 1–Example 15 are excellent. In Example 8, wave front aberration caused by the first surface that is decentered by 1 μm is 0.021 λ which makes eccentricity sensitivity to be excellent because it is smaller than 0.035 λ. It was possible to make eccentricity sensitivity to be excellent even in other Examples.

With regard to an aspherical surface in the present example, it is expressed by the following expression when an x-axis is represented by the direction of an optical axis, a height in the direction perpendicular to the optical axis is represented by h, and a radius of curvature of the surface is represented by r, on the assumption that K represents a constant of the cone and $A_{2i}$ represents an aspherical surface coefficient.

$$x = \frac{h^2/r}{1+\sqrt{1-(1+K)h^2/r^2}} + \sum_{i=2} A_{2i}h^{2i}$$

Example 1

Lens data are shown in Table 2, and aspherical surface coefficients are shown in Table 3. The lens of Example 1 is shown in FIG. 1 wherein FIG. 1(a) is a sectional view and FIG. 1(b) is an aberration diagram.

λ (wavelength)=400 nm
f=1.765 mm
NA=0.85
Magnification=0

TABLE 2

|   | r(mm)    | d(mm) | n       | vd   |
|---|----------|-------|---------|------|
| 1* | 1.72078  | 3.150 | 1.85614 | 37.0 |
| 2* | −1.92753 | 0.213 |         |      |
| 3 | ∞        | 0.100 | 1.62158 | 30.0 |
| 4 | ∞        | 0.000 |         |      |

*: Aspherical surface

TABLE 3

| Aspherical surface coefficient | |
|---|---|
| First surface | Second surface |
| K = −0.319957 | K = −126.71803 |
| $A_4$ = −0.897201 × $10^{-3}$ | $A_4$ = 0.446627 × 1 |
| $A_6$ = −0.132966 × $10^{-2}$ | $A_6$ = −0.374370 × 10 |
| $A_8$ = 0.567005 × $10^{-3}$ | $A_8$ = 0.128630 × 10 |
| $A_{10}$ = −0.488314 × $10^{-3}$ | $A_{10}$ = −0.176551 × 10 |
| $A_{12}$ = 0.337127 × $10^{-4}$ | $A_{12}$ = 0.252229 × $10^{-3}$ |
| $A_{14}$ = 0.426690 × $10^{-4}$ | |
| $A_{16}$ = −0.200712 × $10^{-4}$ | |

Example 2

Figure 2A:
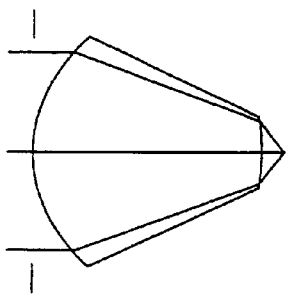
FIG. 2(*a*) shows a sectional view of an objective lens and FIG. 2(*b*) shows aberration diagrams of the objective lens in Example 2.
Figure 2B:
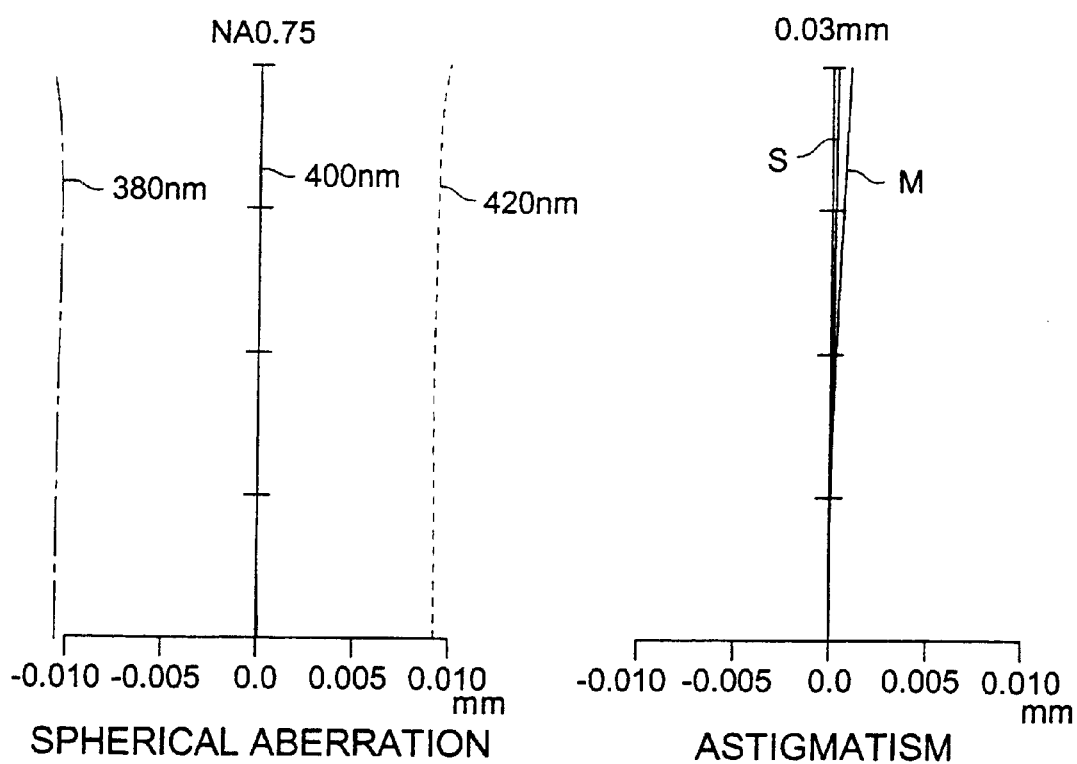

Lens data are shown in Table 4, and aspherical surface coefficients are shown in Table 5. The lens of Example 2 is shown in FIG. 2 wherein FIG. 2(a) is a sectional view and FIG. 2(b) is an aberration diagram.

λ (wavelength)=400 nm
f=1.765 mm
NA=0.75
Magnification=0

TABLE 4

|   | r(mm)    | d(mm) | n       | vd   |
|---|----------|-------|---------|------|
| 1* | 1.72793  | 3.037 | 1.85614 | 37.0 |
| 2* | −2.27646 | 0.272 |         |      |
| 3 | ∞        | 0.100 | 1.62158 | 30.0 |
| 4 | ∞        | 0.000 |         |      |

*: Aspherical surface

TABLE 5

| Aspherical surface coefficient | |
|---|---|
| First surface | Second surface |
| K = −0.332121 | K = −87.525272 |
| $A_4$ = −0.142338 × $10^{-2}$ | $A_4$ = 0.378863 × 1 |
| $A_6$ = −0.145971 × $10^{-2}$ | $A_6$ = −0.330567 × 10 |
| $A_8$ = 0.480431 × $10^{-3}$ | $A_8$ = 0.125735 × $10^2$ |
| $A_{10}$ = −0.506544 × $10^{-3}$ | $A_{10}$ = −0.193685 × $10^2$ |
| $A_{12}$ = 0.213333 × $10^{-4}$ | $A_{12}$ = −0.252229 × $10^{-3}$ |
| $A_{14}$ = 0.180460 × $10^{-4}$ | |
| $A_{16}$ = −0.104472 × $10^{-4}$ | |

Example 3

Figure 3:
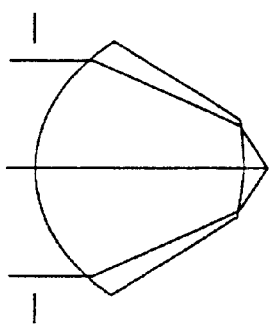
FIG. 3(*a*) shows a sectional view of an objective lens and FIG. 3(*b*) shows aberration diagrams of the objective lens in Example 3.
Figure 3:
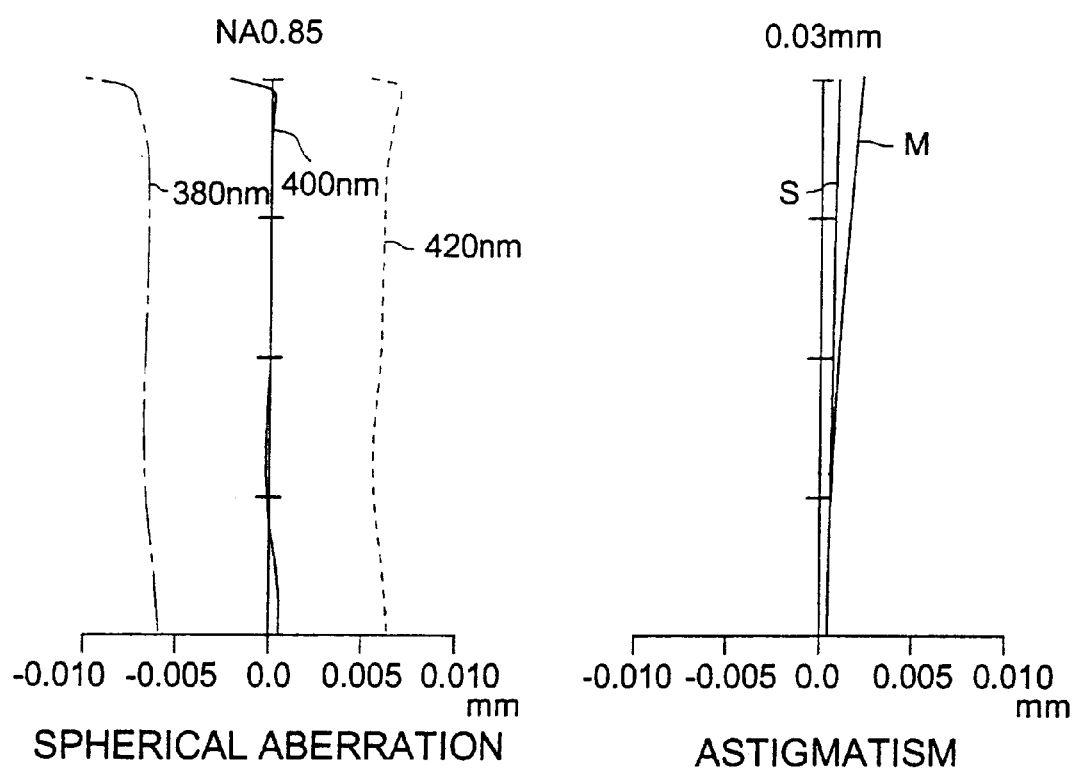

Lens data are shown in Table 6, and aspherical surface coefficients are shown in Table 7. The lens of Example 3 is shown in FIG. 3 wherein FIG. 3(a) is a sectional view and FIG. 3(b) is an aberration diagram.

λ (wavelength)=400 nm
f=1.765 mm
NA=0.85
Magnification=0

TABLE 6

|   | r(mm)    | d(mm) | n       | vd   |
|---|----------|-------|---------|------|
| 1* | 1.51143  | 2.946 | 1.71667 | 53.2 |
| 2* | −1.44415 | 0.267 |         |      |
| 3 | ∞        | 0.100 | 1.62158 | 30.0 |
| 4 | ∞        | 0.000 |         |      |

*: Aspherical surface

TABLE 7

| Aspherical surface coefficient | |
|---|---|
| First surface | Second surface |
| K = −0.435901 | K = −59.503252 |
| $A_4$ = 0.227660 × $10^{-2}$ | $A_4$ = 0.330895 × 1 |
| $A_6$ = −0.331034 × $10^{-2}$ | $A_6$ = −0.173954 × 10 |
| $A_8$ = 0.363944 × $10^{-2}$ | $A_8$ = 0.376531 × 10 |
| $A_{10}$ = −0.258170 × $10^{-2}$ | $A_{10}$ = −0.327613 × 10 |
| $A_{12}$ = 0.676932 × $10^{-3}$ | $A_{12}$ = −0.252229 × $10^{-3}$ |
| $A_{14}$ = 0.153229 × $10^{-4}$ | |
| $A_{16}$ = −0.463776 × $10^{-4}$ | |

Example 4

Figure 4:
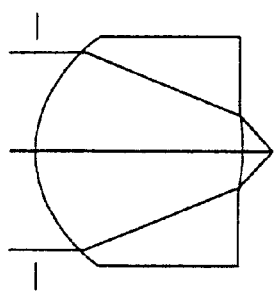
FIG. 4(*a*) shows a sectional view of an objective lens and FIG. 4(*b*) shows aberration diagrams of the objective lens in Example 4.
Figure 4:
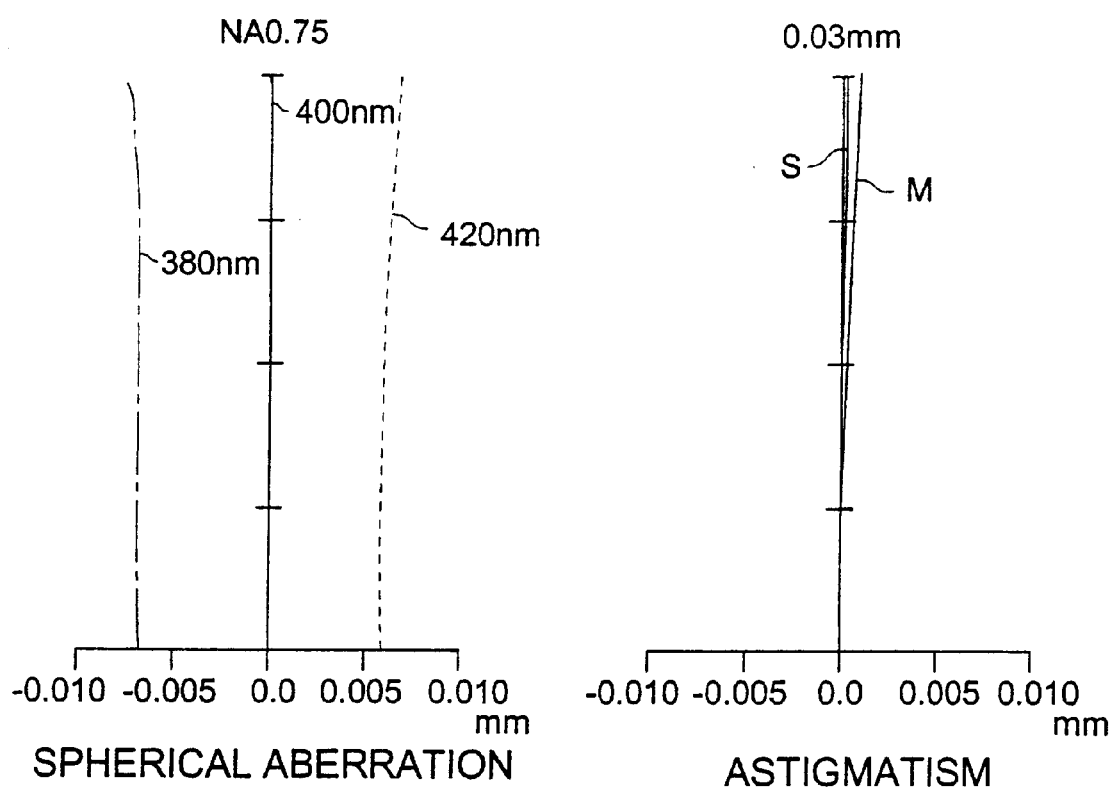

Lens data are shown in Table 8, and aspherical surface coefficients are shown in Table 9. The lens of Example 4 is shown in FIG. 4 wherein FIG. 4(a) is a sectional view and FIG. 4(b) is an aberration diagram.

λ (wavelength)=400 nm
f=1.765 mm
NA=0.75
Magnification=0

TABLE 8

|  | r(mm) | d(mm) | n | νd |
|---|---|---|---|---|
| 1* | 1.51629 | 2.801 | 1.71667 | 53.2 |
| 2* | −1.74496 | 0.342 |  |  |
| 3 | ∞ | 0.100 | 1.62158 | 30.0 |
| 4 | ∞ | 0.000 |  |  |

*: Aspherical surface

TABLE 9

Aspherical surface coefficient

| First surface | Second surface |
|---|---|
| K = −0.448813 | K = −46.678777 |
| $A_4 = 0.580310 \times 10^{-3}$ | $A_4 = 0.219283 \times 1$ |
| $A_6 = -0.158678 \times 10^{-2}$ | $A_6 = -0.124381 \times 10$ |
| $A_8 = 0.136862 \times 10^{-2}$ | $A_8 = 0.291780 \times 10$ |
| $A_{10} = -0.198562 \times 10^{-2}$ | $A_{10} = -0.280227 \times 10$ |
| $A_{12} = 0.114053 \times 10^{-2}$ | $A_{12} = -0.252229 \times 10^{-3}$ |
| $A_{14} = -0.438727 \times 10^{-3}$ |  |
| $A_{16} = 0.508367 \times 10^{-4}$ |  |

Example 5

Figure 5:
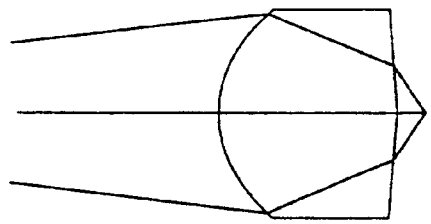
FIG. 5(*a*) shows a sectional view of an objective lens and FIG. 5(*b*) shows aberration diagrams of the objective lens in Example 5.
Figure 5:
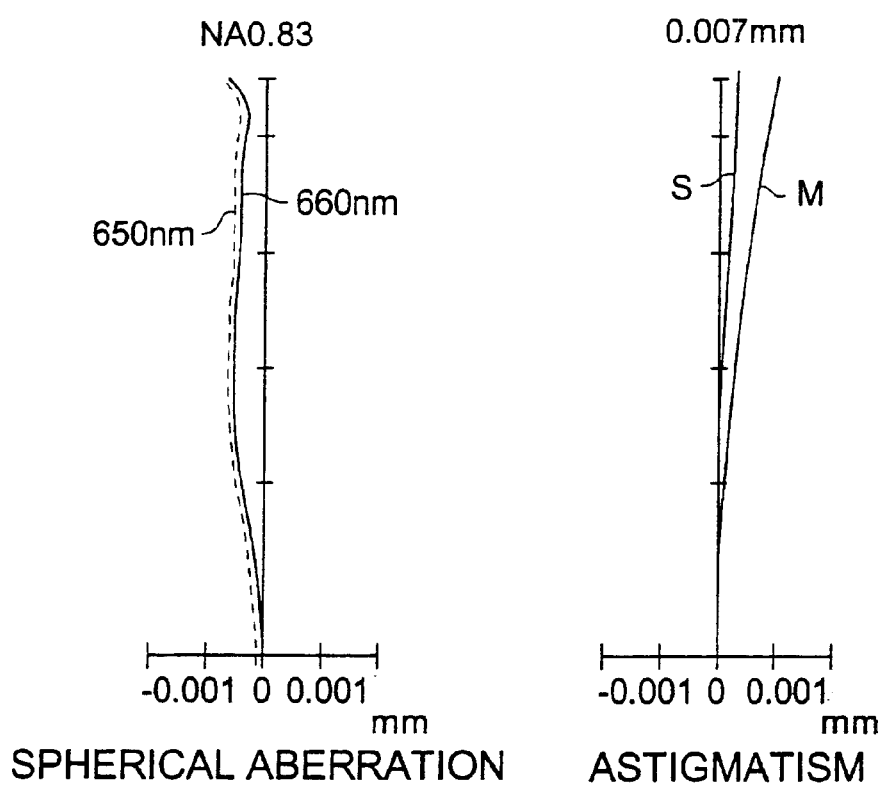

Lens data are shown in Table 10, and aspherical surface coefficients are shown in Table 11. The lens of Example 5 is shown in FIG. 5 wherein FIG. 5(a) is a sectional view and FIG. 5(b) is an aberration diagram.

λ (wavelength)=660 nm
f=0.131 mm
NA=0.83
Magnification=−0.1456

TABLE 10

|  | r(mm) | d(mm) | n | νd |
|---|---|---|---|---|
| 1* | 0.115 | 0.226 | 1.79998 | 40.9 |
| 2* | −0.147 | 0.000 |  |  |

*: Aspherical surface

TABLE 11

Aspherical surface coefficient

| First surface | Second surface |
|---|---|
| K = −0.3946 | K= −77.181 |
| $A_4 = -0.78479 \times 10$ | $A_4 = 0.24008 \times 10^2$ |
| $A_6 = -0.23519 \times 10^4$ | $A_6 = -0.10585 \times 10^5$ |
| $A_8 = 0.56266 \times 10^5$ | $A_8 = 0.93242 \times 10^6$ |
| $A_{10} = -0.27400 \times 10^7$ | $A_{12} = -0.10004 \times 10^{10}$ |
| $A_{12} = -0.20657 \times 10^9$ |  |
| $A_{14} = 0.75407 \times 10^7$ |  |
| $A_{16} = -0.35744 \times 10^{11}$ |  |

Example 6

Figure 6:
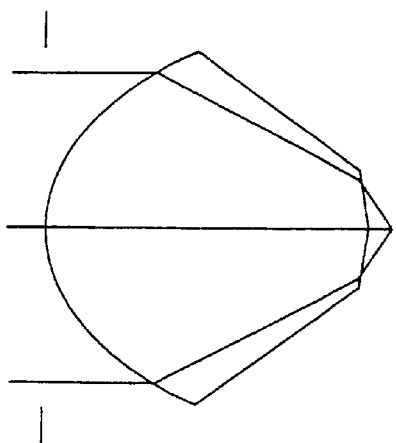
FIG. 6(*a*) shows a sectional view of an objective lens and FIG. 6(*b*) shows aberration diagrams of the objective lens in Example 6.
Figure 6:
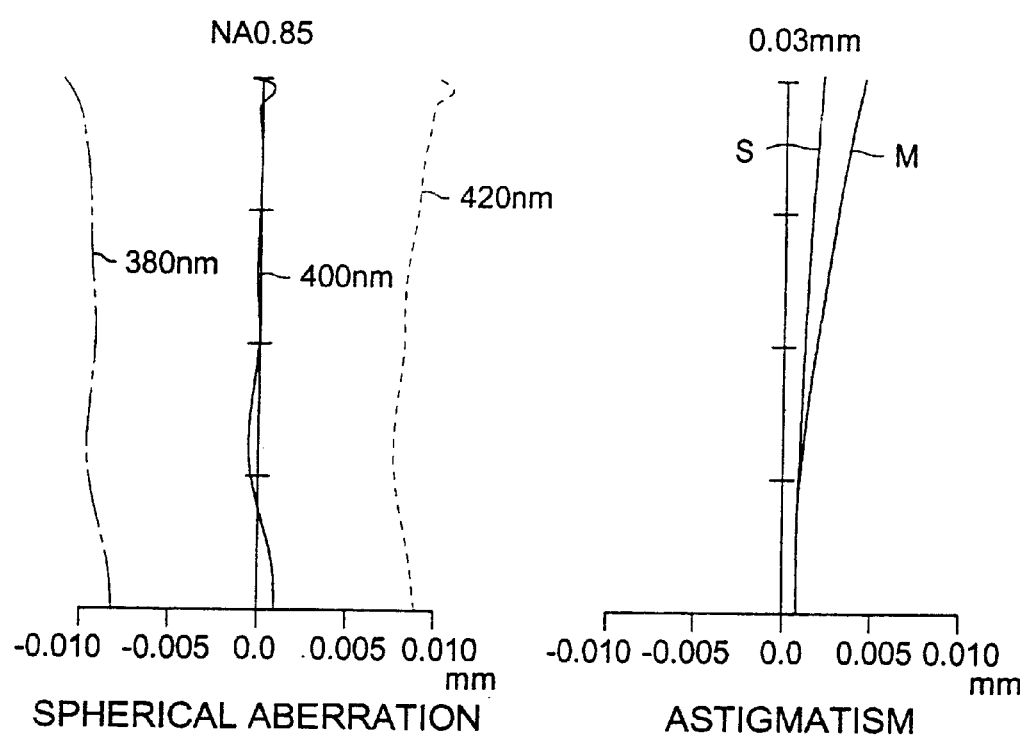

Lens data are shown in Table 12, and aspherical surface coefficients are shown in Table 13. The lens of Example 6 is shown in FIG. 6 wherein FIG. 6(a) is a sectional view and FIG. 6(b) is an aberration diagram.

λ (wavelength)=400 nm
f=2.647 mm
NA=0.85
Magnification=0

TABLE 12

|  | r(mm) | d(mm) | n | νd |
|---|---|---|---|---|
| 1* | 1.97771 | 4.748 | 1.56119 | 56.0 |
| 2* | −0.81768 | 0.300 |  |  |
| 3 | ∞ | 0.100 | 1.62158 | 30.0 |
| 4 | ∞ | 0.000 |  |  |

*: Aspherical surface

TABLE 13

Aspherical surface coefficient

| First surface | Second surface |
|---|---|
| K = −0.576418 | K = −19.183803 |
| $A_4 = 0.265281 \times 10^{-2}$ | $A_4 = 0.335865 \times 1$ |
| $A_6 = -0.413751 \times 10^{-3}$ | $A_6 = -0.922525 \times 1$ |
| $A_8 = 0.317393 \times 10^{-3}$ | $A_8 = 0.116730 \times 10$ |
| $A_{10} = -0.591851 \times 10^{-4}$ | $A_{10} = -0.591738 \times 1$ |
| $A_{12} = -0.442060 \times 10^{-5}$ | $A_{12} = -0.291540 \times 10^{-5}$ |
| $A_{14} = 0.362723 \times 10^{-5}$ |  |
| $A_{16} = -0.412233 \times 10^{-6}$ |  |

Example 7

Figure 7A:
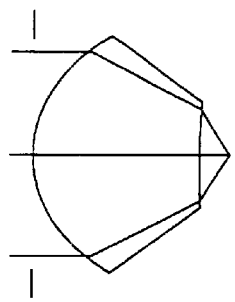
FIG. 7(*a*) shows a sectional view of an objective lens and FIG. 7(*b*) shows aberration diagrams of the objective lens in Example 7.
Figure 7B:
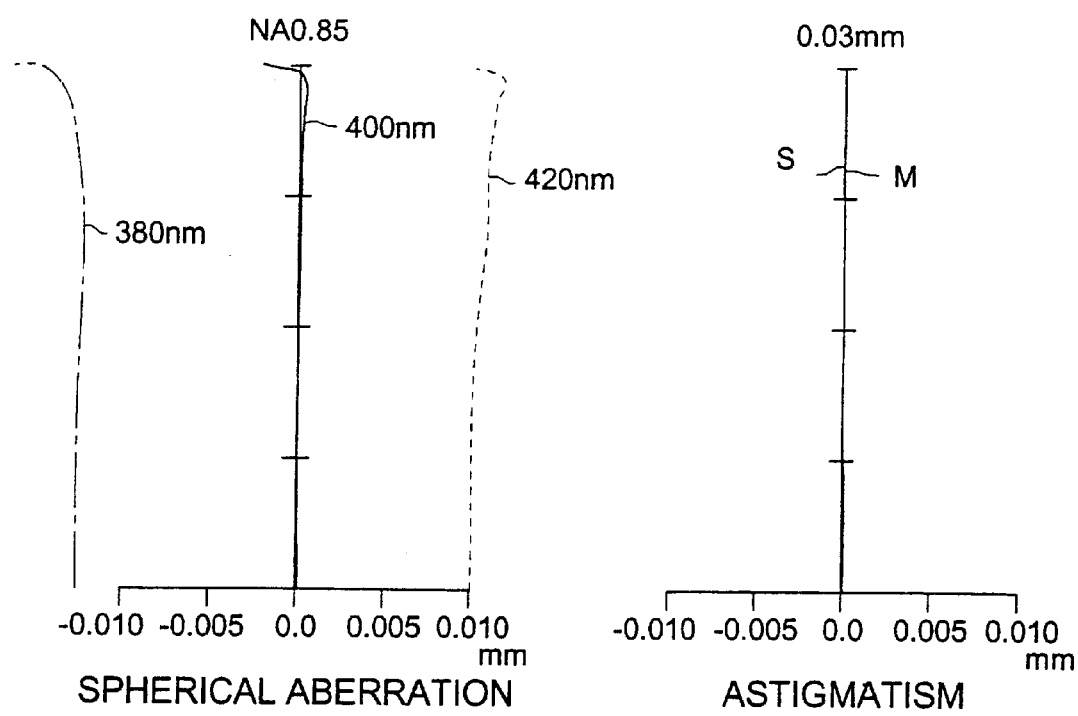

Lens data are shown in Table 14, and aspherical surface coefficients are shown in Table 15. The lens of Example 7 is shown in FIG. 7 wherein FIG. 7(a) is a sectional view and FIG. 7(b) is an aberration diagram.

λ (wavelength)=400 nm
f=1.765 mm
NA=0.85
Magnification=0

TABLE 14

|  | r(mm) | d(mm) | n | νd |
|---|---|---|---|---|
| 1* | 1.53773 | 2.500 | 1.85614 | 37.0 |
| 2* | −21.60833 | 0.380 |  |  |
| 3 | ∞ | 0.100 | 1.62158 | 30.0 |
| 4 | ∞ | 0.000 |  |  |

*: Aspherical surface

TABLE 15

Aspherical surface coefficient

| First surface | Second surface |
|---|---|
| K = −0.329489 | K = 199.72542 |
| $A_4 = -0.168113 \times 10^{-2}$ | $A_4 = 0.344557 \times 1$ |
| $A_6 = -0.913997 \times 10^{-3}$ | $A_6 = -0.119299 \times 10$ |
| $A_8 = -0.127668 \times 10^{-3}$ | $A_8 = 0.181507 \times 10$ |
| $A_{10} = -0.319026 \times 10^{-3}$ | $A_{10} = -0.110457 \times 10$ |
| $A_{12} = 0.691773 \times 10^{-4}$ | $A_{12} = -0.252229 \times 10^{-3}$ |
| $A_{14} = -0.241646 \times 10^{-4}$ |  |
| $A_{16} = -0.187683 \times 10^{-4}$ |  |

Example 8

Figure 9:
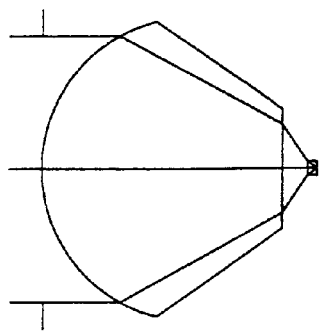
FIG. 9 shows a sectional view of an objective lens in Example 8.
Figure 10:
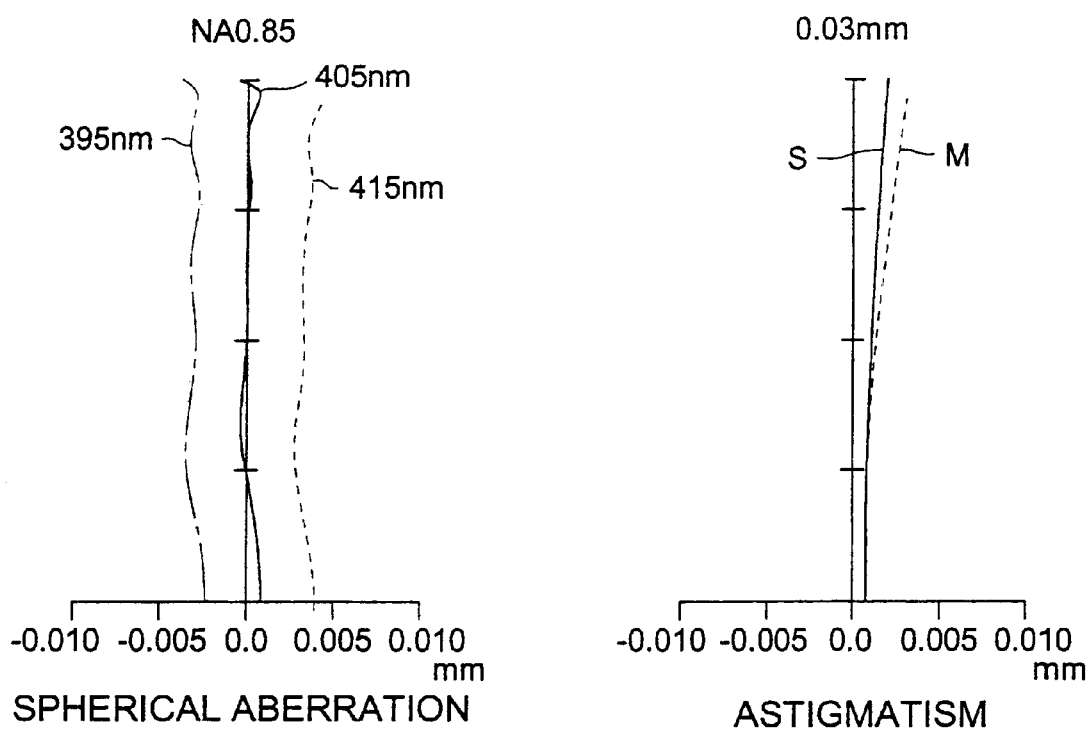
FIG. 10 shows aberration diagrams of the objective lens in Example 8.

Lens data and aspherical surface coefficients are shown in Table 16. A sectional view of the objective lens of Example 8 is shown in FIG. 9, and an aberration diagram thereof is shown in FIG. 10.

TABLE 16

Example 8
λ = 405[nm]
f = 1.765[mm]
Magnification = 0

| | r(mm) | d(mm) | n | νd |
|---|---|---|---|---|
| 1* | 1.43376 | 2.750 | 1.71558 | 53.2 |
| 2* | −2.11753 | 0.290 | | |
| 3 | ∞ | 0.100 | 1.61950 | 30.0 |
| 4 | ∞ | 0.000 | | |

Aspherical surface coefficient

| First surface | Second surface |
|---|---|
| K = −0.452646 | K = −185.75159 |
| $A_4$ = 0.571669E − 02 | $A_4$ = 0.281279E + 00 |
| $A_6$ = −0.591147E − 02 | $A_6$ = −0.742134E + 00 |
| $A_8$ = 0.721339E − 02 | $A_8$ = 0.667680E + 00 |
| $A_{10}$ = −0.398819E − 02 | $A_{10}$ = −0.195290E + 00 |
| $A_{12}$ = 0.390519E − 03 | $A_{12}$ = −0.252228E − 03 |
| $A_{14}$ = 0.446956E − 03 | |
| $A_{16}$ = −0.135385E − 03 | |

*: Aspherical surface

Example 9

Figure 11:
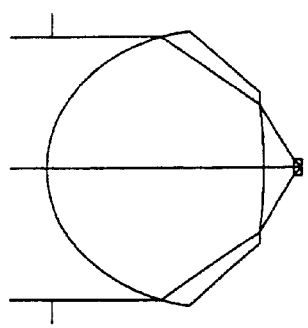
FIG. 11 shows a sectional view of an objective lens in Example 9.
Figure 12:
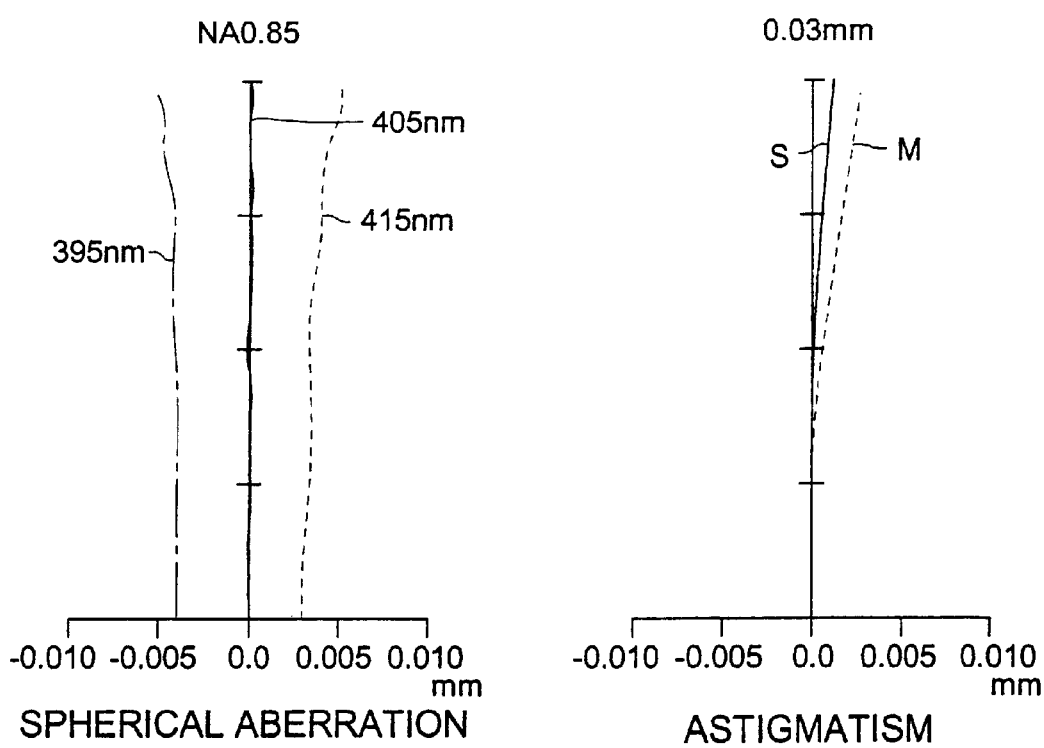
FIG. 12 shows aberration diagrams of the objective lens in Example 9.

Lens data and aspherical surface coefficients are shown in Table 17. A sectional view of the objective lens of Example 9 is shown in FIG. 11, and an aberration diagram thereof is shown in FIG. 12.

TABLE 17

Example 9
λ = 405[nm]
f = 1.765[mm]
NA = 0.85
Magnification = 0

| | r(mm) | d(mm) | n | νd |
|---|---|---|---|---|
| 1* | 1.17503 | 2.602 | 1.52523 | 59.5 |
| 2* | −1.04152 | 0.357 | | |
| 3 | ∞ | 0.100 | 1.61950 | 30.0 |
| 4 | ∞ | 0.000 | | |

Aspherical surface coefficient

| First surface | Second surface |
|---|---|
| K = −0.682004 | K = −29.373780 |
| $A_4$ = 0.180213E − 01 | $A_4$ = 0.297543E + 00 |
| $A_6$ = 0.368416E − 02 | $A_6$ = −0.423018E + 00 |
| $A_8$ = 0.140365E − 02 | $A_8$ = 0.295535E + 00 |
| $A_{10}$ = 0.342876E − 03 | $A_{10}$ = −0.829290E − 01 |
| $A_{12}$ = −0.311534E − 04 | $A_{12}$ = −0.252257E − 03 |
| $A_{14}$ = 0.103341E − 03 | |
| $A_{16}$ = 0.141728E − 04 | |

*: Aspherical surface

Example 10

Figure 13:
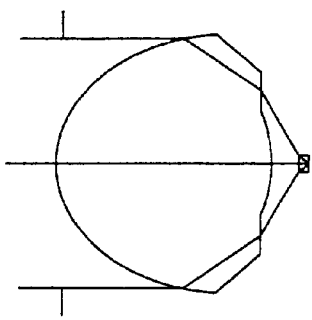
FIG. 13 shows a sectional view of an objective lens in Example 10.
Figure 14:
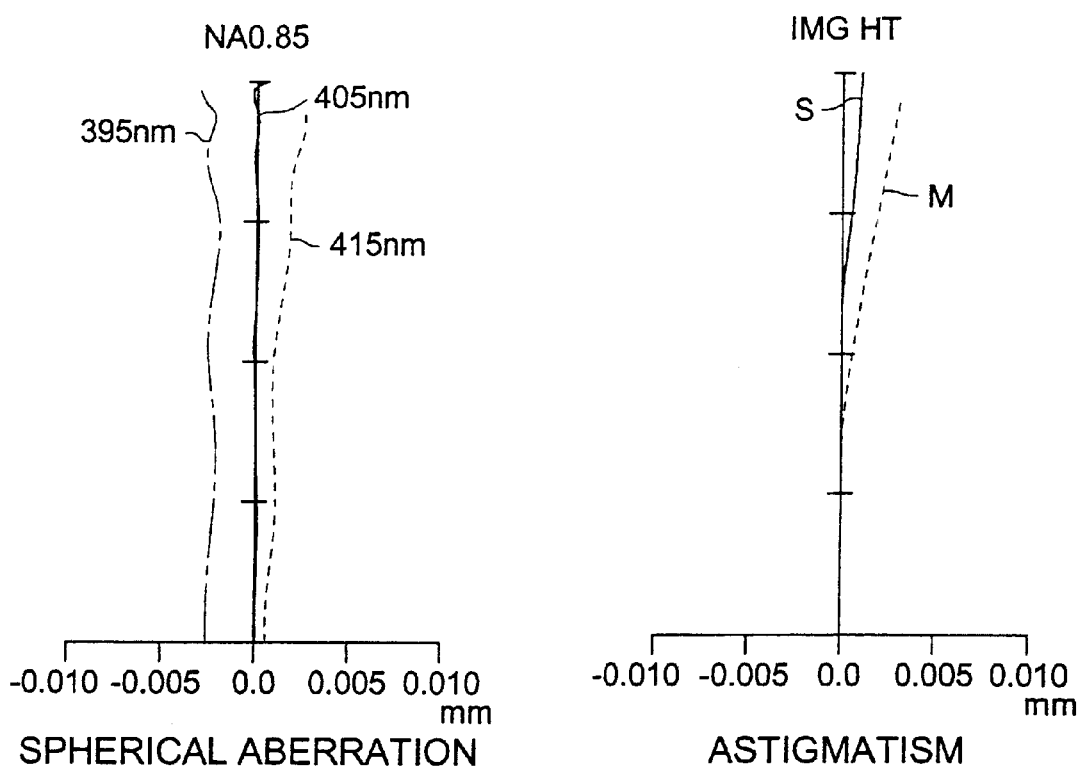
FIG. 14 shows aberration diagrams of the objective lens in Example 10.

Lens data and aspherical surface coefficients are shown in Table 18. A sectional view of the objective lens of Example 10 is shown in FIG. 13, and an aberration diagram thereof is shown in FIG. 14.

TABLE 18

Example 10
λ = 405[nm]
f = 1.765[nm]
NA = 0.85
Magnification = 0

| | r(mm) | d(mm) | n | νd |
|---|---|---|---|---|
| 1* | 1.07547 | 2.657 | 1.44260 | 95.0 |
| 2* | −0.69088 | 0.366 | | |
| 3 | ∞ | 0.100 | 1.61950 | 30.0 |
| 4 | ∞ | 0.000 | | |

Aspherical surface coefficient

| First surface | Second surface |
|---|---|
| K = −0.700141 | K = −12.891107 |
| $A_4$ = 0.190496E − 01 | $A_4$ = 0.262567E + 00 |
| $A_6$ = 0.502475E − 02 | $A_6$ = −0.355053E + 00 |
| $A_8$ = 0.115240E − 02 | $A_8$ = 0.236709E + 00 |
| $A_{10}$ = 0.134395E − 03 | $A_{10}$ = −0.631951E − 01 |
| $A_{12}$ = 0.369702E − 04 | $A_{12}$ = −0.253345E − 03 |
| $A_{14}$ = 0.315362E − 03 | |
| $A_{16}$ = −0.398715E − 04 | |

*: Aspherical surface

Example 11

Figure 15:
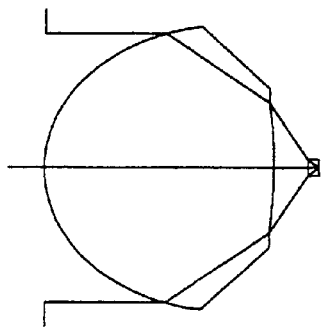
FIG. 15 shows a sectional view of an objective lens in Example 11.
Figure 16:
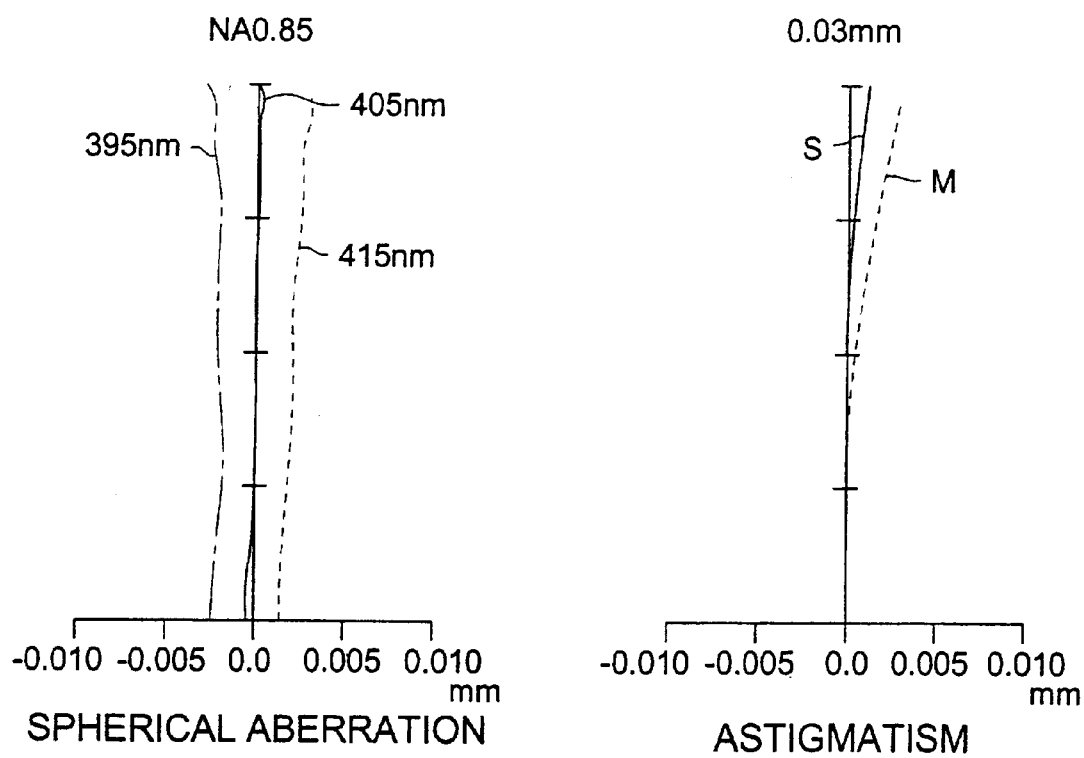
FIG. 16 shows aberration diagrams of the objective lens in Example 11.

Lens data and aspherical surface coefficients are shown in Table 19. A sectional view of the objective lens of Example 11 is shown in FIG. 15, and an aberration diagram thereof is shown in FIG. 16.

TABLE 19

Example 11
λ = 405[nm]
f = 1.765[mm]
NA = 0.85
Magnification = 0

| | r(mm) | d(mm) | n | νd |
|---|---|---|---|---|
| 1* | 1.15821 | 2.647 | 1.50716 | 81.6 |
| 2* | −0.90947 | 0.346 | | |
| 3 | ∞ | 0.100 | 1.61950 | 30.0 |
| 4 | ∞ | 0.000 | | |

Aspherical surface coefficient

| First surface | Second surface |
|---|---|
| K = −0.661186 | K = −24.300945 |
| $A_4$ = 0.159215E − 01 | $A_4$ = 0.296712E + 00 |
| $A_6$ = 0.483822E − 02 | $A_6$ = −0.416550E + 00 |
| $A_8$ = −0.630221E − 03 | $A_8$ = 0.289015E + 00 |
| $A_{10}$ = 0.130734E − 02 | $A_{10}$ = −0.807695E − 01 |
| $A_{12}$ = −0.585454E − 04 | $A_{12}$ = −0.252243E − 03 |
| $A_{14}$ = −0.503797E − 04 | |
| $A_{16}$ = 0.569157E − 04 | |

*: Aspherical surface

Example 12

Figure 17:
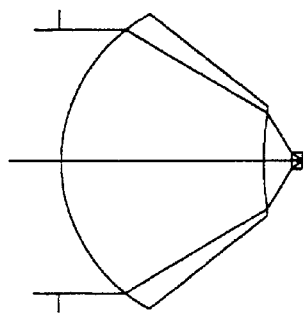
FIG. 17 shows a sectional view of an objective lens in Example 12.
Figure 18:
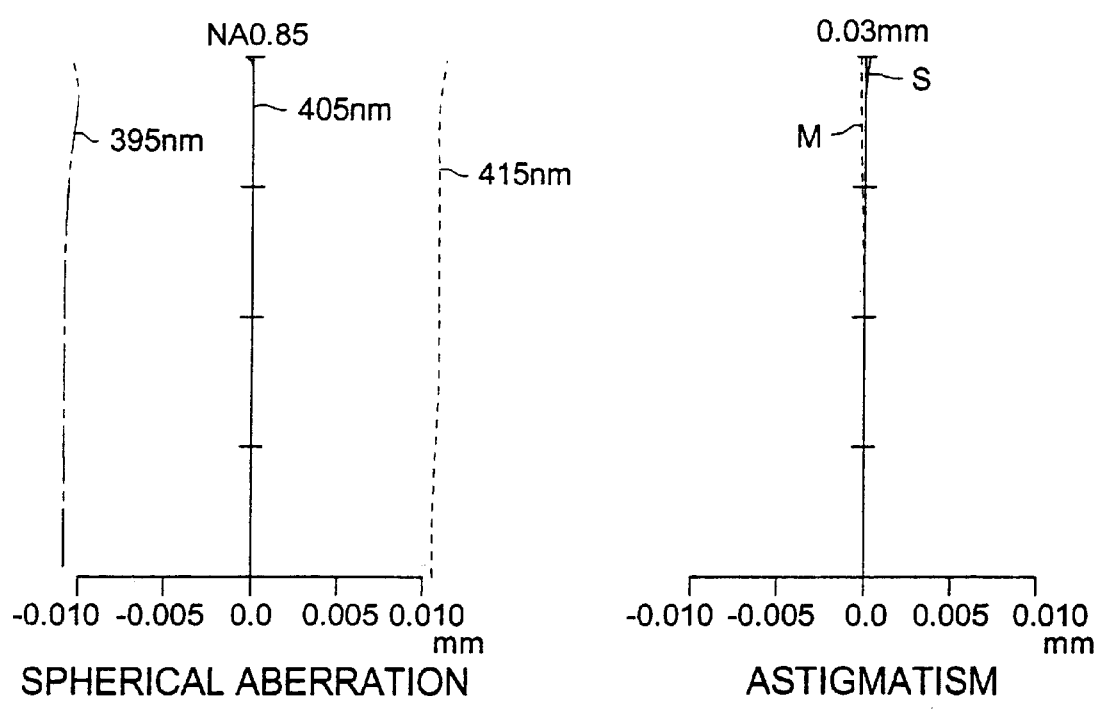
FIG. 18 shows aberration diagrams of the objective lens in Example 12.

Lens data and aspherical surface coefficients are shown in Table 20. A sectional view of the objective lens of Example 12 is shown in FIG. 17, and an aberration diagram thereof is shown in FIG. 18.

TABLE 20

Example 12
λ = 405[nm]
f = 1.765[mm]
NA = 0.85
Magnification = 0

| | r(mm) | d(mm) | n | νd |
|---|---|---|---|---|
| 1* | 1.69377 | 2.400 | 2.15857 | 21.2 |
| 2* | 2.36431 | 0.361 | | |
| 3 | ∞ | 0.100 | 1.61950 | 30.0 |
| 4 | ∞ | 0.000 | | |

Aspherical surface coefficient

| First surface | Second surface |
|---|---|
| K = −0.413733 | K = −9.944350 |
| $A_4$ = 0.330545E − 02 | $A_4$ = 0.834366E − 01 |
| $A_6$ = −0.226795E − 03 | $A_6$ = −0.534921E + 00 |
| $A_8$ = 0.133470E − 02 | $A_8$ = 0.647444E + 00 |
| $A_{10}$ = −0.133780E − 02 | $A_{10}$ = −0.195829E + 00 |
| $A_{12}$ = 0.654514E − 03 | $A_{12}$ = −0.252217E − 03 |
| $A_{14}$ = −0.152871E − 03 | |
| $A_{16}$ = 0.488831E − 05 | |

*: Aspherical surface

Example 13

Figure 19:
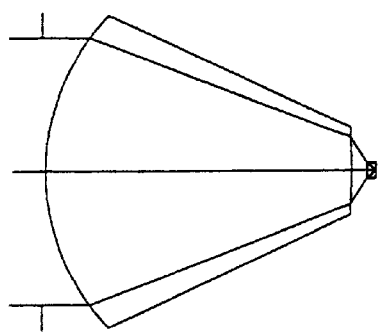
FIG. 19 shows a sectional view of an objective lens in Example 13.
Figure 20:
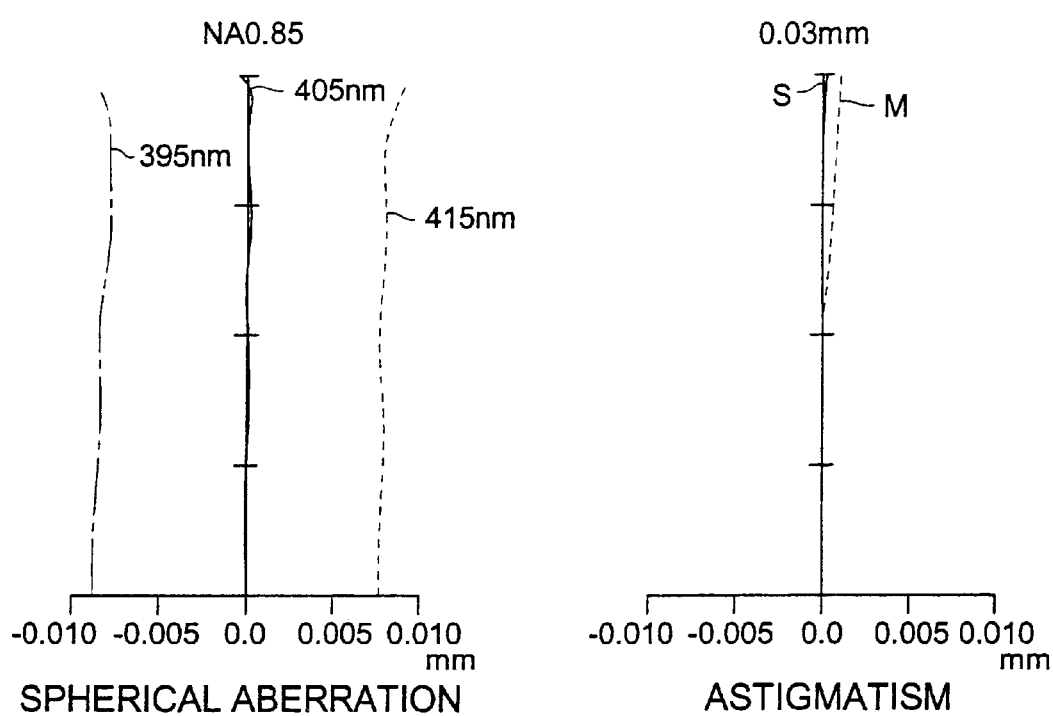
FIG. 20 shows aberration diagrams of the objective lens in Example 13.

Lens data and aspherical surface coefficients are shown in Table 21. A sectional view of the objective lens of Example 13 is shown in FIG. 19, and an aberration diagram thereof is shown in FIG. 20.

TABLE 21

Example 13
λ = 405[nm]
f = 1.765[mm]
NA = 0.85
Magnification = 0

| | r(mm) | d(mm) | n | νd |
|---|---|---|---|---|
| 1* | 2.30000 | 3.650 | 2.15857 | 21.2 |
| 2* | −2.73024 | 0.200 | | |
| 3 | ∞ | 0.100 | 1.61950 | 30.0 |
| 4 | ∞ | 0.000 | | |

Aspherical surface coefficient

| First surface | Second surface |
|---|---|
| K = −0.456357 | K = −219.93144 |
| $A_4$ = 0.712833E − 03 | $A_4$ = −0.962060E − 01 |
| $A_6$ = −0.604365E − 03 | $A_6$ = −0.200434E + 00 |
| $A_8$ = 0.898662E − 03 | $A_8$ = 0.741851E + 00 |
| $A_{10}$ = −0.133726E − 02 | $A_{10}$ = −0.292121E + 00 |
| $A_{12}$ = 0.785181E − 03 | $A_{12}$ = −0.252226E − 03 |
| $A_{14}$ = −0.223083E − 03 | |
| $A_{16}$ = 0.199958E − 04 | |

*: Aspherical surface

Example 14

Figure 21:
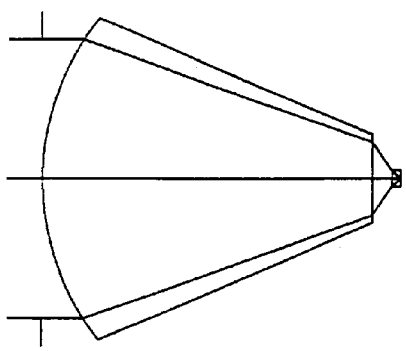
FIG. 21 shows a sectional view of an objective lens in Example 14.
Figure 22:
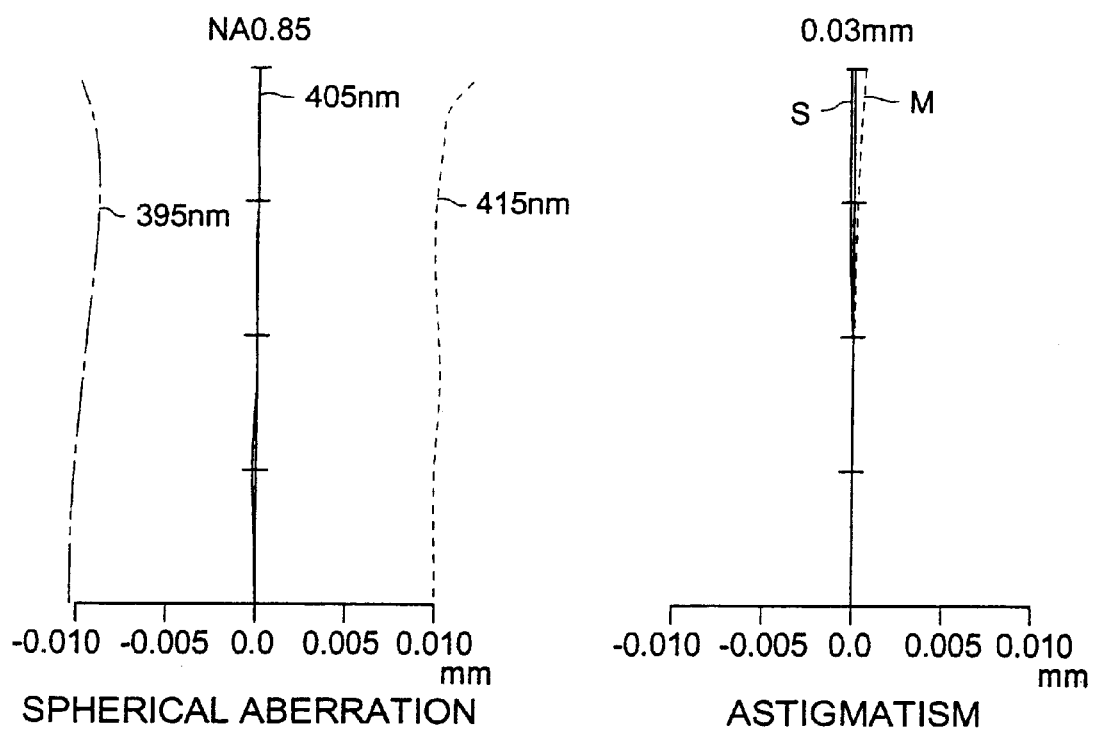
FIG. 22 shows aberration diagrams of the objective lens in Example 14.

Lens data and aspherical surface coefficients are shown in Table 22. A sectional view of the objective lens of Example 14 is shown in FIG. 21, and an aberration diagram thereof is shown in FIG. 22.

TABLE 22

Example 14
λ = 405[nm]
f = 1.765[mm]
NA = 0.85
Magnification = 0

| | r(mm) | d(mm) | n | νd |
|---|---|---|---|---|
| 1* | 2.64228 | 3.919 | 2.34860 | 16.6 |
| 2* | −3.55612 | 0.200 | | |
| 3 | ∞ | 0.100 | 1.61950 | 30.0 |
| 4 | ∞ | 0.000 | | |

Aspherical surface coefficient

| First surface | Second surface |
|---|---|
| K = −0.467576 | K = −321.19491 |
| $A_4$ = 0.555792E − 03 | $A_4$ = −0.195720E + 00 |
| $A_6$ = −0.149475E − 02 | $A_6$ = 0.310925E + 00 |
| $A_8$ = 0.178501E − 02 | $A_8$ = −0.244958E + 00 |
| $A_{10}$ = −0.157718E − 02 | $A_{10}$ = 0.486778E − 01 |
| $A_{12}$ = 0.651169E − 03 | $A_{12}$ = −0.252220E − 03 |
| $A_{14}$ = −0.127250E − 03 | |
| $A_{16}$ = 0.484981E − 05 | |

*: Aspherical surface

Example 15

Figure 23:
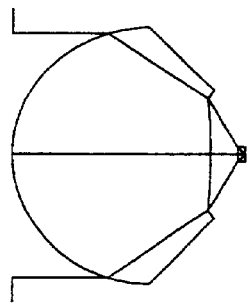
FIG. 23 shows a sectional view of an objective lens in Example 15.
Figure 24:
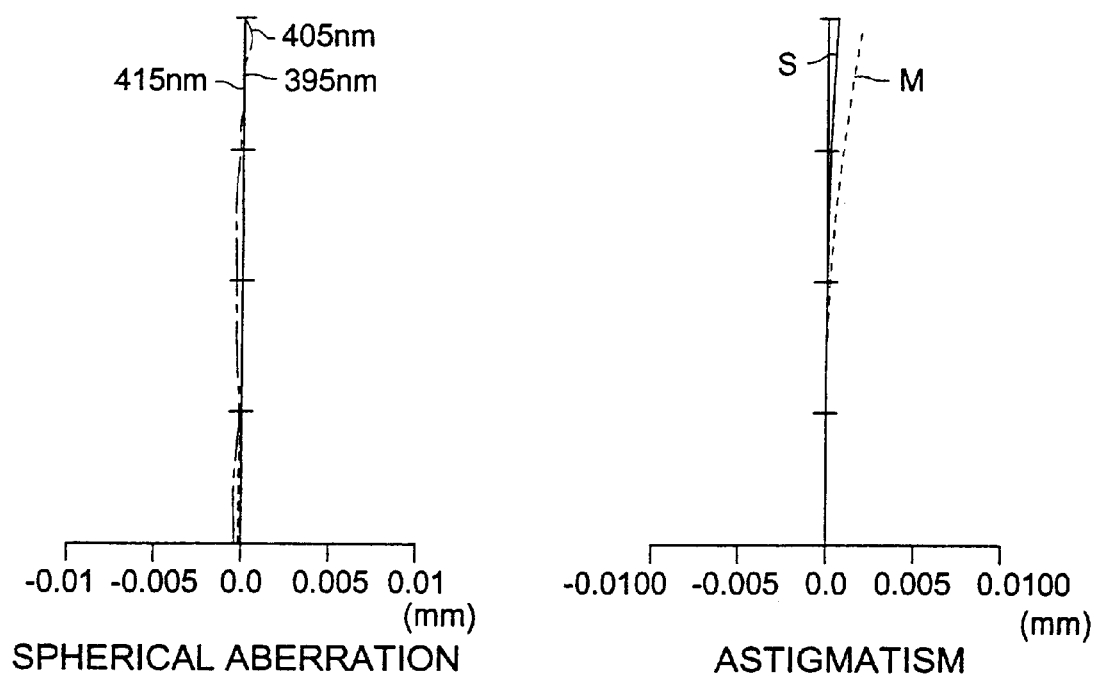
FIG. 24 shows aberration diagrams of the objective lens in Example 15.

Lens data and aspherical surface coefficients are shown in Table 23. A sectional view of the objective lens of Example 15 is shown in FIG. 23, and an aberration diagram thereof is shown in FIG. 24.

TABLE 23

Example 15
λ = 405[nm]
f = 1.765[mm]
NA = 0.85
Magnification = 0

| | r(mm) | d(mm) | n | νd |
|---|---|---|---|---|
| 1 (Aspherical surface 1, Diffraction surface 1) | 1.23647 | 2.532 | 1.52523 | 59.5 |
| 2 (Aspherical surface 2) | −1.18419 | 0.336 | | |
| 3 | ∞ | 0.100 | 1.61950 | 30.0 |
| 4 | ∞ | 0.000 | | |

| Aspherical surface 1 | Diffraction surface 1 |
|---|---|
| K = −0.68816 | $b_2$ = −0.20985E−01 |
| $A_4$ = 0.17621E−01 | $b_4$ = −0.26478E−02 |
| $A_6$ = 0.32160E−02 | $b_6$ = −0.31346E−03 |
| $A_8$ = 0.17762E−02 | $b_8$ = −0.63327E−04 |
| $A_{10}$ = 0.28747E−03 | $b_{10}$ = −0.45002E−04 |
| $A_{12}$ = −0.17669E−03 | $b_{12}$ = −0.20458E−04 |
| $A_{14}$ = 0.94949E−04 | $b_{14}$ = −0.10510E−04 |
| $A_{16}$ = 0.17955E−04 | $b_{16}$ = 0.36615E−05 |

Aspherical surface 2

K = −41.704463
$A_4$ = 0.362699E+00
$A_6$ = −0.534069E+00
$A_8$ = 0.354745E+00
$A_{10}$ = −0.793612E−01
$A_{12}$ = −0.252257E−03

Incidentally, the diffraction surface can be expressed by the following expression as optical path difference function Φb, (which also applies to Example 26 explained later). In this case, h represents a height in the direction perpendicular to an optical axis, and b represents a coefficient of the optical path difference function.

$$\Phi_b = \sum_{i=1}^{\infty} b_{2i} h^{2i}$$

As stated above, in Examples 1–15, it was possible to obtain an aspherical single objective lens having a large numerical aperture and excellent image height characteristics as an objective lens for a optical pickup apparatus. For example, it was possible to obtain a single objective lens wherein the numerical aperture is 0.85 for wavelength of 400 nm, and rms of the wave front aberration is not more than 0.07 $\lambda$ ($\lambda$ is a wavelength) for an image height at an angle of view of 1°, as shown in Example 1. Namely, it was possible to obtain an aspherical single objective lens for a optical pickup apparatus which has a large numerical aperture of 0.65 or more and excellent image height characteristics and is suitable for a high density recording and reproducing apparatus.

Further, in Examples 1–15, eccentricity sensitivity can be made excellent and spherical aberration and coma can be corrected satisfactorily.

Next, an example of a coupling lens will be explained. Table 24 below shows a list of data for Examples 16–27. Incidentally, objective lenses in Examples 16, 17, 20, 21 and 22 are the same as that in Example 8, objective lenses in Examples 18, 19, 23, 24, 25 and 26 are the same as that in Example 9, and an objective lens in Example 27 is the same as that in Example 13.

TABLE 24

| Example | 16 | 17 | 18 | 19 | 20 | 21 |
|---|---|---|---|---|---|---|
| Material of an objective lens | Glass | Glass | Plastic | Plastic | Glass | Glass |
| Focal length of an objective lens | 1.765 | 1.765 | 1.765 | 1.765 | 1.765 | 1.765 |
| NA of an objective lens | 0.85 | 0.85 | 0.85 | 0.85 | 0.85 | 0.85 |
| Standard wavelength | 405 nm | 405 nm | 405 nm | 405 nm | 405 nm | 405 nm |
| Structure of a coupling lens | Spherical doublet | Spherical doublet | Spherical doublet | Spherical doublet | Aspherical doublet | Aspherical doublet |
| Divergent angle of a light flux emerging from a coupling lens | Collimated light flux | Collimated light flux | Collimated light flux | Collimated light flux | Collimated light flux | Collimated light flux |
| $0.1 \leq |m| \leq 0.5$ (m < 0) | 0.20 | 0.13 | 0.20 | 0.13 | 0.33 | 0.20 |
| $\delta fb \cdot NA^2 \leq 0.25\ \mu m$ | 0.14 | 0.087 | 0.16 | 0.12 | 0.071 | 0.034 |
| $0.02\ \mu m \leq \delta fb \cdot NA^2 \leq 0.15\ \mu m$ | | | | | | |
| ($\delta fb$) | 0.19 | 0.12 | 0.22 | 0.17 | 0.098 | 0.047 |
| Example | 22 | 23 | 24 | 25 | 26 | 27 |
| Material of an objective lens | Glass | Plastic | Plastic | Plastic | Plastic | Glass having high refractive index |
| Focal length of an objective lens | 1.765 | 1.765 | 1.765 | 1.765 | 1.765 | 1.765 |
| NA of an objective lens | 0.85 | 0.85 | 0.85 | 0.85 | 0.85 | 0.85 |
| Standard wavelength | 405 nm | 405 nm | 405 nm | 405 nm | 405 nm | 405 nm |

TABLE 24-continued

| Structure of a coupling lens | Aspherical doublet | Aspherical doublet | Aspherical doublet | Aspherical doublet | Single diffraction lens | Aspherical doublet |
|---|---|---|---|---|---|---|
| Divergent angle of a light flux emerging from a coupling lens | Collimated light flux | Collimated light flux | Collimated light flux | Collimated light flux | Collimated light flux | Collimated light flux |
| $0.1 \leq |m| \leq 0.5$ (m < 0) | 0.13 | 0.33 | 0.20 | 0.13 | 0.29 | 0.10 |
| $\delta fb \cdot NA^2 \leq 0.25 \mu m$ | 0.0031 | 0.10 | 0.060 | 0.031 | 0.12 | 0.06 |
| $0.02 \mu m \leq \delta fb \cdot NA^2 \leq 0.15 \mu m$ ($\delta fb$) | 0.0043 | 0.14 | 0.083 | 0.043 | 0.17 | 0.08 |

Example 16

Figure 25:
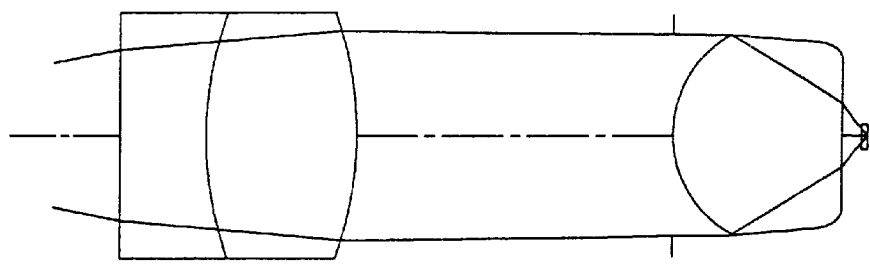
FIG. 25 shows sectional views of a coupling lens and an objective lens in Example 16.
Figure 26:
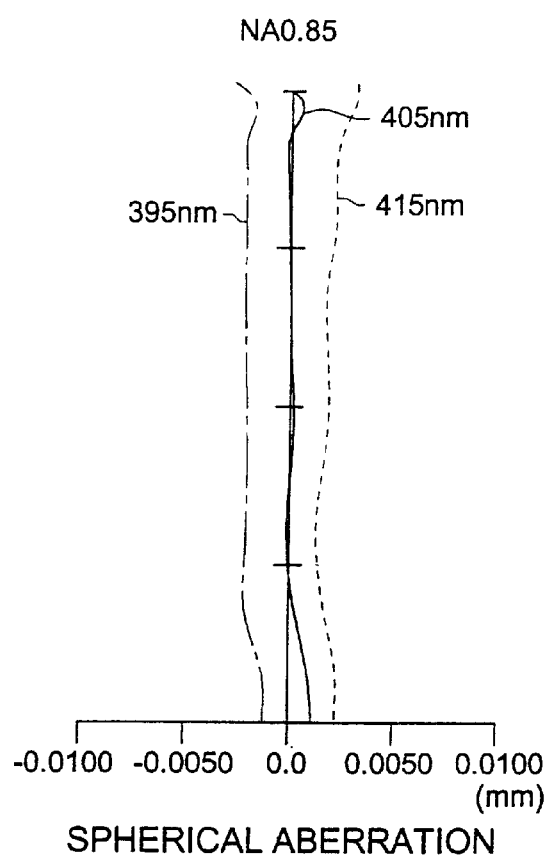
FIG. 26 shows spherical aberration diagrams of the coupling lens and the objective lens in Example 16.

Lens data and an aspherical surface coefficient are shown in Table 25. Sectional views of a coupling lens of a one-group and two-element structure in Example 16 and an objective lens are shown in FIG. 25, and a diagram of spherical aberration is shown in FIG. 26.

TABLE 25

| Surface No. | | r(mm) | d(mm) | n | νd |
|---|---|---|---|---|---|
| Light source | | | 6.410 | | |
| 1 | Coupling | −65.708 | 1.423 | 1.91409 | 23.8 |
| 2 | lens | 5.042 | 2.242 | 1.75166 | 54.7 |
| 3 | | −5.033 | 5.000 | | |
| Diaphragm | | ∞ | 0 | | |
| 4(Aspherical surface 1) | Objective lens | 1.434 | 2.750 | 1.71558 | 53.2 |
| 5(Aspherical surface 2) | | −2.118 | 0.290 | | |
| 6 | Transparent | ∞ | 0.100 | 1.61950 | 30.0 |
| 7 | base plate | ∞ | | | |

| Aspherical surface 1 | Aspherical surface 2 |
|---|---|
| K = −0.452646 | K = −185.751580 |
| $A_4$ = 0.571669E−2 | $A_4$ = 0.281279 |
| $A_6$ = −0.591147E−2 | $A_6$ = −0.742134 |
| $A_8$ = 0.721339E−2 | $A_8$ = 0.667680 |
| $A_{10}$ = −0.398819E−2 | $A_{10}$ = −0.195290 |
| $A_{12}$ = 0.390519E−3 | $A_{12}$ = −0.252228E−3 |
| $A_{14}$ = 0.446956E−3 | |
| $A_{16}$ = −0.135385E−3 | |

Example 17

Figure 27:
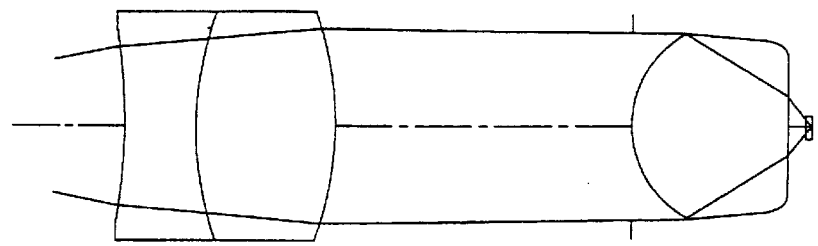
FIG. 27 shows sectional views of a coupling lens and an objective lens in Example 17.
Figure 28:
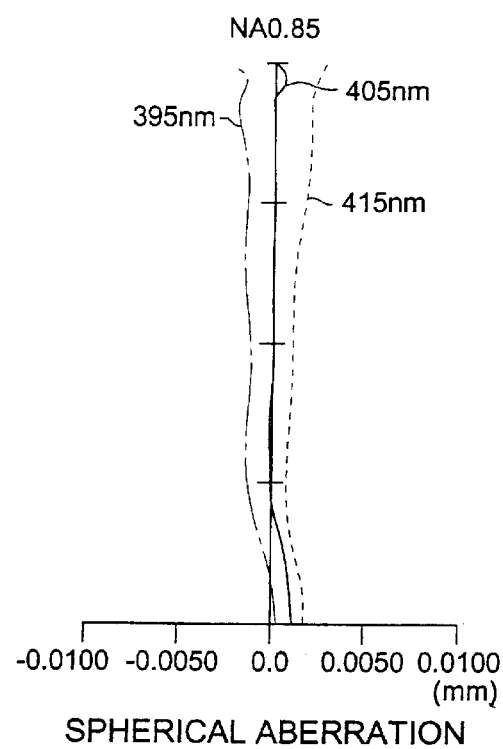
FIG. 28 shows spherical aberration diagrams of the coupling lens and the objective lens in Example 17.

Lens data and an aspherical surface coefficient are shown in Table 26. Sectional views of a coupling lens of a one-group and two-element structure in Example 17 and an objective lens are shown in FIG. 27, and a diagram of spherical aberration is shown in FIG. 28.

TABLE 26

| Surface No. | | r(mm) | d(mm) | n | νd |
|---|---|---|---|---|---|
| Light source | | | 9.838 | | |
| 1 | Coupling | −9.865 | 1.149 | 1.91409 | 23.8 |
| 2 | lens | 5.102 | 2.500 | 1.75166 | 54.7 |
| 3 | | −4.713 | 5.000 | | |
| Diaphragm | | ∞ | 0 | | |
| 4(Aspherical surface 1) | Objective lens | 1.434 | 2.750 | 1.71558 | 53.2 |
| 5(Aspherical surface 2) | | −2.118 | 0.290 | | |
| 6 | Transparent | ∞ | 0.100 | 1.61950 | 30.0 |
| 7 | base plate | ∞ | | | |

| Aspherical surface 1 | Aspherical surface 2 |
|---|---|
| K = −0.452646 | K = −185.751580 |
| $A_4$ = 0.571669E−2 | $A_4$ = 0.281279 |
| $A_6$ = −0.591147E−2 | $A_6$ = −0.742134 |
| $A_8$ = 0.721339E−2 | $A_8$ = 0.667680 |
| $A_{10}$ = −0.398819E−2 | $A_{10}$ = −0.195290 |
| $A_{12}$ = 0.390519E−3 | $A_{12}$ = −0.252228E−3 |
| $A_{14}$ = 0.446956E−3 | |
| $A_{16}$ = −0.135385E−3 | |

Example 18

Figure 29:
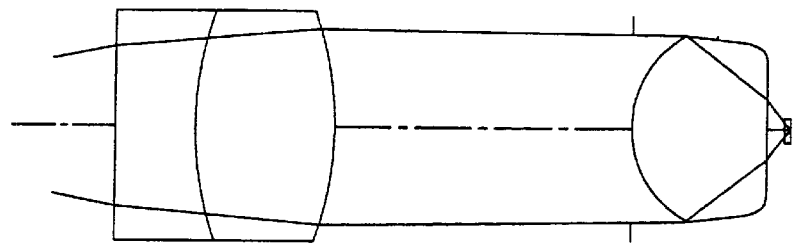
FIG. 29 shows sectional views of a coupling lens and an objective lens in Example 18.
Figure 30:
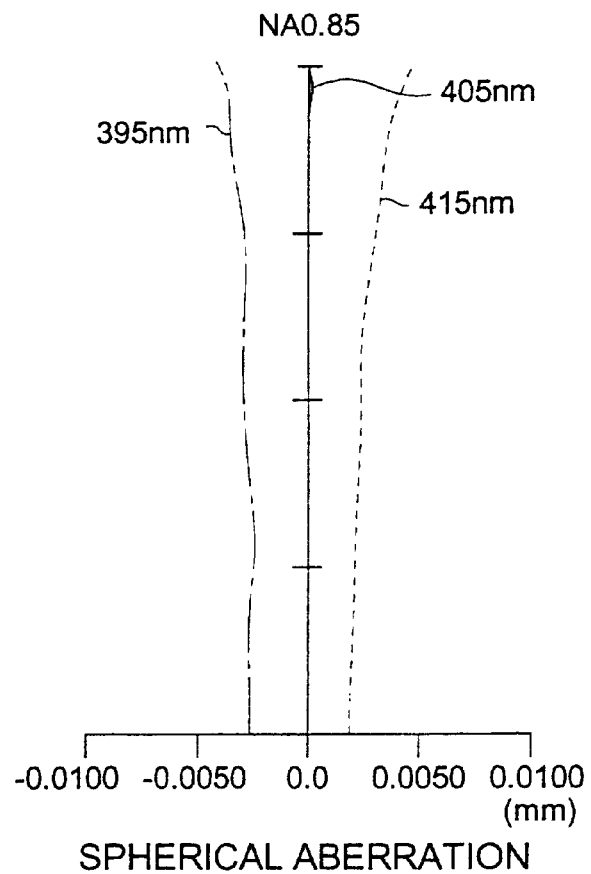
FIG. 30 shows spherical aberration diagrams of the coupling lens and the objective lens in Example 18.

Lens data and an aspherical surface coefficient are shown in Table 27. Sectional views of a coupling lens of a one-group and two-element structure in Example 18 and an objective lens are shown in FIG. 29, and a diagram of spherical aberration is shown in FIG. 30.

TABLE 27

| Surface No. | | r(mm) | d(mm) | n | νd |
|---|---|---|---|---|---|
| Light source | | | 6.410 | | |
| 1 | Coupling | −65.708 | 1.423 | 1.91409 | 23.8 |
| 2 | lens | 5.042 | 2.242 | 1.75166 | 54.7 |
| 3 | | −5.033 | 5.000 | | |
| Diaphragm | | ∞ | 0 | | |
| 4(Aspherical surface 1) | Objective lens | 1.175 | 2.602 | 1.52523 | 59.5 |
| 5(Aspherical surface 2) | | −1.042 | 0.357 | | |
| 6 | Transparent | ∞ | 0.100 | 1.61950 | 30.0 |
| 7 | base plate | ∞ | | | |

| Aspherical surface 1 | Aspherical surface 2 |
|---|---|
| K = −0.682004 | K = −29.373780 |

TABLE 27-continued

| | |
|---|---|
| $A_4 = 0.180213E-1$ | $A_4 = 0.297543$ |
| $A_6 = 0.368416E-2$ | $A_6 = -0.423018$ |
| $A_8 = 0.140365E-2$ | $A_8 = 0.295535$ |
| $A_{10} = 0.342876E-3$ | $A_{10} = -0.829290E-1$ |
| $A_{12} = -0.311534E-4$ | $A_{12} = -0.252257E-3$ |
| $A_{14} = 0.103341E-3$ | |
| $A_{16} = 0.141728E-4$ | |

Example 19

Figure 31:
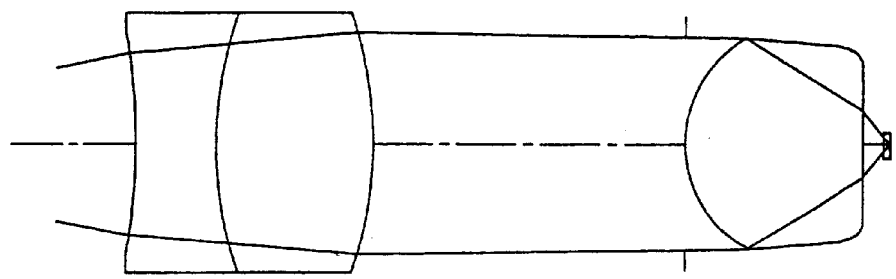
FIG. 31 shows sectional views of a coupling lens and an objective lens in Example 19.
Figure 32:
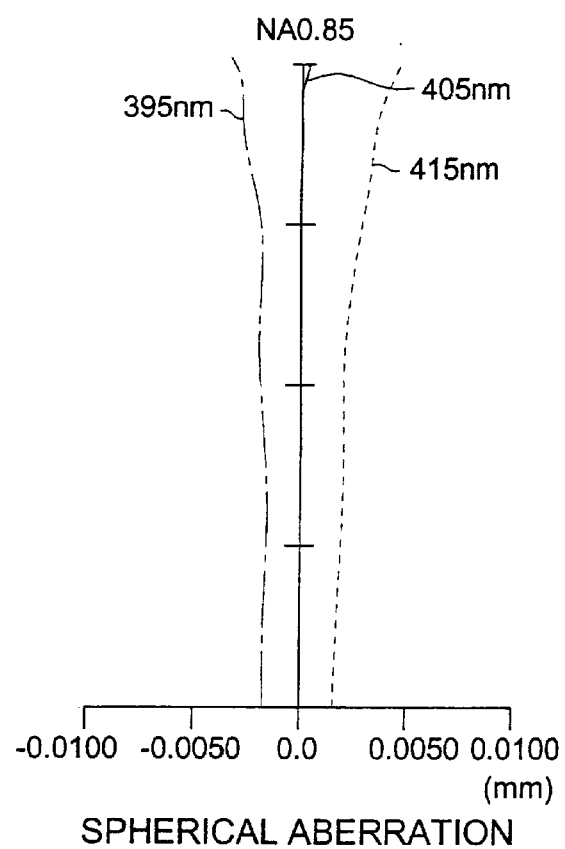
FIG. 32 shows spherical aberration diagrams of the coupling lens and the objective lens in Example 19.

Lens data and an aspherical surface coefficient are shown in Table 28. Sectional views of a coupling lens of a one-group and two-element structure in Example 19 and an objective lens are shown in FIG. 31, and a diagram of spherical aberration is shown in FIG. 32.

TABLE 28

| Surface No. | | r(mm) | d(mm) | n | vd |
|---|---|---|---|---|---|
| Light source | | | 9.838 | | |
| 1 | Coupling | -9.865 | 1.149 | 1.91409 | 23.8 |
| 2 | lens | 5.102 | 2.500 | 1.75166 | 54.7 |
| 3 | | -4.713 | 5.000 | | |
| Diaphragm | | ∞ | 0 | | |
| 4(Aspherical surface 1) | Objective lens | 1.175 | 2.602 | 1.52523 | 59.5 |
| 5(Aspherical surface 2) | | -1.042 | 0.357 | | |
| 6 | Transparent | ∞ | 0.100 | 1.61950 | 30.0 |
| 7 | base plate | ∞ | | | |

| Aspherical surface 1 | Aspherical surface 2 |
|---|---|
| K = -0.682004 | K = -29.373780 |
| $A_4 = 0.180213E-1$ | $A_4 = 0.297543$ |
| $A_6 = 0.368416E-2$ | $A_6 = -0.423018$ |
| $A_8 = 0.140365E-2$ | $A_8 = 0.295535$ |
| $A_{10} = 0.342876E-3$ | $A_{10} = -0.829290E-1$ |
| $A_{12} = -0.311534E-4$ | $A_{12} = -0.252257E-3$ |
| $A_{14} = 0.103341E-3$ | |
| $A_{16} = 0.141728E-4$ | |

Example 20

Figure 33:
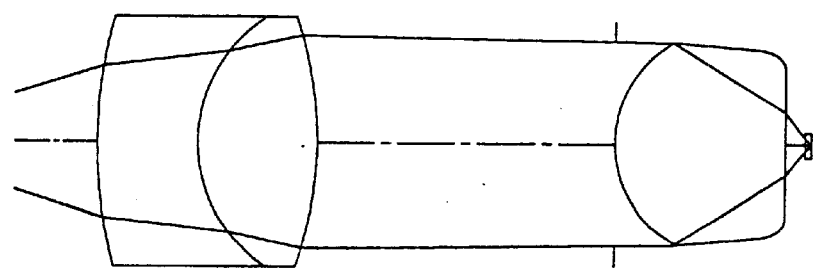
FIG. 33 shows sectional views of a coupling lens and an objective lens in Example 20.
Figure 34:
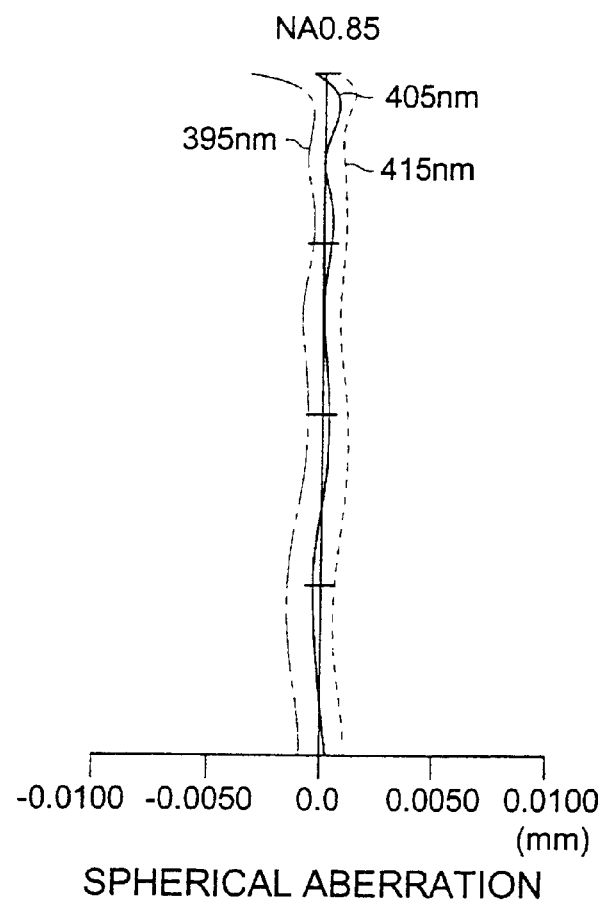
FIG. 34 shows spherical aberration diagrams of the coupling lens and the objective lens in Example 20.

Lens data and an aspherical surface coefficient are shown in Table 29. Sectional views of a coupling lens of a one-group and two-element structure in Example 20 and an objective lens are shown in FIG. 33, and a diagram of spherical aberration is shown in FIG. 34.

TABLE 29

| Surface No. | | r(mm) | d(mm) | n | vd |
|---|---|---|---|---|---|
| Light source | | | 3.342 | | |
| 1 | Coupling | 9.926 | 1.600 | 1.91409 | 23.8 |
| 2 | lens | 2.024 | 2.200 | 1.71548 | 53.2 |
| 3(Aspherical surface 1) | | -3.518 | 5.000 | | |
| Diaphragm | | ∞ | 0 | | |
| 4(Aspherical surface 2) | Objective lens | 1.434 | 2.750 | 1.71558 | 53.2 |
| 5(Aspherical surface 3) | | -2.118 | 0.290 | | |
| 6 | Transparent | ∞ | 0.100 | 1.61950 | 30.0 |
| 7 | base plate | ∞ | | | |

TABLE 29-continued

| Aspherical surface 1 | Aspherical surface 2 | Aspherical surface 3 |
|---|---|---|
| K = 0.270078 | K = 0.452646 | K = -185,751580 |
| $A_4 = 0.425585E-3$ | $A_4 = 0.571669E-2$ | $A_4 = 0.281279$ |
| $A_6 = -0.968014E-3$ | $A_6 = -0.591147E-2$ | $A_6 = -0.742134$ |
| $A_8 = 0.315494E-3$ | $A_8 = 0.721339E-2$ | $A_8 = 0.667680$ |
| $A_{10} = -0.970417E-4$ | $A_{10} = -0.398819E-2$ | $A_{10} = -0.195290$ |
| | $A_{12} = 0.390519E-3$ | $A_{12} = -0.252228E-3$ |
| | $A_{14} = 0.446956E-3$ | |
| | $A_{16} = -0.135385E-3$ | |

Example 21

Figure 35:
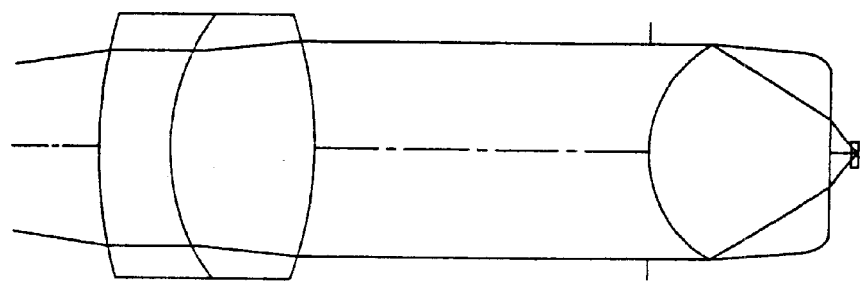
FIG. 35 shows sectional views of a coupling lens and an objective lens in Example 21.
Figure 36:
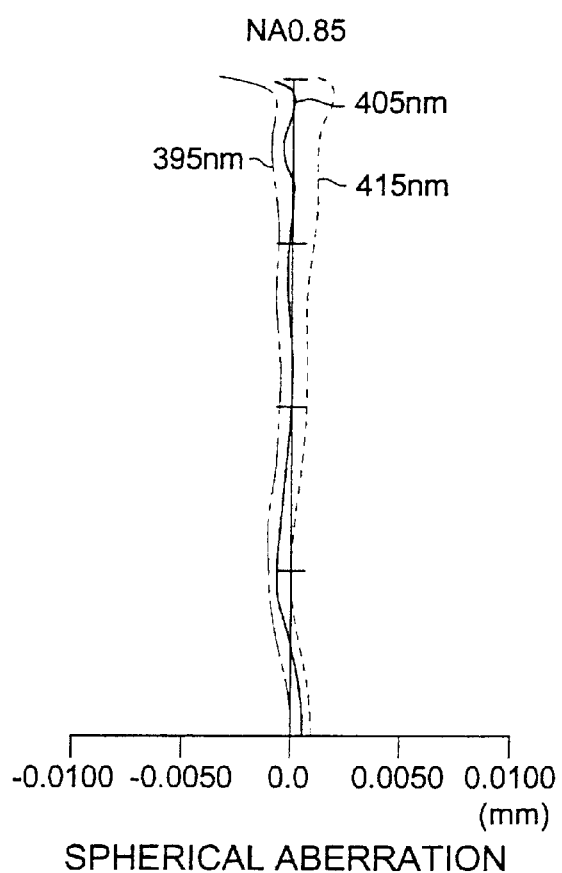
FIG. 36 shows spherical aberration diagrams of the coupling lens and the objective lens in Example 21.

Lens data and an aspherical surface coefficient are shown in Table 30. Sectional views of a coupling lens of a one-group and two-element structure in Example 16 and an objective lens are shown in FIG. 35, and a diagram of spherical aberration is shown in FIG. 36.

TABLE 30

| Surface No. | | r (mm) | d (mm) | n | vd |
|---|---|---|---|---|---|
| Light source | | | 7.230 | | |
| 1 | Coupling | 13.531 | 1.000 | 1.91409 | 23.8 |
| 2 | lens | 2.551 | 2.100 | 1.71548 | 53.2 |
| 3 (Aspherical surface 1) | | -5.765 | 5.000 | | |
| Diaphragm | | ∞ | 0 | | |
| 4 (Aspherical surface 2) | Objective lens | 1.434 | 2.750 | 1.71558 | 53.2 |
| 5 (Aspherical surface 3) | | -2.118 | 0.290 | | |
| 6 | Transparent | ∞ | 0.100 | 1.61950 | 30.0 |
| 7 | base plate | ∞ | | | |

Aspherical surface 1
K = 0.699858
$A_4 = -0.53797E-3$
$A_6 = -0.352488E-3$
$A_8 = 0.595790E-4$
$A_{10} = -0.152115E-4$
Aspherical surface 2
K = -0.452646
$A_4 = 0.571669E-2$
$A_6 = -0.591147E-2$
$A_8 = 0.721339E-2$
$A_{10} = -0.398819E-2$
$A_{12} = 0.390519E-3$
$A_{14} = 0.446956E-3$
$A_{16} = -0.135385E-3$
Aspherical surface 3
K = -185.751580
$A_4 = 0.281279$
$A_6 = -0.742134$
$A_8 = 0.667680$
$A_{10} = -0.195290$
$A_{12} = -0.25228E-3$ Example 22

Figure 37:
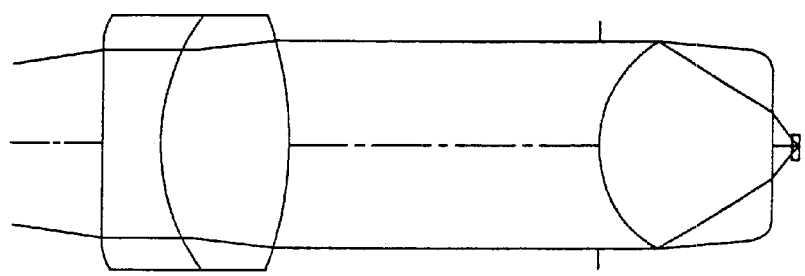
FIG. 37 shows sectional views of a coupling lens and an objective lens in Example 22.
Figure 38:
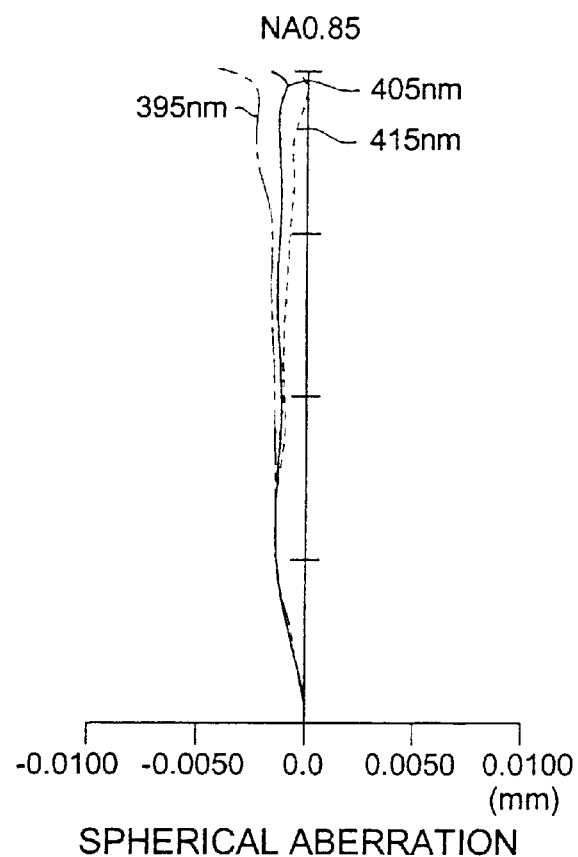
FIG. 38 shows spherical aberration diagrams of the coupling lens and the objective lens in Example 22.

Lens data and an aspherical surface coefficient are shown in Table 31. Sectional views of a coupling lens of a one-group and two-element structure in Example 22 and an objective lens are shown in FIG. 37, and a diagram of spherical aberration is shown in FIG. 38.

TABLE 31

| Surface No. | | r (mm) | d (mm) | n | νd |
|---|---|---|---|---|---|
| Light source | | | 11.961 | | |
| 1 | Coupling | 37.967 | 0.900 | 1.91409 | 23.8 |
| 2 | lens | 2.857 | 2.000 | 1.71548 | 53.2 |
| 3 (Aspherical surface 1) | | −6.448 | 5.000 | | |
| Diaphragm | | ∞ | 0 | | |
| 4 (Aspherical surface 2) | Objective lens | 1.434 | 2.750 | 1.71558 | 53.2 |
| 5 (Aspherical surface 3) | | −2.118 | 0.290 | | |
| 6 | Transparent | ∞ | 0.100 | 1.61950 | 30.0 |
| 7 | base plate | ∞ | | | |

Aspherical surface 1
$K = 0.980965$
$A_4 = -0.719068E-3$
$A_6 = -0.177543E-3$
$A_8 = 0.364218E-4$
$A_{10} = -0.120077E-4$
Aspherical surface 2
$K = -0.452646$
$A_4 = 0.571669E-2$
$A_6 = -0.591147E-2$
$A_8 = 0.721339E-2$
$A_{10} = -0.398819E-2$
$A_{12} = 0.390519E-3$
$A_{14} = 0.446956E-3$
$A_{16} = -0.135385E-3$
Aspherical surface 3
$K = -185.751580$
$A_4 = 0.281279$
$A_6 = -0.742134$
$A_8 = 0.667680$
$A_{10} = -0.195290$
$A_{12} = -0.25228E-3$ Example 23

Figure 39:
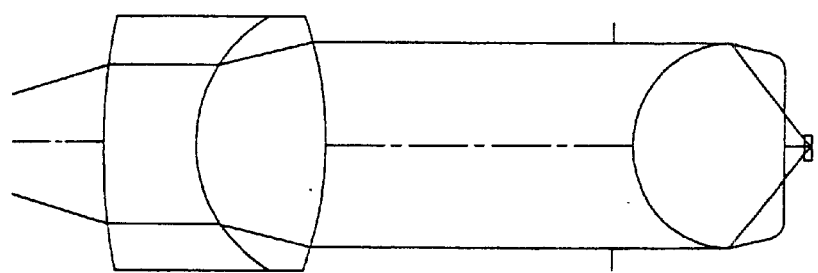
FIG. 39 shows sectional views of a coupling lens and an objective lens in Example 23.
Figure 40:
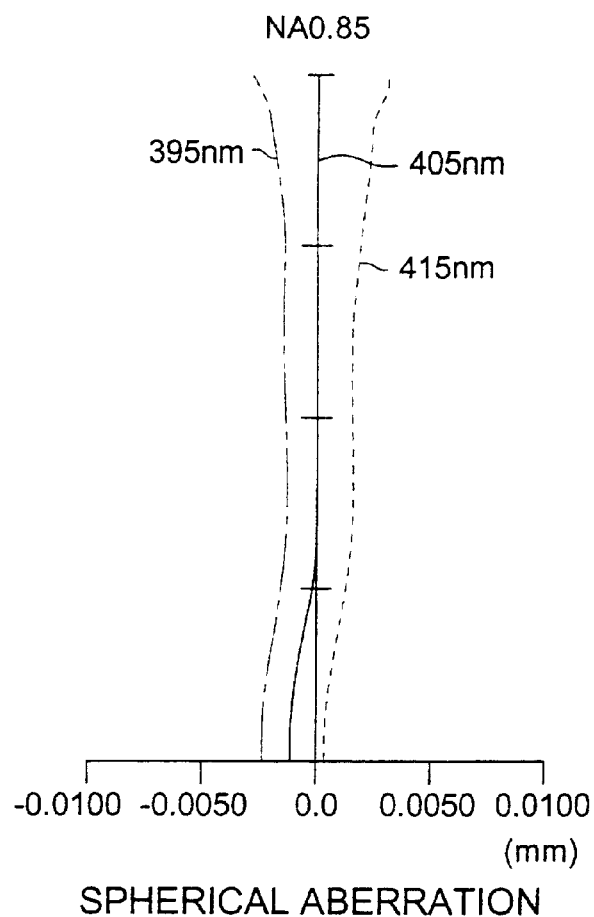
FIG. 40 shows spherical aberration diagrams of the coupling lens and the objective lens in Example 23.

Lens data and an aspherical surface coefficient are shown in Table 32. Sectional views of a coupling lens of a one-group and two-element structure in Example 23 and an objective lens are shown in FIG. 39, and a diagram of spherical aberration is shown in FIG. 40.

TABLE 32

| Surface No. | | r (mm) | d (mm) | n | νd |
|---|---|---|---|---|---|
| Light source | | | 3.342 | | |
| 1 | Coupling | 9.926 | 1.600 | 1.91409 | 23.8 |
| 2 | lens | 2.024 | 2.200 | 1.71548 | 53.2 |
| 3 (Aspherical surface 1) | | −3.518 | 5.000 | | |
| Diaphragm | | ∞ | 0 | | |
| 4 (Aspherical surface 2) | Objective lens | 1.175 | 2.602 | 1.5253 | 59.5 |
| 5 (Aspherical surface 3) | | −1.042 | 0.357 | | |
| 6 | Transparent | ∞ | 0.100 | 1.61950 | 30.0 |
| 7 | base plate | ∞ | | | |

Aspherical surface 1
$K = 0.270078$
$A_4 = 0.425585E-3$
$A_6 = -0.968014E-3$
$A_8 = 0.315494E-3$
$A_{10} = -0.970417E-4$
Aspherical surface 2
$K = -0.682004$
$A_4 = 0.180213E-1$
$A_6 = 0.368416E-2$
$A_8 = 0.140365E-2$
$A_{10} = 0.342876E-3$
$A_{12} = -0.311534E-4$ TABLE 32-continued

| Surface No. | r (mm) | d (mm) | n | νd |
|---|---|---|---|---|

$A_{14} = 0.103341E-3$
$A_{16} = 0.141728E-4$
Aspherical surface 3
$K = -29.373780$
$A_4 = 0.297543$
$A_6 = -0.423018$
$A_8 = 0.295535$
$A_{10} = -0.829290E-1$
$A_{12} = -0.252257E-3$ Example 24

Figure 41:
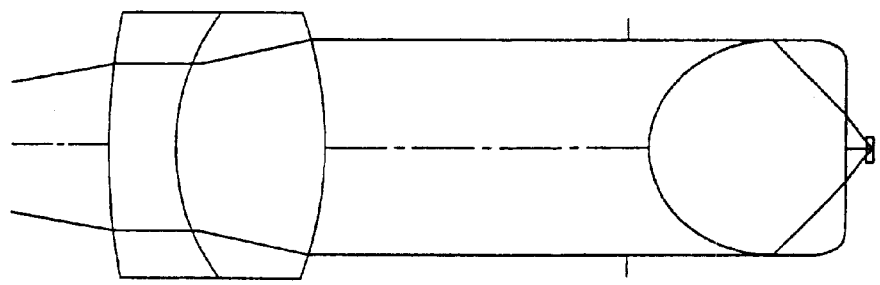
FIG. 41 shows sectional views of a coupling lens and an objective lens in Example 24.
Figure 42:
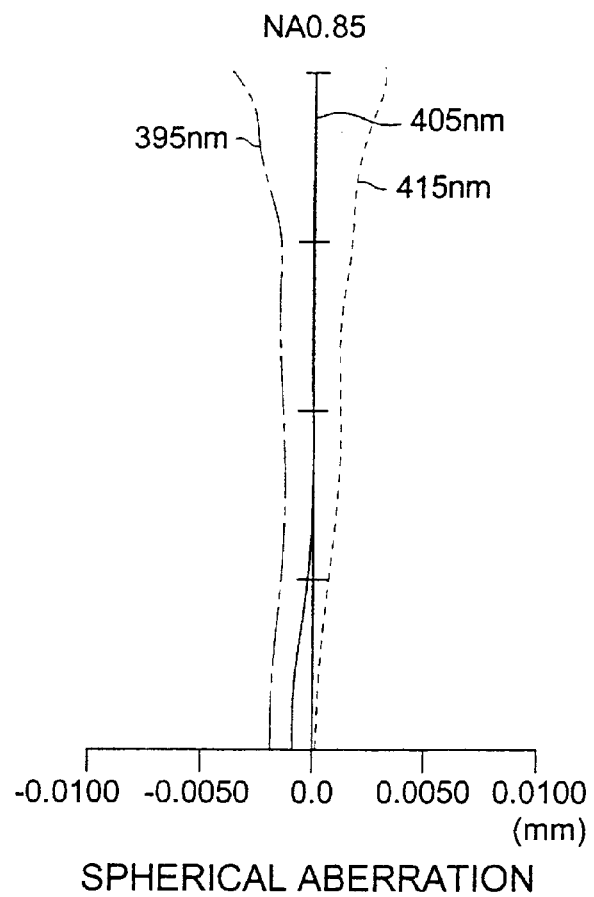
FIG. 42 shows spherical aberration diagrams of the coupling lens and the objective lens in Example 24.

Lens data and an aspherical surface coefficient are shown in Table 33. Sectional views of a coupling lens of a one-group and two-element structure in Example 24 and an objective lens are shown in FIG. 41, and a diagram of spherical aberration is shown in FIG. 42.

TABLE 33

| Surface No. | | r (mm) | d (mm) | n | νd |
|---|---|---|---|---|---|
| Light source | | | 7.230 | | |
| 1 | Coupling | 13.531 | 1.000 | 1.91409 | 23.8 |
| 2 | lens | 2.551 | 2.100 | 1.71548 | 53.2 |
| 3 (Aspherical surface 1) | | −5.765 | 5.000 | | |
| Diaphragm | | ∞ | 0 | | |
| 4 (Aspherical surface 2) | Objective lens | 1.175 | 2.602 | 1.52523 | 59.5 |
| 5 (Aspherical surface 3) | | −1.042 | 0.357 | | |
| 6 | Transparent | ∞ | 0.100 | 1.61950 | 30.0 |
| 7 | base plate | ∞ | | | |

Aspherical surface 1
$K = 0.699858$
$A_4 = -0.53797E-3$
$A_6 = -0.352488E-3$
$A_8 = 0.595790E-4$
$A_{10} = -0.152115E-4$
Aspherical surface 2
$K = -0.682004$
$A_4 = 0.180213E-1$
$A_6 = 0.368416E-2$
$A_8 = 0.140365E-2$
$A_{10} = 0.342876E-3$
$A_{12} = -0.311534E-4$
$A_{14} = 0.103341E-3$
$A_{16} = 0.141728E-4$
Aspherical surface 3
$K = -29.373780$
$A_4 = 0.297543$
$A_6 = -0.423018$
$A_8 = 0.295535$
$A_{10} = -0.829290E-1$
$A_{12} = -0.252257E-3$ Example 25

Figure 43:
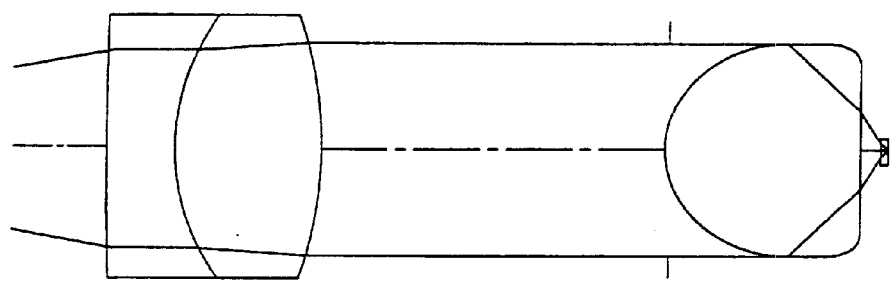
FIG. 43 shows sectional views of a coupling lens and an objective lens in Example 25.
Figure 44:
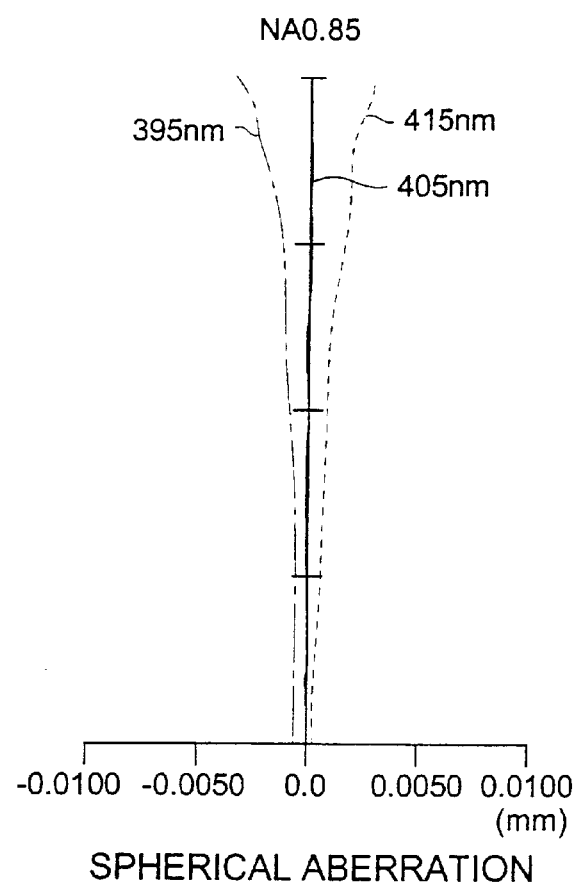
FIG. 44 shows spherical aberration diagrams of the coupling lens and the objective lens in Example 25.

Lens data and an aspherical surface coefficient are shown in Table 34. Sectional views of a coupling lens of a one-group and two-element structure in Example 25 and an objective lens are shown in FIG. 43, and a diagram of spherical aberration is shown in FIG. 44.

TABLE 34

| Surface No. | | r (mm) | d (mm) | n | νd |
|---|---|---|---|---|---|
| Light source | | | 11.961 | | |
| 1 | Coupling | 37.967 | 0.900 | 1.91409 | 23.8 |
| 2 | lens | 2.857 | 2.000 | 1.71548 | 53.2 |

TABLE 34-continued

| Surface No. | | r (mm) | d (mm) | n | vd |
|---|---|---|---|---|---|
| 3 (Aspherical surface 1) | | −6.448 | 5.000 | | |
| Diaphragm | | ∞ | 0 | | |
| 4 (Aspherical surface 2) | Objective lens | 1.175 | 2.602 | 1.52523 | 59.5 |
| 5 (Aspherical surface 3) | | −1.042 | 0.357 | | |
| 6 | Transparent base plate | ∞ | 0.100 | 1.61950 | 30.0 |
| 7 | | ∞ | | | |

Aspherical surface 1
K = 0.980965
$A_4 = -0.719068E-3$
$A_6 = -0.177543E-3$
$A_8 = 0.364218E-4$
$A_{10} = -0.120077E-4$
Aspherical surface 2
K = −0.682004
$A_4 = 0.180213E-1$
$A_6 = 0.368416E-2$
$A_8 = 0.140365E-2$
$A_{10} = 0.342876E-3$
$A_{12} = -0.311534E-4$
$A_{14} = 0.103341E-3$
$A_{16} = 0.141728E-4$
Aspherical surface 3
K = −29.373780
$A_4 = 0.297543$
$A_6 = -0.423018$
$A_9 = 0.295535$
$A_{10} = -0.829290E-1$
$A_{12} = -0.252257E-3$ Example 26

Figure 45:
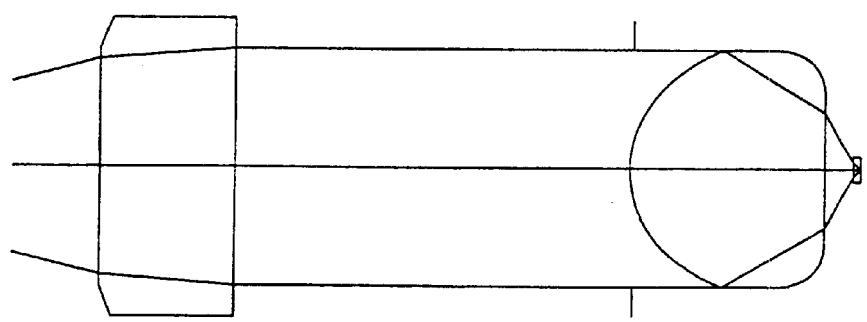
FIG. 45 shows sectional views of a coupling lens and an objective lens in Example 26.
Figure 46:
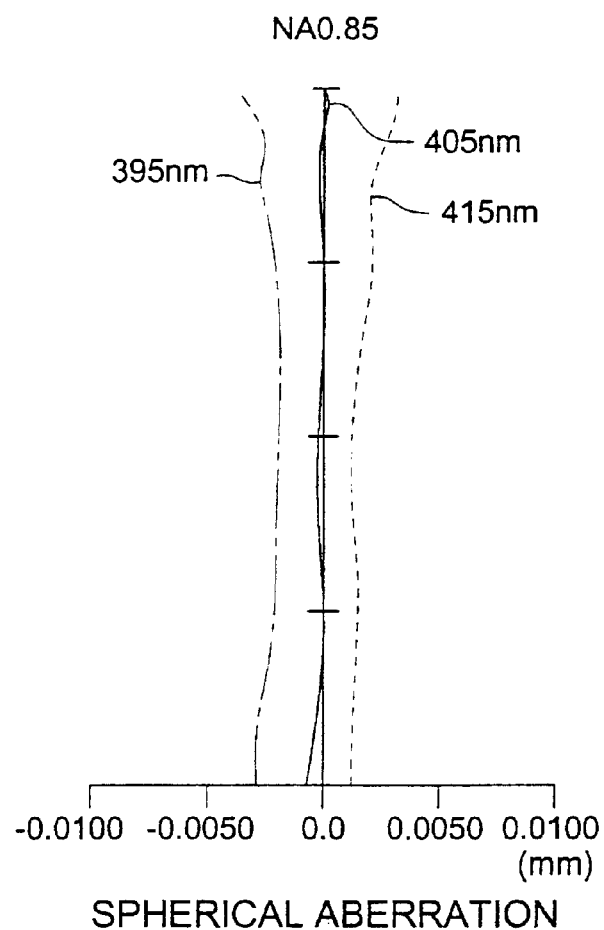
FIG. 46 shows spherical aberration diagrams of the coupling lens and the objective lens in Example 26.

Lens data and an aspherical surface coefficient are shown in Table 35. Sectional views of a coupling lens of a one-group and two-element structure in Example 26 and an objective lens are shown in FIG. 45, and a diagram of spherical aberration is shown in FIG. 46.

TABLE 35

| Surface No. | | r (mm) | d (mm) | n | vd |
|---|---|---|---|---|---|
| Light source | | | 5.103 | | |
| 1 (Aspherical surface 1) | Coupling lens | 15.399 | 2.000 | 1.52523 | 59.5 |
| 2 (Aspherical surface 2, Diffraction surface) | | −5.37697 | 5 | | |
| Diaphragm | | | 0 | | |
| 3 (Aspherical surface 3) | Objective lens | 1.175 | 2.602 | 1.52523 | 59.5 |
| 4 (Aspherical surface 4) | | −1.042 | 0.357 | | |
| 5 | Transparent base plate | ∞ | 0.1 | 1.61950 | 30.0 |
| 6 | | ∞ | | | |
| Image plane | | | | | |

Aspherical surface 1
K = 0
$A_4 = -0.418319E-1$
$A_6 = 0.416634E-1$
$A_8 = -0.159039E-1$
$A_{10} = 0.134507E-2$
Aspherical surface 2
K = 0
$A_4 = -0.22293E-2$
$A_6 = -0.44722E-3$
$A_8 = 0.25384E-2$
$A_{10} = -0.46638E-3$
Diffraction surface

TABLE 35-continued

| Surface No. | r (mm) | d (mm) | n | vd |
|---|---|---|---|---|

$b_2 = -0.18000E-1$
$b_4 = -0.80593E-2$
$b_6 = 0.62172E-2$
$b_8 = -0.26442E-2$
$b_{10} = 0.35943E-3$
Aspherical surface 3
K = −0.682004
$A_4 = 0.180213E-1$
$A_6 = 0.368416E-2$
$A_8 = 0.140365E-2$
$A_{10} = 0.342876E-3$
$A_{12} = -0.311534E-4$
$A_{14} = 0.103341E-3$
$A_{16} = 0.141728E-4$
Aspherical surface 4
K = −29.373780
$A_4 = 0.297543$
$A_6 = -0.423018$
$A_8 = 0.295535$
$A_{10} = -0.829290E-1$
$A_{12} = -0.252257E-3$ Example 27

Figure 47:
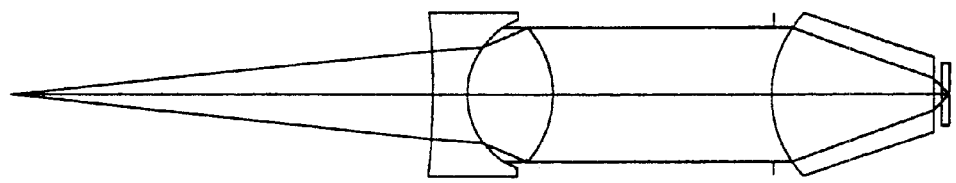
FIG. 47 shows sectional views of a coupling lens and an objective lens in Example 27.
Figure 48:
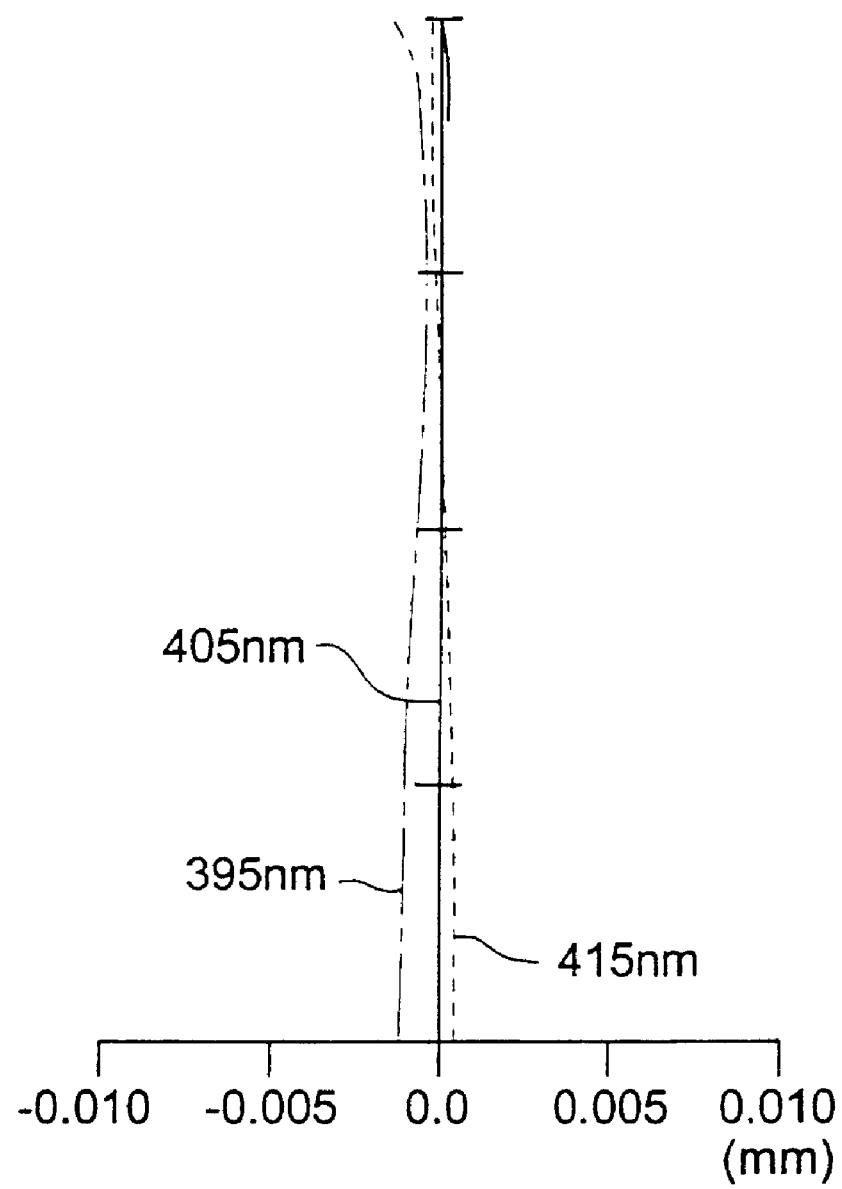
FIG. 48 shows spherical aberration diagrams of the coupling lens and the objective lens in Example 28.

Lens data and an aspherical surface coefficient are shown in Table 36. Sectional views of a coupling lens of a one-group and two-element structure in Example 27 and an objective lens are shown in FIG. 47, and a diagram of spherical aberration is shown in FIG. 48.

TABLE 36

| Surface No. | | r (mm) | d (mm) | n | vd |
|---|---|---|---|---|---|
| Light source | | | 9.531 | | |
| 1 | Coupling lens | −11.04660 | 0.800 | 2.34749 | 16.6 |
| 2 | | 1.55601 | 2.000 | 1.71548 | 53.3 |
| 3 (Aspherical surface 1) | | −1.99414 | 5.000 | | |
| Diaphragm | | | 0 | | |
| 4 (Aspherical surface 2) | Objective lens | 2.3000 | 3.650 | 2.15857 | 21.1 |
| 5 (Aspherical surface 3) | | −2.73024 | 0.200 | | |
| 6 | Transparent base plate | ∞ | 0.1 | 1.61950 | 30.0 |
| 7 | | ∞ | | | |
| Image plane | | | | | |

Aspherical surface 1
K = 0.53298
$A_4 = 0.342156E-2$
$A_6 = 0.133722E-2$
$A_8 = -0.414740E-3$
$A_{10} = 0.257160E-3$
Aspherical surface 2
K = −0.456357
$A_4 = 0.712833E-3$
$A_6 = -0.604365E-3$
$A_8 = 0.898662E-3$
$A_{10} = -0.133726E-2$
$A_{12} = 0.785181E-3$
$A_{14} = -0.223083E-3$
$A_{16} = 0.199958E-4$
Aspherical surface 3
K = 219.931
$A_4 = -0.962060E-1$
$A_6 = -0.200434$
$A_8 = 0.741851$
$A_{10} = -0.292121$
$A_{12} = -0.252226E-3$ Since the objective lens of the invention is a single objective lens of a refraction system as stated above, there is caused axial chromatic aberration which is under on the part of a short wavelength. However, it was possible, in Examples 16–27, to correct the axial chromatic aberration by a coupling lens in the composition system of an objective lens and a coupling lens. It was possible to reduce the axial chromatic aberration of the objective lens by making the axial chromatic aberration of the coupling lens to be over on the part of the short wavelength.

Further, in Examples 16–27, image height characteristics are also excellent. In addition, eccentricity sensitivity can be made excellent and spherical aberration and coma can be corrected satisfactorily.

Example 28

Figure 49:
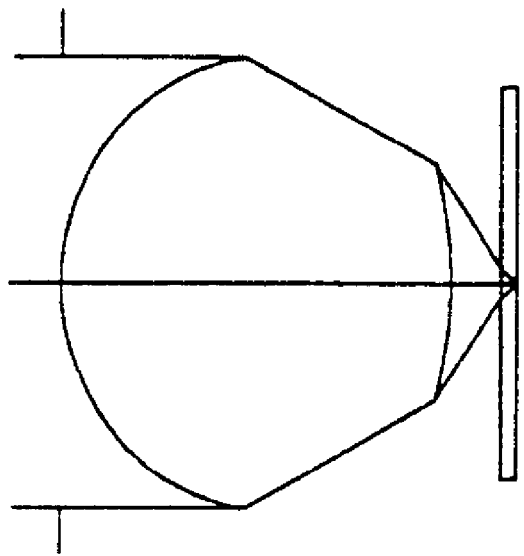
FIG. 49 shows sectional views of an objective lens in Example 28.
Figure 50:
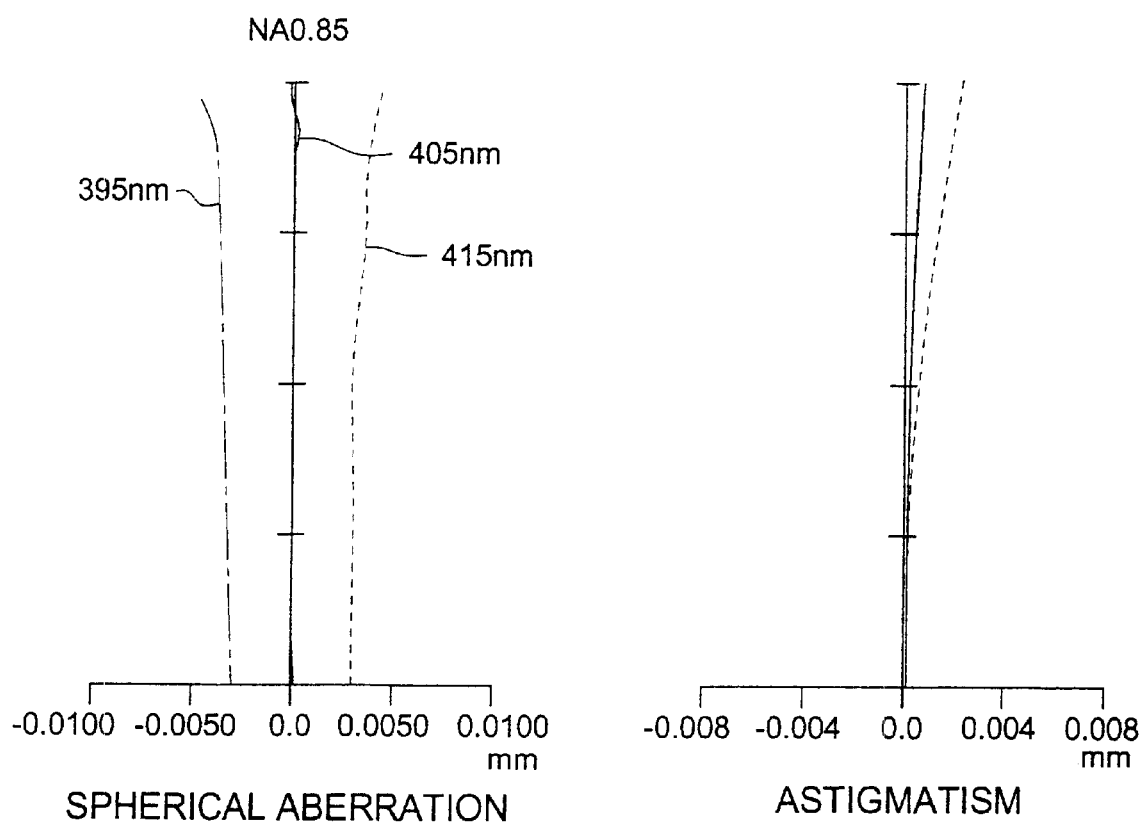
FIG. 50 shows aberration diagrams of the objective lens in Example 28.

Another example of the objective lens will be shown next. Lens data and aspherical surface coefficients are shown in Table 37. A sectional view of the objective lens in Example 28 is shown in FIG. 49 and an aberration diagram is shown in FIG. 50.

TABLE 37

γ = 405 (nm)
f = 1.765 (mm)
NA = 0.85
Magnification = 0

| | r(mm) | d(mm) | N | vd |
|---|---|---|---|---|
| 1* | 1.19392 | 2.650 | 1.52491 | 56.5 |
| 2* | −0.97515 | 0.355 | | |
| 3 | ∞ | 0.100 | 1.61950 | 30.0 |
| 4 | ∞ | 0.000 | | |

*Aspherical surface

Aspherical surface coefficient

First surface

K = −0.683354
A 4 = 0.162029E−01
A 6 = 0.154908E−02
A 8 = 0.289288E−02
A10 = −0.367711E−03
A12 = −0.358222E−03
A14 = 0.148419E−03
A16 = 0.119603E−03
A18 = −0.302302E−04
A20 = −0.110520E−04

Second surface

K = −21.704418
A 4 = 0.308021E+00
A 6 = −0.639499E+00
A 8 = 0.585364E+00
A10 = −0.215623E+00
A12 = −0.252265E−03

Table 38 shows various values.

TABLE 38

| Example | | 28 |
|---|---|---|
| f | | 1.76 |
| NA | | 0.85 |
| Wavelength (nm) | | 405 |
| d1/f | | 1.50 |
| f/vd | | 0.031 |
| vd | | 56.5 |
| r1 (n · f) | | 0.44 |
| n | | 1.52491 |
| Wave front aberration | Axial | 0.006 |
| | Off-axis | 0.086 |
| | (Image height) | (0.03 mm) |
| | (Angle of view) | (1°) |

In Example 28, since wave front aberration caused by the first surface that is decentered by 1 μm is 0.026 λ (it is preferable to be 0.035 λ or less), eccentricity sensitivity is corrected to be excellent.

Figure 57:
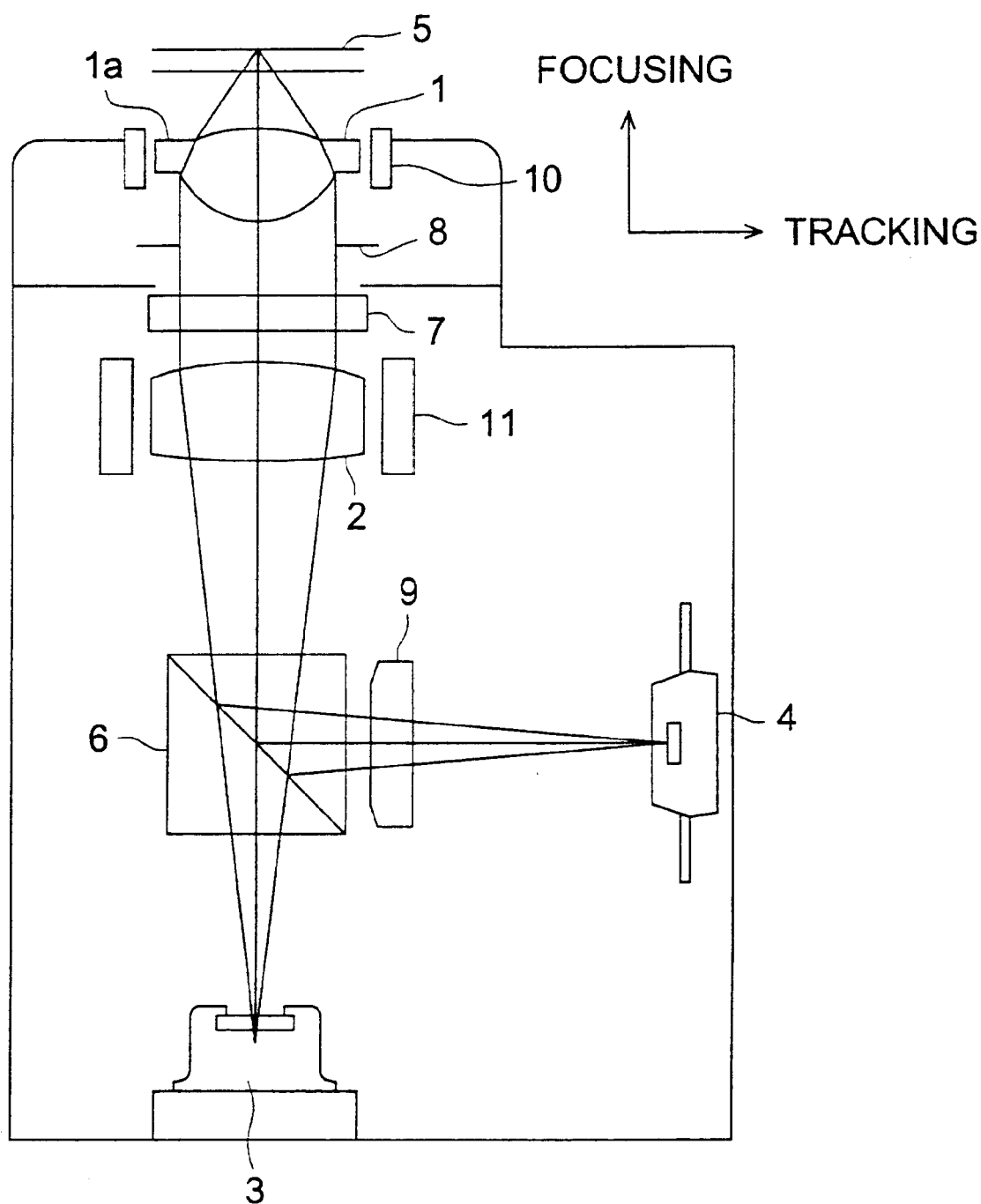
FIG. 57 is a diagram showing another embodiment of a optical pickup apparatus employing an objective lens of the invention.

In the following Examples 29–32, there are shown examples wherein spherical aberrations fluctuate. Optical pickup apparatus used in Examples 29–32 has uniaxial actuator 11 which is shown in FIG. 57 and shifts a coupling lens in the optical axis direction. An objective lens. in each of Examples 29–32 is the same as that in Example 28.

Example 29

Figure 51:
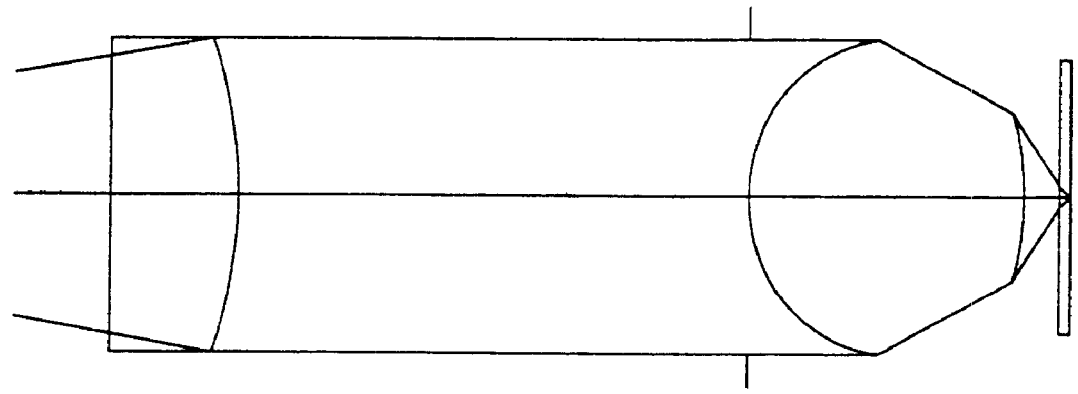
FIG. 51 shows sectional views of an optical system in Example 29.
Figure 52:
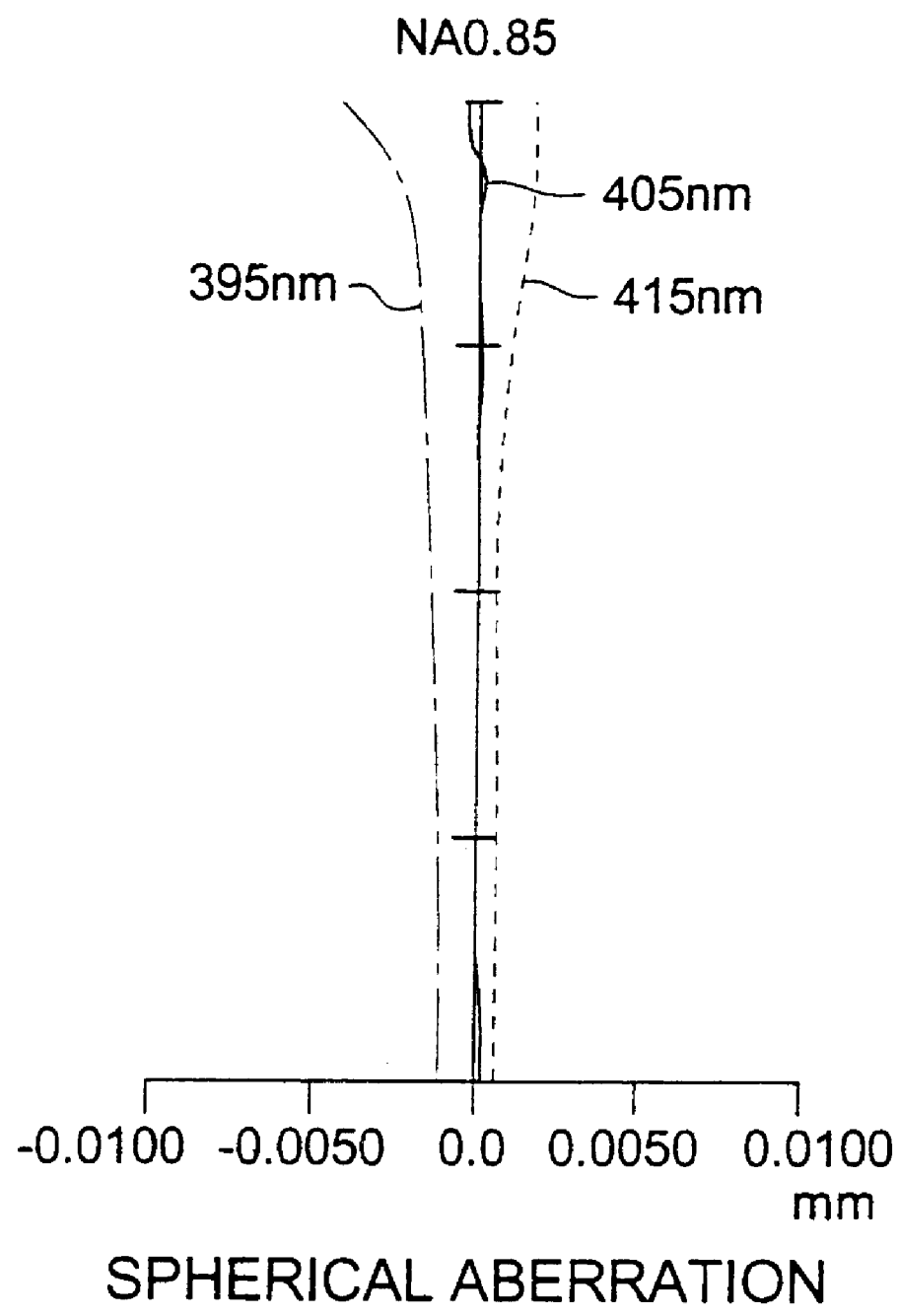
FIG. 52 shows an aberration diagram of the optical system in Example 29.

Lens data and aspherical surface coefficients are shown in Table 39. A sectional view of the optical system is shown in FIG. 51 and an aberration diagram is shown in FIG. 52.

TABLE 39

| Surface No. | | r (mm) | d (mm) | n | vd |
|---|---|---|---|---|---|
| Light source | | | d0 (variable) | | |
| 1 | Coupling | −62.022 | 1.200 | 1.52491 | 56.5 |
| 2 | lens | −4.608 | d2 (variable) | | |
| Diaphragm | | ∞ | 0 | | |
| 3 (Aspherical surface 2) | Objective lens | 1.194 | 2.650 | 1.52491 | 56.5 |
| 4 (Aspherical surface 3) | | −0.975 | 0.355 | | |
| 5 | Transparent | ∞ | 0.100 | 1.61950 | 30.0 |
| 6 | base board | ∞ | | | |

Aspherical surface 1
K = −2.4335E−01
A4 = 2.7143E−03
A6 = −5.6745E−05
A8 = 7.0168E−05
A10 = −1.5659E−05
Diffraction surface 1
b2 = 2.0000E−02
b4 = −1.3821E−03
Aspherical surface 2
K = −0.683354
A4 = 0.162029E−01
A6 = 0.154908E−02
A8 = 0.289288E−02
A10 = −0.367711E−03
A12 = −0.358222E−03
A14 = 0.148419E−03
A16 = 0.119603E−03
A18 = −0.302302E−04
A20 = −0.110520E−04
Aspherical surface 3
K = −21.704418
A4 = 0.308021E+00
A6 = −0.639499E+00
A8 = 0.585364E+00
A10 = −0.215623E+00
A12 = −0.252265E−03

TABLE 40

| Causes of fluctuation of spherical aberration | | WFE-rms after correction | d0 (mm) | d2 (mm) |
|---|---|---|---|---|
| Standard conditions (λc = 405 nm, Tc = 25° C., tc = 0.1 mm) | | 0.007 λ | 6.000 | 5.000 |
| Wavelength fluctuation of LD | Δλ = +10 nm | 0.008 λ | 5.941 | 5.059 |
| | Δλ = −10 nm | 0.022λ | 6.054 | 4.946 |
| Temperature change | ΔT = +30° C. | 0.011 λ | 5.927 | 5.073 |
| | ΔT = −30° C. | 0.031 λ | 6.071 | 4.929 |
| Error of transparent base board thickness | Δt = +0.02 mm | 0.004 λ | 5.853 | 5.147 |
| | Δt = −0.02 mm | 0.015 λ | 6.152 | 4.848 |

In the present example, an objective lens and a coupling lens are made to be a plastic lens. Further, the coupling lens is made to be a single diffraction lens, and axial chromatic aberration is corrected excellently by the simple structure.

Table 40 shows that spherical aberration caused by wavelength fluctuation of a laser, temperature change and by errors in thickness of transparent base board is corrected excellently.

Example 30

Figure 53:
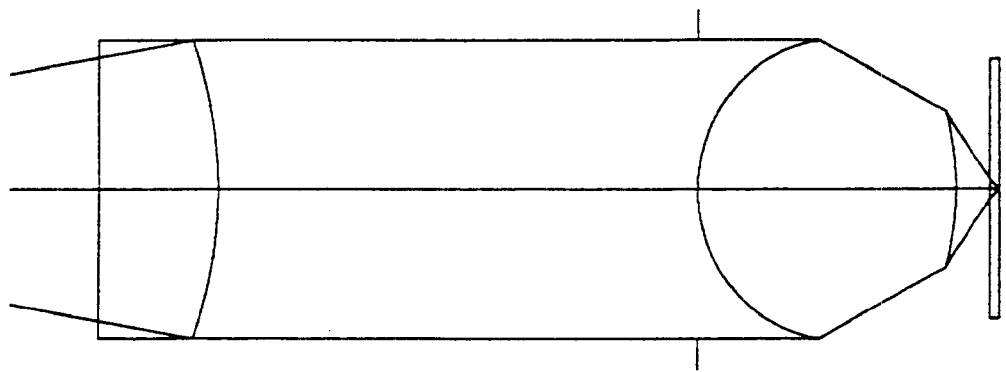
FIG. 53 shows sectional views of an optical system in Example 30.
Figure 54:
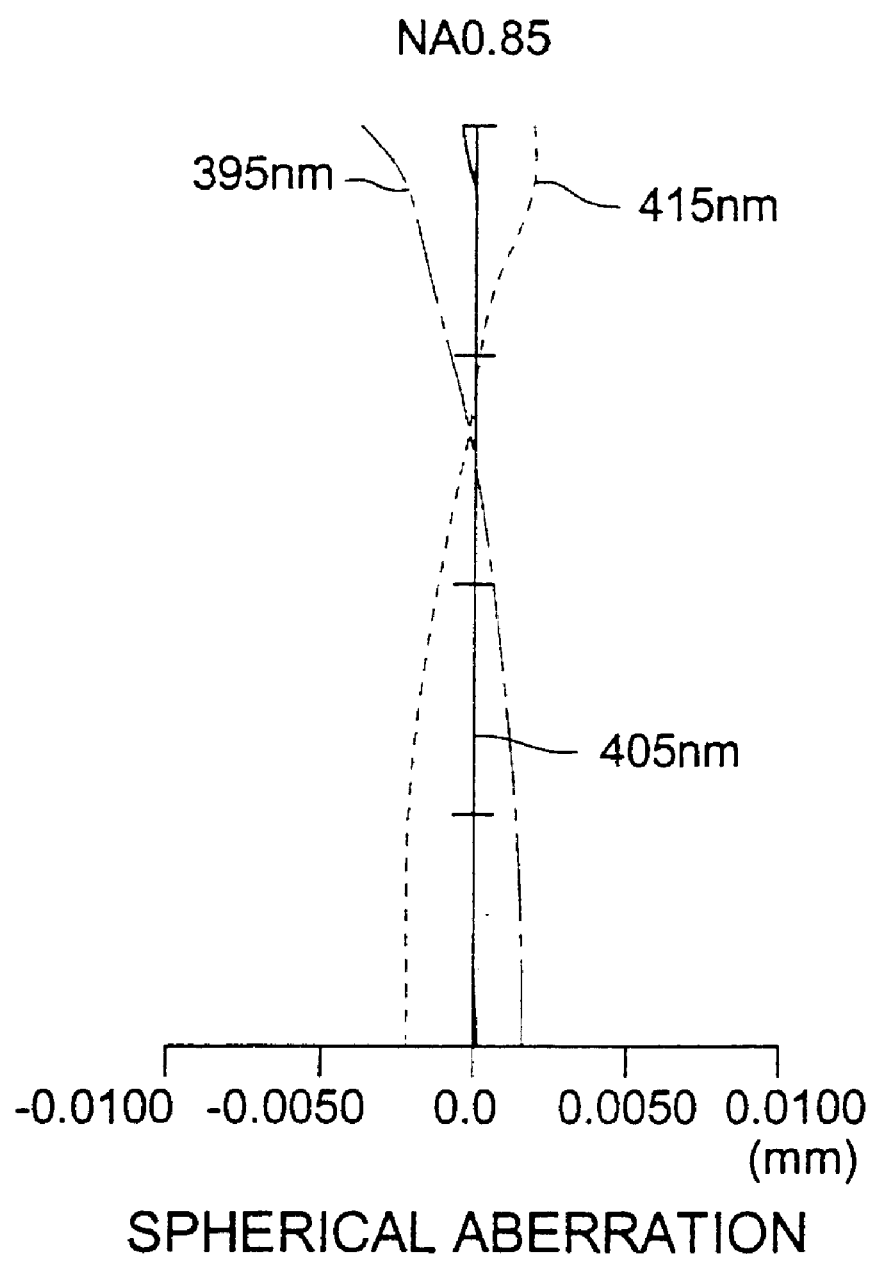
FIG. 54 shows an aberration diagram of the optical system in Example 30.

Lens data and aspherical surface coefficients are shown in Table 41. A sectional view of the optical system is shown in FIG. 53 and an aberration diagram is shown in FIG. 54.

TABLE 41

| Surface No. | | r (mm) | d (mm) | n | νd |
|---|---|---|---|---|---|
| Light source | | | d0 (variable) | | |
| 1 (Aspherical surface 1, diffraction surface 1) | Coupling lens | −226.959 | 1.200 | 1.52491 | 56.5 |
| 2 (Aspherical surface 2, diffraction surface 2) | | −6.733 | d2 (variable) | | |
| Diaphragm | | ∞ | 0 | | |
| 3 (Aspherical surface 3) | Objective lens | 1.194 | 2.650 | 1.52491 | 56.5 |
| 4 (Aspherical surface 4) | | −0.975 | 0.355 | | |
| 5 | Transparent base board | ∞ | 0.100 | 1.61950 | 30.0 |
| 6 | | ∞ | | | |

Aspherical surface 1
K = 0.0
A4 = 1.0245E−02
A6 = 9.6650E−04
A8 = −5.9104E−04
A10 = 8.9735E−05
Diffraction surface 1
b2 = −2.2967E−02
b4 = 2.1037E−03
Aspherical surface 2
K = −4.3181
A4 = 1.5848E−03
A6 = 8.6137E−04
A8 = −2.0117E−04
A10 = 1.3168E−05
Diffraction surface 2
b2 = −1.7113E−02
b4 = 8.2815E−04
Aspherical surface 3
K = −0.683354
A4 = 0.162029E−01
A6 = 0.154908E−02
A8 = −0.289288E−02
A10 = −0.367711E−03
A12 = −0.358222E−03
A14 = 0.148419E−03
A16 = 0.119603E−03
A18 = −0.302302E−04
A20 = −0.110520E−04
Aspherical surface 4
K = −21.704418
A4 = 0.308021E+00
A6 = 0.639499E+00
A8 = 0.585364E+00
A10 = −0.215623E+00
A12 = −0.252265E−03

TABLE 42

| Causes of fluctuation of spherical aberration | | WFE-rms after correction | d0 (mm) | d2 (mm) |
|---|---|---|---|---|
| Standard conditions (λc = 405 nm, Tc = 25° C., tc = 0.1 mm) | | 0.008 λ | 6.000 | 5.000 |
| Wavelength fluctuation of LD | Δλ = +10 nm | 0.009 λ | 5.869 | 5.131 |
| | Δλ = −10 nm | 0.010 λ | 6.141 | 4.859 |
| Temperature change | ΔT = +30° C. | 0.006 λ | 5.905 | 5.095 |
| | ΔT = −30° C. | 0.025 λ | 6.101 | 4.899 |
| Error of transparent base board thickness | Δt = +0.02 mm | 0.003 λ | 5.867 | 5.133 |
| | Δt = −0.02 mm | 0.014 λ | 6.139 | 4.861 |

In the present example, an objective lens and a coupling lens are made to be a plastic lens. Further, the coupling lens is made to be a single both-sided diffraction lens, and deterioration of wave front aberration caused by mode hop is prevented.

Table 42 shows that spherical aberration caused by wavelength fluctuation of a laser, temperature change and by errors in thickness of transparent base board is corrected excellently.

Example 31

Figure 55:
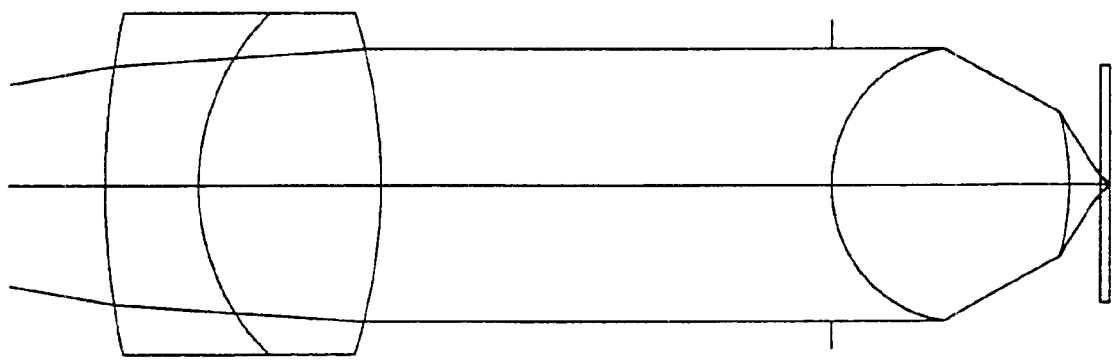
FIG. 55 shows sectional views of an optical system in Example 31.
Figure 56:
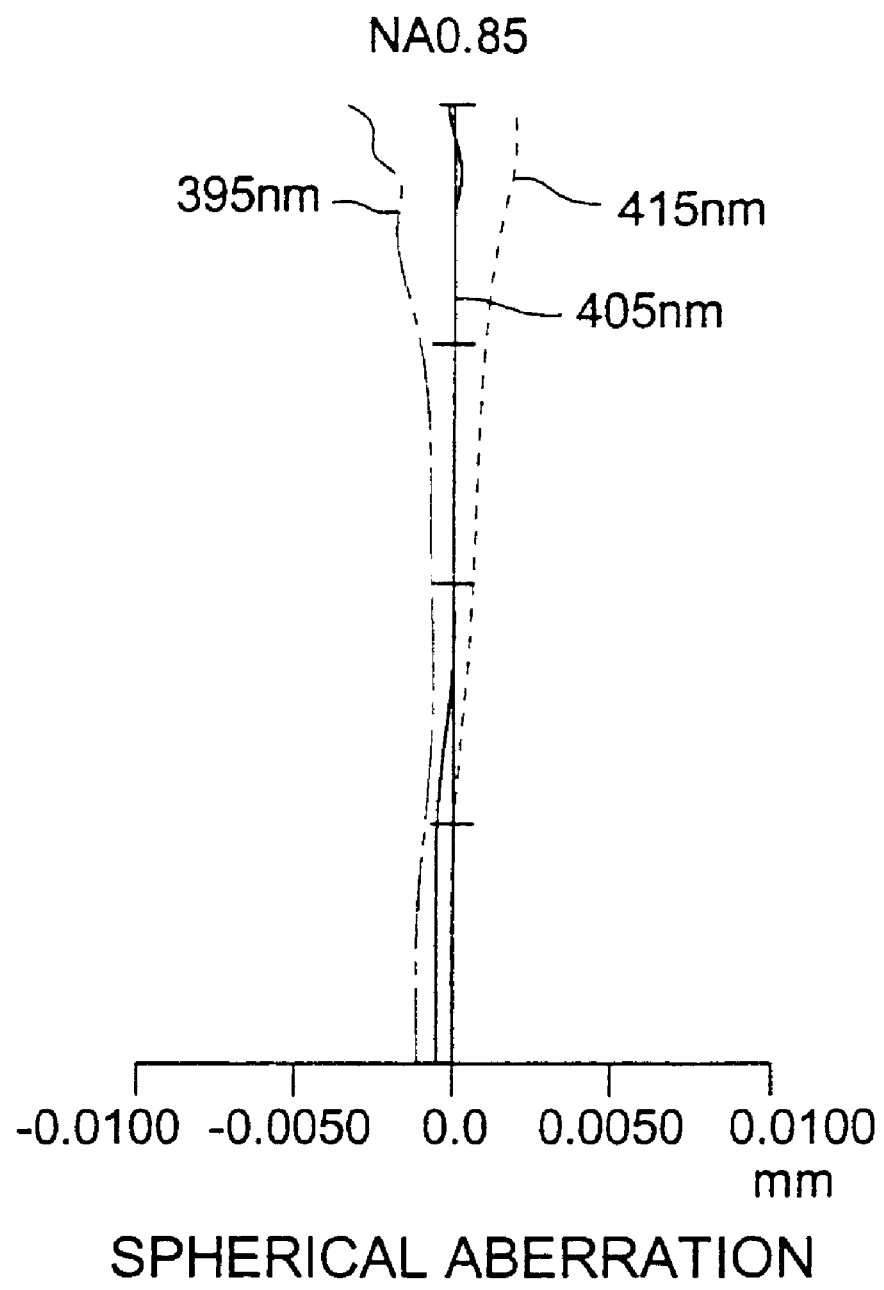
FIG. 56 shows an aberration diagram of the optical system in Example 31.

Lens data and aspherical surface coefficients are shown in Table 43. A sectional view of the optical system is shown in FIG. 55 and an aberration diagram is shown in FIG. 56.

TABLE 43

| Surface No. | | r (mm) | d (mm) | n | νd |
|---|---|---|---|---|---|
| Light source | | | d0 (variable) | | |
| 1 | Coupling lens | 13.531 | 1.000 | 1.91409 | 23.8 |
| 2 | | 2.551 | 2.100 | 1.71548 | 53.2 |
| 3 (Aspherical surface 1) | | −5.765 | d3 (variable) | | |
| Diaphragm | | ∞ | 0 | | |
| 3 (Aspherical surface 2) | Objective lens | 1.194 | 2.650 | 1.52491 | 56.5 |
| 4 (Aspherical surface 3) | | −0.975 | 0.355 | | |
| 6 | Transparent base board | ∞ | 0.100 | 1.61950 | 30.0 |
| 7 | | ∞ | | | |

Aspherical surface 1
K = 0.699858
A4 = −0.53797E−3
A6 = −0.352488E−3
A8 = 0.595790E−4
A10 = −0.152115E−4
Aspherical surface 2
K= −0.683354
A4 = 0.162029E−01
A6 = 0.154908E−02
A8 = 0.289288E−02
A10 = −0.367711E−03
A12 = −0.358222E−03
A14 = 0.148419E−03
A16 = 0.119603E−03
A18 = −0.302302E−04
A20 = −0.110520E−04
Aspherical surface 3
K = −21.704418
A4 = 0.308021E+00
A6 = −0.639499E+00
A8 = 0.585364E+00
A10 = −0.215623E+00
A12 = −0.252265E−03

TABLE 44

| Causes of fluctuation of spherical aberration | | WFE-rms after correction | d0 (mm) | d3 (mm) |
|---|---|---|---|---|
| Standard conditions ($\lambda c$ = 405 nm, Tc = 25° C., tc = 0.1 mm) | | 0.008 $\lambda$ | 7.230 | 5.000 |
| Wavelength fluctuation of LD | $\Delta\lambda$ = +10 nm | 0.008 $\lambda$ | 7.134 | 5.096 |
| | $\Delta\lambda$ = −10 nm | 0.019 $\lambda$ | 7.330 | 4.900 |
| Temperature change | $\Delta T$ = +30° C. | 0.015 $\lambda$ | 7.050 | 5.180 |
| | $\Delta T$ = −30° C. | 0.027 $\lambda$ | 7.415 | 4.815 |
| Error of transparent base board thickness | $\Delta t$ = +0.02 mm | 0.006 $\lambda$ | 6.987 | 5.243 |
| | $\Delta t$ = −0.02 mm | 0.015 $\lambda$ | 7.486 | 4.744 |

A plastic lens is used as an objective lens. A coupling lens is made to be a doublet lens of a one-group and two-element type. Further, the surface of the lens closer to an optical information recording medium is made to be an aspherical surface. Due to this, compactness and high NA are attained.

Table 44 shows that spherical aberration caused by wavelength fluctuation of a laser, temperature change and by errors in thickness of transparent base board is corrected excellently.

Various parameters in Examples 27–31 are shown in Table 45.

TABLE 45

| Example | 29 | 30 | 31 |
|---|---|---|---|
| Material of objective lens | Plastic | Plastic | Plastic |
| Focal length of objective lens | 1.765 | 1.765 | 1.765 |
| NA of objective lens | 0.85 | 0.85 | 0.85 |
| Standard wavelength | 405 nm | 405 nm | 405 nm |
| Structure of coupling lens | Single diffraction lens | Single diffraction lens | Aspherical surface doublet |
| Divergent angle of light flux emitted from coupling lens | Collimated light flux | Collimated light flux | Collimated light flux |
| $0.1 \leq |m| \leq 0.5$ (m < 0) | 0.26 | 0.27 | 0.2 |
| $\delta fB \cdot NA^2 \leq 0.25$ $\mu m$ | 0.061 | −0.061 | 0.032 |
| $0.02$ $\mu m \leq \delta fB \cdot NA^2 \leq -0.15$ $\mu m$ ($\delta fB$) | 0.084 | −0.085 | 0.044 |

Example 32

The example wherein a diffraction surface is provided only on one side of a single coupling lens will be shown, next. Lens data and aspherical surface coefficients are shown in Table 46.

TABLE 46

| Surface No. | | r (mm) | d (mm) | n | vd |
|---|---|---|---|---|---|
| Light source | | | d0 (variable) | | |
| 1 (Diffraction surface 1) | Coupling lens | ∞ | 1.200 | 1.52491 | 56.5 |
| 2 (Aspherical surface 1) | | −16.084 | d2 (variable) | | |
| Diaphragm | | ∞ | 0 | | |
| 3 (Aspherical surface 2) | Objective lens | 1.194 | 2.650 | 1.52491 | 56.5 |
| 4 (Aspherical surface 3) | | −0.975 | 0.355 | | |
| 5 | Transparent base board | ∞ | 0.100 | 1.61950 | 30.0 |
| 6 | | ∞ | | | |

Diffraction surface 1
b2 = −2.6023E−02
b4 = −2.1722E−04
Aspherical surface 1
K = 17.997115
A4 = 0.759036E−03
A6 = −0.311883E−03
A8 = −0.123894E−03
A10 = 0.196179E−04
Aspherical surface 2
K = −0.683354
A4 = 0.162029E−01
A6 = 0.154908E−02
A8 = 0.289288E−02
A10 = −0.367711E−03
A12 = −0.358222E−03
A14 = 0.148419E−03
A16 = 0.119603E−03
A18 = −0.302302E−04
A20 = −0.110520E−04
Aspherical surface 3
K = −21.704418
A4 = 0.308021E+00
A6 = −0.639499E+00
A8 = 0.585364E+00
A10 = −0.215623E+00
A12 = −0.252265E−03

TABLE 47

| Causes of fluctuation of spherical aberration | | WFE-rms after correction | d0 (mm) | d2 (mm) |
|---|---|---|---|---|
| Standard conditions ($\lambda c$ = 405 nm, Tc = 25° C., tc = 0.1 mm) | | 0.005 $\lambda$ | 11.670 | 5.000 |
| Wavelength fluctuation of LD | $\Delta\lambda$ = +10 nm | 0.008 $\lambda$ | 11.404 | 5.266 |
| | $\Delta\lambda$ = −10 nm | 0.009 $\lambda$ | 11.960 | 4.710 |
| Temperature change | $\Delta T$ = +30° C. | 0.014 $\lambda$ | 11.373 | 5.297 |
| | $\Delta T$ = −30° C. | 0.018 $\lambda$ | 11.995 | 4.676 |
| Error of transparent base board thickness | $\Delta t$ = +0.02 mm | 0.009 $\lambda$ | 11.246 | 5.424 |
| | $\Delta t$ = −0.02 mm | 0.008 $\lambda$ | 12.136 | 4.534 |

In the present example, a plastic lens is used for an objective lens and for a coupling lens. Fluctuations of optimum recording position caused by wavelength shift can be controlled to be small, and deterioration of wave front aberration caused by mode hop is prevented. In addition, deterioration of wave front aberration caused by surface eccentricity of the coupling lens is prevented by providing the diffraction surface only on one side of the coupling lens. Further, by providing the diffraction surface on the surface of the coupling lens closer to the light source and by providing on the surface of the coupling lens closer to the objective lens the aspherical surface on which the refracting power generated at a location is weaker when the location is farther from the optical axis, wave front aberration caused by eccentricity of the coupling lens and by tracking error is prevented. Table 47 shows that spherical aberration caused by wavelength fluctuation of a laser, temperature change and by errors in thickness of transparent base board can be corrected excellently. Axial chromatic aberration can also be corrected excellently. Various parameters in Examples 32 are shown in Table 48.

TABLE 48

| Example | 32 |
| --- | --- |
| Material of objective lens | Plastic |
| Focal length of objective lens | 1.765 |
| NA of objective lens | 0.85 |
| Standard wavelength | 405 nm |
| Structure of coupling lens | Single diffraction lens |
| Divergent angle of light flux emitted from coupling lens | Collimated light flux |
| $0.1 \leq |m| \leq 0.5\ (m < 0)$ | 0.15 |
| $\delta fB \cdot NA^2 \leq 0.25\ \mu m$ | 0.05 |
| $0.02\ \mu m \leq \delta fB \cdot NA^2 \leq 0.15\ \mu m$ | |
| ($\delta fB$) | −0.069 |

The invention makes it possible to provide an aspherical single objective lens having a large numerical aperture and excellent image height characteristics, so that it may be used as an objective lens of a optical pickup apparatus. In particular, it is possible to provide an objective lens which has a large numerical aperture of 0.75 or more and is suitably used for a high density recording and reproducing apparatus employing a laser wherein a wavelength of a light source is as short as about 400 nm.

Further, eccentricity sensitivity can be made excellent and spherical aberration and coma can be corrected satisfactorily.

It is also possible to provide an objective lens suitably used for a recording and reproducing apparatus which can operate under conditions that a thickness of a protective layer of an information recording medium is as thin as about 0.1 mm and a working distance is short.

It is further possible to provide a optical pickup apparatus which employs the objective lens stated above.

Further, in a high density and optical recording and reproducing apparatus, it is possible to provide a optical pickup apparatus having an optical system wherein axial chromatic aberration has been corrected by simple structures. In particular, it is possible to provide a optical pickup apparatus wherein a numerical aperture on the part of an information recording medium is as large as 0.65 or more, and the shortest wavelength of a light source to be used is as small as 500 nm or less.

Disclosed embodiment can be varied by a skilled person without departing from the spirit and scope of the invention.

What is claimed is:

1. An apparatus for recording or reproducing information in an optical information recording medium, the apparatus comprising:

an optical pickup device including a light source to emit light flux; and a converging optical system including an objective lens consisting of a single lens and a coupling lens optically provided between the light source and the objective lens;

the objective lens converging the light flux on an information recording surface of the optical information recording medium and having a numerical aperture not smaller than 0.65, and the coupling lens changing a divergent angle of the light flux emitted from the light source and shifting in an optical axis direction so as to correct fluctuation of spherical aberration caused in the converging optical system.

2. An optical pickup apparatus comprising:

a light source to emit light flux; and a converging optical system including an objective lens consisting of a single lens and a coupling lens optically provided between the light source and the objective lens;

the objective lens converging the light flux on an information recording surface of an optical information recording medium and having a numerical aperture not smaller than 0.65, and the coupling lens changing a divergent angle of the light flux emitted from the light source and shifting in an optical axis direction so as to correct fluctuation of spherical aberration caused in the converging optical system.

3. The optical pickup apparatus of claim 2, wherein the numerical aperture of the objective lens is not smaller than 0.75.

4. The optical pickup apparatus of claim 2, wherein the coupling lens corrects the fluctuation of spherical aberration caused on each optical surface of the objective lens.

5. The optical pickup apparatus of claim 2, wherein the fluctuation of spherical aberration based on change in oscillation wavelength of the light source is corrected by shifting the coupling lens in the optical axis direction.

6. The optical pickup apparatus of claim 2, wherein the fluctuation of spherical aberration based on at least one of temperature change and humidity change is corrected by shifting the coupling lens in the optical axis direction.

7. The optical pickup apparatus of claim 2, wherein the optical information recording medium has a protective layer for protecting the information recording surface and the fluctuation of spherical aberration, which is based on change in a thickness of the protective layer, is corrected by shifting the coupling lens in the optical axis direction.

8. The optical pickup apparatus of claim 2, wherein the coupling lens is shifted in the optical axis direction so that a distance between the coupling lens and the objective lens is increased when the spherical aberration fluctuates in an over-corrected direction compared with a predetermined value.

9. The optical pickup apparatus of claim 2, wherein the coupling lens is shifted in the optical axis direction so that a distance between the coupling lens and the objective lens is decreased when the spherical aberration fluctuates in under-corrected direction compared with a predetermined value.

10. The optical pickup apparatus of claim 2, further comprising a shifting unit shifting the coupling lens in the optical axis direction.

11. The optical pickup apparatus of claim 2, wherein the objective lens satisfies the following formula:

$$1.1 \leq d1/f \leq 3$$

where d1 represents axial lens thickness and f represents a focal length of the objective lens.

12. The optical pickup apparatus of claim 2, wherein the objective lens has an aspheric surface at at least one optical surface.

13. The optical pickup apparatus of claim 2, wherein the objective lens satisfies the following formula:

$$1.40 \leq n$$

$$F/Vd \leq 0.060$$

$$0.40 \leq r1/(n \cdot f) \leq 0.70$$

where n represents a refractive index at a used wavelength, f represents a focal length, Vd represents Abbe's number of the objective lens and r1 represents paraxial radius of curvature of the surface of the objective lens at the light source side.

14. The optical pickup apparatus of claim 2, wherein the objective lens is a plastic lens.

15. The optical pickup apparatus of claim 2, wherein the objective lens is a glass lens.

16. The optical pickup apparatus of claim 2, wherein a wavelength of the light flux is not longer than 500 nm.

17. The optical pickup apparatus of claim 16, wherein the coupling lens corrects chromatic aberration of the objective lens.

18. The optical pickup apparatus of claim 17, wherein the coupling lens comprises two elements in one group.

19. The optical pickup apparatus of claim 17, wherein the coupling lens comprises a diffractive structure having a plurality of concentric ring-shaped steps formed on at least one optical surface of the coupling lens.

20. The optical pickup apparatus of claim 2, wherein the coupling lens is a plastic lens.

21. The optical pickup apparatus of claim 2, wherein the optical information recording medium has a protective layer for protecting the information recording surface, the protective layer having a thickness not greater than 0.2 min.

* * * * *